United States Patent
Levinson et al.

(10) Patent No.: US 10,833,993 B2
(45) Date of Patent: Nov. 10, 2020

(54) CHANNEL BONDING

(71) Applicant: Weigel Broadcasting Co., Chicago, IL (US)

(72) Inventors: Aaron N. Levinson, Banks, OR (US); Kyle B. Walker, Park Ridge, IL (US); Christopher P. Olson, Bellingham, WA (US)

(73) Assignee: Weigel Broadcasting Co., Chicago, IL (US)

( * ) Notice: Subject to any disclaimer, the term of this patent is extended or adjusted under 35 U.S.C. 154(b) by 1220 days.

(21) Appl. No.: 14/671,742

(22) Filed: Mar. 27, 2015

(65) Prior Publication Data

US 2015/0281288 A1 Oct. 1, 2015

Related U.S. Application Data

(60) Provisional application No. 61/972,130, filed on Mar. 28, 2014.

(51) Int. Cl.
| | |
|---|---|
| *G06F 15/16* | (2006.01) |
| *H04L 12/801* | (2013.01) |
| *H04L 12/803* | (2013.01) |
| *H04L 12/891* | (2013.01) |
| *H04L 12/841* | (2013.01) |

(52) U.S. Cl.
CPC .......... *H04L 47/115* (2013.01); *H04L 47/125* (2013.01); *H04L 47/283* (2013.01); *H04L 47/41* (2013.01); *Y02D 50/30* (2018.01)

(58) Field of Classification Search
CPC ......... H04L 65/00; H04L 47/00; H04L 47/115
USPC ................................................. 709/208, 219
See application file for complete search history.

(56) References Cited

U.S. PATENT DOCUMENTS

| | | | |
|---|---|---|---|
| 6,480,494 B1* | 11/2002 | Hawley | H04Q 11/0478 370/395.61 |
| 7,633,908 B1* | 12/2009 | Kwong | H04W 84/22 370/337 |
| 7,787,370 B1* | 8/2010 | Aweya | H04L 45/245 370/230 |
| 7,948,933 B2 | 5/2011 | Ohayon et al. | |
| 8,467,337 B1 | 6/2013 | Ohayon et al. | |
| 8,488,659 B2 | 7/2013 | Ohayon et al. | |
| 8,649,402 B2 | 2/2014 | Ohayon et al. | |

(Continued)

FOREIGN PATENT DOCUMENTS

| | | |
|---|---|---|
| CN | 101702667 A | 5/2010 |
| CN | 102377580 A | 3/2012 |

OTHER PUBLICATIONS

Madura "Microsoft Windows Server 2012 NIC Teaming Configuration", Mar. 20, 2014 (Year: 2014).*

(Continued)

*Primary Examiner* — Oscar A Louie
*Assistant Examiner* — Messeret F Gebre
(74) *Attorney, Agent, or Firm* — Lempia Summerfield Katz LLC

(57) ABSTRACT

A system and method for channel bonding is disclosed. The system and method enable transmission of data across multiple connections using multiple network interfaces. Further, the system and method are configured to handle slow or problematic connections and are configured to dynamically modify the bit rate of one or more media data streams.

25 Claims, 20 Drawing Sheets

(56) References Cited

U.S. PATENT DOCUMENTS

| | | | |
|---|---|---|---|
| 8,737,436 B2 | 5/2014 | Ohayon et al. | |
| 8,787,966 B2 | 7/2014 | Altman | |
| 8,811,292 B2 | 8/2014 | Ohayon et al. | |
| 8,848,697 B2 | 9/2014 | Ohayon et al. | |
| 8,942,179 B2 | 1/2015 | Ohayon et al. | |
| 8,964,646 B2 | 2/2015 | Ohayon et al. | |
| 2005/0185621 A1 | 8/2005 | Sivakumar et al. | |
| 2005/0228852 A1* | 10/2005 | Santos | G06F 9/5005 709/200 |
| 2006/0171303 A1* | 8/2006 | Kashyap | H04L 45/586 370/228 |
| 2006/0182439 A1* | 8/2006 | Hernandez | H04B 10/00 398/9 |
| 2007/0204321 A1 | 8/2007 | Shen et al. | |
| 2007/0268820 A1* | 11/2007 | McGee | H04B 3/46 370/217 |
| 2008/0062873 A1* | 3/2008 | Semrad | H04L 12/66 370/232 |
| 2008/0114781 A1* | 5/2008 | Yin | H04L 67/1002 |
| 2008/0192769 A1* | 8/2008 | Tischer | H04L 12/66 370/466 |
| 2009/0037600 A1* | 2/2009 | Chandrayana | H04L 45/04 709/239 |
| 2010/0097956 A1* | 4/2010 | Tauil | H04L 41/22 370/254 |
| 2010/0106770 A1* | 4/2010 | Taylor | H04L 67/303 709/203 |
| 2010/0299703 A1 | 11/2010 | Altman | |
| 2011/0004944 A1 | 1/2011 | Shen | |
| 2011/0007693 A1 | 1/2011 | Frusina et al. | |
| 2011/0280178 A1* | 11/2011 | Heifner | H04B 7/185 370/325 |
| 2012/0039391 A1 | 2/2012 | Frusina et al. | |
| 2012/0195259 A1 | 8/2012 | Ohayon et al. | |
| 2012/0201139 A1* | 8/2012 | Wiley | H04L 29/06027 370/235 |
| 2013/0142234 A1 | 6/2013 | Ohyaon et al. | |
| 2013/0145404 A1 | 6/2013 | Ohayon et al. | |
| 2013/0148707 A1* | 6/2013 | Thibeault | H04N 21/2383 375/222 |
| 2013/0155231 A1 | 6/2013 | Ohayon et al. | |
| 2013/0215767 A1* | 8/2013 | Bryant | H04L 43/087 370/252 |
| 2013/0238960 A1 | 9/2013 | Shen | |
| 2013/0242873 A1 | 9/2013 | Ohayon et al. | |
| 2013/0276044 A1 | 10/2013 | Ohayon et al. | |
| 2013/0290557 A1 | 10/2013 | Baratz | |
| 2014/0036781 A1 | 2/2014 | Ohayon et al. | |
| 2014/0105115 A1 | 4/2014 | Ohayon et al. | |
| 2014/0185428 A1* | 7/2014 | Thibeault | H04L 47/12 370/225 |
| 2014/0269553 A1 | 9/2014 | Stein et al. | |
| 2014/0270686 A1 | 9/2014 | Verheem | |
| 2014/0270697 A1 | 9/2014 | Verheem | |
| 2014/0313411 A1 | 10/2014 | Merritt et al. | |
| 2014/0320650 A1 | 10/2014 | Hong | |
| 2014/0355446 A1* | 12/2014 | Altman | H04W 28/0289 370/235 |
| 2015/0057044 A1 | 2/2015 | Altman | |
| 2015/0058709 A1 | 2/2015 | Zaletel | |
| 2015/0063114 A1* | 3/2015 | Praveenkumar | H04W 28/0231 370/235 |
| 2015/0089020 A1 | 3/2015 | Altman | |
| 2015/0124752 A1 | 5/2015 | Ohayon et al. | |

OTHER PUBLICATIONS

T. Takiguchi, H. Masui, A. Hidaka, Y. Sugizaki, O. Mizuno and K. Asatani, "A new application level link aggregation and its implementation on Android terminals," 2012 8th International Wireless Communications and Mobile Computing Conference (IWCMC), Limassol, 2012, pp. 8-12. (Year: 2012).*

Masui, H., Sugizaki, Y., Mizuno, O., & Asatani, K. (2011). "A new link aggregation in overlay networks on wireless and wired networks". Research Reports of Kogakuin University, (111), 35-40. Retrieved from https://dialog.proquest.com/professional/docview/1082314231?accountid=131444 (Year: 2011).*

H. Imaizumi, T. Nagata, G. Kunito, K. Yamazaki and H. Morikawa, "Power Saving Mechanism Based on Simple Moving Average for 802.3ad Link Aggregation," 2009 IEEE Globecom Workshops, Honolulu, HI, 2009, pp. 1-6, doi: 10.1109/GLOCOMW.2009. 5360735 (Year: 2009).*

International Search Report for corresponding International Patent Application No. PCT/US2015/023067 dated Oct. 2, 2015.

Written Opinion for corresponding International Patent Application No. PCT/US2015/023067 dated Oct. 2, 2015.

Avramova; A.P. et al. "Modelling of Bandwidth Aggregation Over Heterogeneous Wireless Access Networks," *Proceedings of OPNETWORK 2012*, 2012, http://orbit.dtu.dk/fedora/objects/orbit:114177/datastreams/file_10410339/content, pp. 1-5.

"Ethernet OAM Technology White Paper, S-Series Switch," *Huawei Technologies, Ltd.*, Shenzhen, PRC, 2013, http://e.huawei.com/en/marketing-material/global/products/enterprise_network/switches/s9700/hw_276251, 95 pages.

Communication Relating to the Results of the Partial International Search, Annex to "Invitation to Pay Additional Fees" for International Patent Application No. PCT/US2015/023067 dated Jul. 6, 2015, 7 pages.

* cited by examiner

CHANNEL BONDING

REFERENCE TO RELATED APPLICATION

This application claims the benefit of U.S. Provisional Application No. 61/972,130, which is hereby incorporated by reference herein in its entirety.

TECHNICAL FIELD

The present description relates to applications that involve communicating between a client and a server whereby the client has multiple network interfaces and may use any combination of these to communicate with the server. Additionally, the present description relates to broadcasting applications involving variable bit rate streaming media.

BACKGROUND

Channel bonding is a computer networking arrangement in which two or more network interfaces on a client computer are combined for increased throughput and/or redundancy. For example, channel bonding can be used to transfer data using both an 802.11 network interface and an Ethernet network interface faster than can be done using solely either the 802.11 network interface or the Ethernet network interface.

SUMMARY

Methods and systems are disclosed for channel bonding.

In one aspect, an apparatus configured to communicate via a plurality of network interfaces is disclosed. The apparatus includes: the plurality of network interfaces; a memory configured to store at least a part of one or more data streams; and at least one processor in communication with the plurality of network interfaces and the memory. The processor is configured to: establish, for each of the plurality of network interfaces, a respective network connection with a remote device; packetize the one or more data streams into a plurality of packets; transmit the plurality of packets using the plurality of network connections to the remote device; and evaluate performance of one network connection in transmitting the packets in relation to one or more of remainder of the network connections. Various criteria may be used to evaluate the network connection. Examples of criteria include, but are not limited to: ACK checking and RTT checking, discussed further herein. In this regard, when evaluating the performance of one network connection relative to another network connection, the same criteria for the different connections may be used. Alternatively, when evaluating the performance of one network connection relative to another network connection, different criteria for the different connections may be used (e.g., RTT for one connection may be used to evaluate ACK checking for another connection).

In another aspect, a method for communicating via a plurality of network interfaces is disclosed. The method includes: establishing, for each of the plurality of network interfaces, a respective network connection with a remote device; packetizing the one or more data streams into a plurality of packets; transmitting the plurality of packets using the plurality of network connections to the remote device; and evaluating performance of one network connection in transmitting the packets in relation to one or more of remainder of the network connections.

In still another aspect, an apparatus configured to communicate via a plurality of network interfaces is disclosed. The apparatus includes: the plurality of network interfaces; a memory configured to store at least a part of one or more data streams; and at least one processor in communication with the plurality of network interfaces and the memory. The processor is configured to: establish, for each of the plurality of network interfaces, a respective network connection with a remote device; packetize the one or more data streams into a plurality of packets; transmit the plurality of packets using the plurality of network connections to the remote device; evaluate performance of one network connection in transmitting the packets; and in response to evaluating the performance of the one network connection, operate the one network connection in test mode.

In still another aspect, a method to communicate via a plurality of network interfaces is disclosed. The method includes: establishing, for each of the plurality of network interfaces, a respective network connection with a remote device; packetizing the one or more data streams into a plurality of packets; transmitting the plurality of packets using the plurality of network connections to the remote device; evaluating performance of one network connection in transmitting the packets; and in response to evaluating the performance of the one network connection, operating the one network connection in test mode.

In yet another aspect, an apparatus configured to communicate via a plurality of network interfaces is disclosed. The apparatus includes: the plurality of network interfaces; a memory configured to store at least a part of one or more data streams; and at least one processor in communication with the plurality of network interfaces and the memory. The processor is configured to: receive an indication to transmit the one or more data streams to a remote device; in response to receiving the indication to transmit the one or more data streams: establish, for each of the plurality of network interfaces, a respective network connection with a remote device; packetize the one or more data streams into a plurality of packets; and transmit the plurality of packets using the plurality of network connections to the remote device whereby a rate at which packets are assigned to one network connection is determined by a rate at which packets previously transmitted by the one network connection are acknowledged as having been received.

In yet another aspect, a method for communicating via a plurality of network interfaces is disclosed. The method includes: receiving an indication to transmit the one or more data streams to a remote device; in response to receiving the indication to transmit the one or more data streams: establishing, for each of the plurality of network interfaces, a respective network connection with a remote device; packetizing the one or more data streams into a plurality of packets; and transmitting the plurality of packets using the plurality of network connections to the remote device whereby a rate at which packets are assigned to one network connection is determined by a rate at which packets previously transmitted by the one network connection are acknowledged as having been received.

In still another aspect, an apparatus configured to determine whether to instruct a bit rate change is disclosed. The apparatus includes: a network interface configured to receive one or more streams of packets from a remote device; a buffer configured to store video frames derived from the one or more streams of packets; and at least one processor in communication with the network interface and the buffer. The processor is configured to: derive, based on the one or more streams of packets, the video frames; store the video frames in the buffer; analyze a fullness of the buffer; in response to the analysis, determine whether to instruct a bit rate change; and in response to determining to instruct the bit rate change, send an indication of the bit rate change to the remote device.

In still another aspect, a method for determining whether to instruct a bit rate change is disclosed. The method includes: deriving, based on one or more streams of packets, the video frames; storing the video frames in the buffer; analyzing a fullness of the buffer; in response to the analysis, determining whether to instruct a bit rate change; and in response to determining to instruct the bit rate change, send an indication of the bit rate change to the remote device.

Other systems, methods, and features will be, or will become, apparent to one with skill in the art upon examination of the following figures and detailed description. It is intended that all such additional systems, methods, and features be included within this description, be within the scope of the disclosure, and be protected by the following claims.

BRIEF DESCRIPTION OF THE DRAWINGS

The technology may be better understood with reference to the following drawings and description. Non-limiting and non-exhaustive descriptions are described with reference to the following drawings. The components in the figures are not necessarily to scale, emphasis instead being placed upon illustrating principles. In the figures, like referenced numerals may refer to like parts throughout the different figures unless otherwise specified.

DETAILED DESCRIPTION

Figure 1:
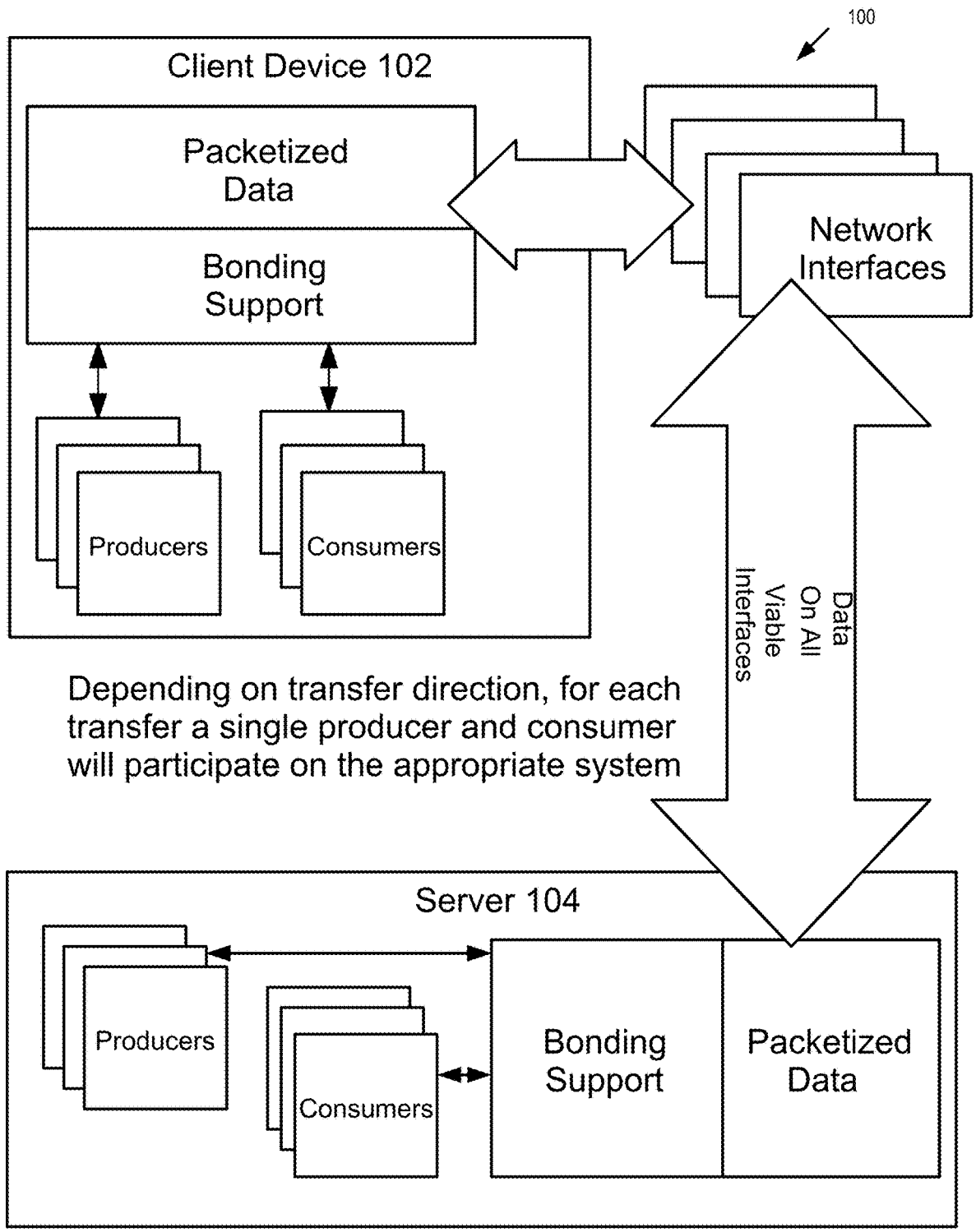
FIG. 1 provides a block diagram of the overall software architecture of the channel bonding system.

The principles described herein may be embodied in many different forms. Not all of the depicted components may be required, however, and some implementations may include additional, different, or fewer components. Variations in the arrangement and type of the components may be made without departing from the spirit or scope of the claims as set forth herein. Additional, different or fewer components may be provided.

There are instances in which a first device seeks to transfer a large amount of data quickly to a second device. In most cases, the first device utilizes only a single network connection to transfer the data to the second device. This single network connection may represent a large network pipe that is sufficient for the networking application, but this is not necessarily the case. For example, a single mobile broadband network connection may not be sufficient depending on the requirements of the networking application. In order to support the diverse requirements of networking applications, channel bonding may be used in order to increase the size of the network pipe.

In one embodiment, an architecture is described that provides a thread-safe framework that can be used to simultaneously utilize multiple network interfaces on a client device to reliably transfer data to and/or from a server running the same framework to process the data. In this regard, the multiple network interfaces on the client device enable the data to be transferred in either direction more quickly (or both directions) and with greater reliability. The use of multiple network devices may also enable near real-time processing of the data on the receiving end, as compared to just using a single network device.

The architecture comprises a client/server model, and the client device may include a plurality of network interfaces. In one embodiment, this plurality of network interfaces may be all of the same type (e.g., one of mobile broadband, Wi-Fi, Ethernet, satellite, etc.) or may be comprised of any combination of network interface types (e.g., any combination of mobile broadband, Wi-Fi, Ethernet, satellite, etc.). There may be multiple instances of each network interface type amidst the plurality of network interfaces. In a more specific embodiment, this plurality may be comprised of a total of five mobile broadband devices, and therefore all network interfaces are of the same type. In another specific embodiment, this plurality may be comprised of one Ethernet device, one Wi-Fi device, one satellite device, and seven mobile broadband devices. Furthermore, where appropriate, network interfaces are not restricted to a particular network provider. In a more specific embodiment, the plurality of network interfaces may be comprised of four mobile broadband devices, with the first and second devices associated with carrier #1, the third device associated with carrier #2, and the fourth device associated with carrier #3.

The client system makes use of the plurality of network interfaces by establishing a single network connection with the server for each network interface. Each network connection can be considered to be a channel through which data may flow in either direction, and the manner in which these channels are combined is known as channel bonding.

The server may comprise a single server system, or multiple server systems configured to work in combination (such as a cloud-based server arrangement). In one embodiment, the server may include a single network interface (such as a network interface configured to communicate via the Internet). In an alternate embodiment, the server may include multiple network interfaces (such as one network interface configured to communicate via the Internet and a second network interface configured to communicate via a network other than the Internet).

In one aspect, bonding is used to transmit one or more streams of data using at least one channel. Streams may be transmitted in either direction, and multiple streams may be transmitted simultaneously. As opposed to various other networking techniques that make use of aggregate network connections, in one embodiment, channel bonding is setup for each connection to send different parts of the streams of data, thereby maximizing throughput. In this regard, the receiving device is configured to rebuild a particular stream as originally sequenced. As discussed in more detail below, software techniques are used to enable channel bonding, including any one, any combination, or all of the following: balance data delivery amongst the network connections; dynamically analyze the connections (e.g., dynamically analyze at least one aspect of the transmission via the connections in order to handle slow and/or unreliable connections); and ultimately to ensure complete stream delivery. As network interfaces dynamically become available to the client device, either by being added to the system and/or by establishing connectivity to the network (e.g., the Internet), in one embodiment, network connections may be established for each network interface, with each network connection being added to the pool of network connections that can be almost immediately utilized to transfer data streams. In addition, as network interfaces become unavailable, for example because the network interfaces can no longer access the Internet or are deemed too slow or unreliable, in one embodiment, the associated network connections may be dynamically removed from the pool of network connections without interrupting the data flow, assuming that there is at least one network connection remaining in the pool. In an alternate embodiment, network interfaces that are deemed too slow or unreliable may have their associated network connections instead placed into test mode and, after evaluating them while in test mode, may be reintroduced into the pool of network connections utilized to transfer the data streams, as described in more detail below.

In an alternate embodiment, fewer than all of the available network connections may be placed into a pool of network connections for use to transfer data streams. For example, based on various criteria (such as cost, previous performance, etc.) certain network connections (such as a satellite network connection) may not be initially placed in the pool of network connections available to transfer data. Later, based on poor performance of other network connection(s) that are in the pool of network connections available to transfer data, one or more of these certain network connections may be placed into the pool of network connections in response to certain conditions. In still an alternate embodiment, a network connection, initially in the pool of network connections available to transfer data, may be removed from the pool during the transfer session. For example, a network connection may be placed into test mode for poor performance and may be reintroduced into the pool based on the performance of the network connection in test mode, as discussed below. As another example, a network connection initially in the pool of network connections available to transfer data (such as a satellite connection) may be removed from the pool of network connections based on the performance of the other network connections (e.g., in the case of a satellite network connection, other lower-cost network connections may be performing adequately (such as having sufficient throughput), thereby allowing the removal of the higher-cost satellite network connection). Thus, the addition of the available network connection to the pool and/or the removal of the available network connection from the pool may be based on other network connections and/or may be based on the performance of the available network connection.

Bonding may be used in combination with one or more applications (termed bonding applications) that comprise custom solutions. As discussed in more detail below, examples of bonding applications include, but are not limited to, the following: broadcasting (e.g., television broadcasting or radio broadcasting); video conferencing; and file transfer. In one embodiment, bonding may be configured as a library following specific API guidelines. Bonding applications may thus access the library, thereby benefiting from the increased bandwidth made possible by bonding.

As discussed in more detail below, bonding may be used in the context of a producer/consumer model. A producer is supplied by a bonding application and provides one or more streams of data to bonding, which is responsible for sending the data to the receiving side. A consumer is also supplied by a bonding application and is handed reassembled streams by bonding for its own processing. In this context, the producer may generate a data stream (such as a data stream that constitutes a file, a video stream, or an audio stream, etc.). Further, the consumer may make use of a reassembled data stream (e.g., write the data stream to a file, play video, play audio, etc.). In the producer/consumer model, bonding applications may include custom consumers and custom producers that are placed on appropriate sides of the connection for the purposes of generating and handling specific data streams.

FIG. 1 provides a block diagram 100 of the overall software architecture of the channel bonding system. Client device 102 includes software associated with bonding, termed bonding support, which may be in the form of a library. Further, client device 102 may include one or more bonding applications, which, when executed, each may make use of a producer and/or a consumer. Bonding support, running on the client device, initially establishes network connections for each of the client's network interfaces with the server (104). Then, when a bonding application is executed on the client, it may associate its producer, or its consumer, or both, with bonding support. The equivalent process may be done on the server. That is, if the bonding application running on the client causes a producer to be associated with bonding support, then the bonding application running on the server causes a corresponding consumer to be associated with bonding support. In addition, if the bonding application running on the client causes a consumer to be associated with bonding support, then the bonding application running on the server causes a corresponding producer to be associated with bonding support. Both of these scenarios may occur at the same time, for the same bonding application running on both the client and the server. That is, a bonding application may use both a consumer and a producer at the same time on the client, and the same bonding application may use both a corresponding producer and a corresponding consumer on the server.

A producer, whether running on either the client or the server, provides a flow of data to bonding support. This flow of data will differ depending on the bonding application—some bonding applications may deliver a stream of data that constitutes a single file, while other bonding applications may deliver streams of encoded audio and/or video that are being generated in real-time. Regardless of the type of data being delivered to bonding support, the producer is responsible for breaking it up into a plurality of packets, known as packetizing the data, prior to delivering it to bonding support. Once it has been delivered to bonding support, bonding support makes use of the multiple network connections to deliver these packets to the receiving side. Some or all of these network connections may be used by bonding support simultaneously. The producer need not deliver the data to bonding support all at once. For example, in the case of data that is being generated in real-time, the producer hands bonding support data as it becomes available, at which point bonding support packetizes the data and makes it available to the network connections for sending to the receiving side over bonding.

The producer packetizes the data in a manner such that the original sequence can be reconstructed on the receiving side. As previously stated, multiple network connections may be used to transmit the packetized data, and because the sending of the packets is divvied up across the different network connections, individual packets may arrive out-of-order in comparison to the order in which they were originally packetized by the producer. One way to support the proper reconstruction of the packetized data is to leave some room in each packet for an index, with the index value initially starting at zero and incremented for each subsequent packet. Additionally, in order to support multiple streams of data, space may be left in each packet for an indicator that is used to distinguish one type of data from another. Such an indicator, for example, would be used to distinguish packets used for encoded video from packets used for encoded audio for a broadcasting bonding application. On the receiving side, the combination of the packet index and the data type indicator provides sufficient information to reconstruct the original packetized data as the producer generated it. As an illustrative example, if two packets of the same data type are sent, one with packet index #1 and one with packet index #2, and each is sent on a different network connection, it is possible that the receiving side will receive the packet with index #2 prior to receiving the packet with index #1. However, due to the presence of the index in each packet, bonding support will correctly deliver the packets to the consumer in the right order.

On the receiving side, whether on the client or the server, the packetized data is received by bonding support via the multiple network connections. The packetized data provided by the producers on the sending side must then be reassembled by bonding support, and, as parts of the stream become available in packetized form, the consumer depacketizes them. The consumer then makes use of the data for its own purposes. For example, a consumer that is used for file transfer may write the stream to a file. In another example, a consumer associated with broadcasting may decode encoded media (e.g., encoded video and/or audio) and then play it out. From the perspective of bonding support, the content of the data is irrelevant—it is the consumer that is responsible for interpreting the data and making use of it.

Of note, a network interface may include an actual physical device providing a networking capability (e.g., Ethernet, Wi-Fi, mobile broadband, satellite, etc.). In a more general form, a network interface is an abstraction of an actual physical device and provides a standard way by which data can be sent and received from the physical device. The inner workings of the physical device, known to one of skill in the art, are omitted. In this regard, for example, a mobile broadband network interface is simply a short-hand form of describing a network interface abstraction that is associated with a physical mobile broadband device.

Figure 2:
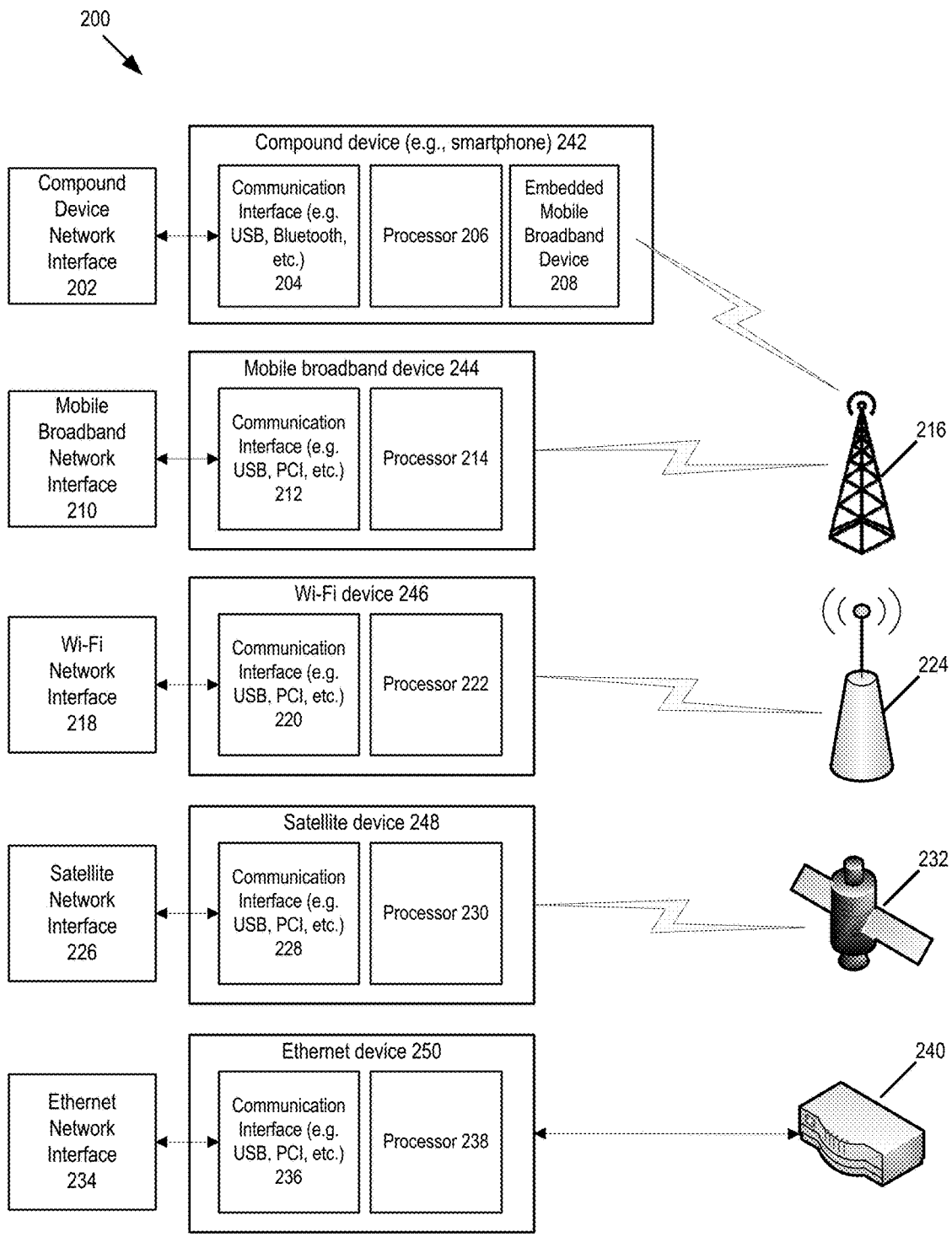
FIG. 2 illustrates a block diagram that focuses on various different types of network interfaces that may be used in the client device.

FIG. 2 illustrates a block diagram 200 that focuses on various different types of network interfaces that may be used in the client device. The first type of network interface described in FIG. 2 is a compound device network interface 202. This type of network interface may typically be used with another full-fledged computing device (compound device 242), such as a smartphone. Such a device may execute an operating system on a processor 206 and have one or more of its own network interfaces. In FIG. 2, the compound device associated with this network interface is shown as having an embedded mobile broadband device 208, but this is just one of various possible network interfaces that it might have. In addition, in order to communicate between the compound device network interface on the client device and the actual compound device, a communication interface 204 is also provided. Such a communication interface would typically be in the form of USB, Bluetooth, or other options. Finally, the embedded mobile broadband device communicates wirelessly with a cellular network 216. Though FIG. 2 only illustrates one compound device 242, one or more compound devices, such as one or more smartphones, are contemplated.

FIG. 2 also illustrates a mobile broadband network interface 210, which may communicate with a physical mobile broadband device 230 via communication interface 212, which can typically take the form of USB, PCI, etc. The mobile broadband device typically has its own processor 214, which would typically be used to run some firmware. The mobile broadband device communicates wirelessly with a cellular network 216.

FIG. 2 also illustrates a Wi-Fi network interface 218, which may communicate with a physical Wi-Fi device 246 via communication interface 220, which would typically take the form of USB, PCI, etc. The Wi-Fi device typically may include its own processor 222, which would typically be used to run some firmware. The Wi-Fi device communicates wirelessly with a wireless network 224.

FIG. 2 also illustrates a satellite network interface 226, which may communicate with a physical satellite device 248 via communication interface 228, which would typically take the form of USB, PCI, etc. The satellite device typically may have its own processor 230, which would typically be used to run some firmware. The satellite device may be comprised of a number of different hardware components, such as a satellite dish. The satellite device communicates wirelessly with one or more satellites 232.

FIG. 2 also illustrates an Ethernet network interface 234, which may communicate with a physical Ethernet device 250 via communication interface 236, which would typically take the form of USB, PCI, etc. The Ethernet device typically would have its own processor 238, which would typically be used to run some firmware. The Ethernet device communicates via cable with a router 240.

Figure 3:
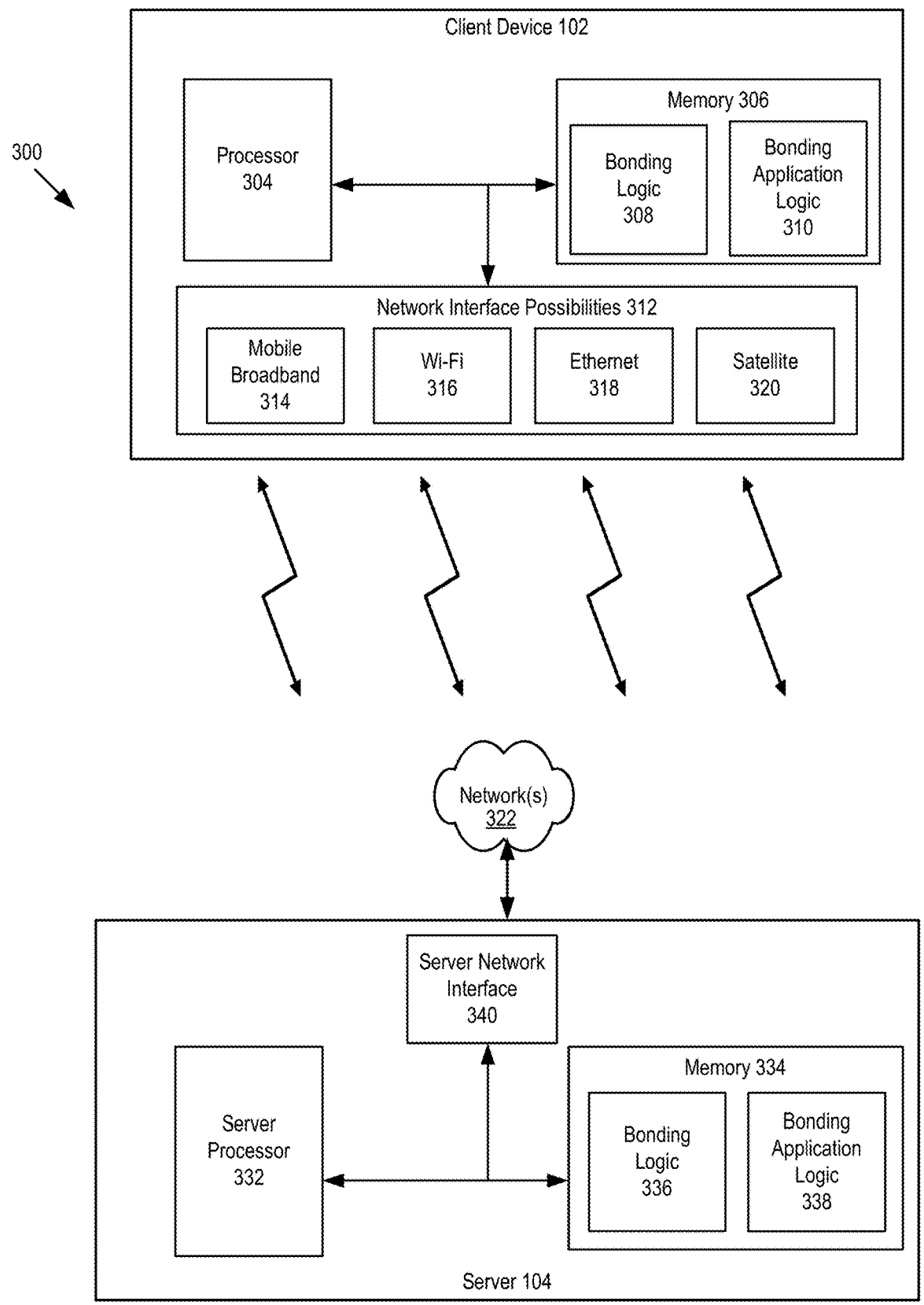
FIG. 3 illustrates a higher level view of the architecture of the channel bonding system.

FIG. 3 illustrates a higher level view 300 of the architecture of the channel bonding system. Client device 102, as previously illustrated in FIG. 1, includes a processor 304, a memory 306, and multiple network interfaces 312. The processor 304 is configured to execute software stored in memory 306. Memory 306 includes software configured for transmitting and/or receiving data streams using bonding. Though memory 306 is depicted as a single memory device, one or more memory devices may be used as memory 306. In one embodiment, the software may be configured using bonding logic 308, which may comprise a library, and bonding application logic 310. As discussed above, a bonding application may access a bonding library in order to customize transmission/reception of a data stream. For example, the bonding application logic 310 may be directed to a broadcasting application, a file transfer application, a video conferencing application, or the like.

Client device 102 further includes network interfaces 312. As shown in FIG. 3, network interfaces 312 are divided into different types of network interfaces, including mobile broadband 314, Wi-Fi 316, Ethernet 318, and satellite 220. The types of network interfaces 312 shown in FIG. 3 are merely for illustration purposes. Other network interface types, in addition to or instead of the network interface types shown in FIG. 3, may be used. In addition, there may be zero or more network interfaces of a particular type used in a particular client device 102. For example, there may be one Ethernet network interface 318, one Wi-Fi network interface 316, seven mobile broadband network interfaces 314, and zero satellite network interfaces 320.

The network interfaces 312 may communicate via one or more networks 322, such as the Internet, as shown in FIG. 3. Bonding logic 308 will establish network connections with the server 330 for each of the network interfaces 312.

Similar to client device 102, server 104, as previously illustrated in FIG. 1, includes a server processor 332, a memory 334, and server network interface 340. Memory 334 includes bonding logic 336 and bonding application logic 338. In one embodiment, the server's bonding logic and bonding application logic may be identical to the bonding logic and bonding application logic residing on client. In an alternate embodiment, the server's bonding logic and bonding application logic may be different from the bonding logic and bonding application logic residing on client. In particular, while the server's bonding logic and bonding application logic components may have much in common with the client device's bonding logic and bonding application logic components, there may be some differences between them. Using the network connections setup by bonding logic 308 on the client device 102 in combination with bonding logic 336 on the server 104, either the client's bonding application logic 310 or the server's bonding application logic 338 or both may be used to provide one or more data streams to be communicated to the receiving side via the network connections.

Figure 4:
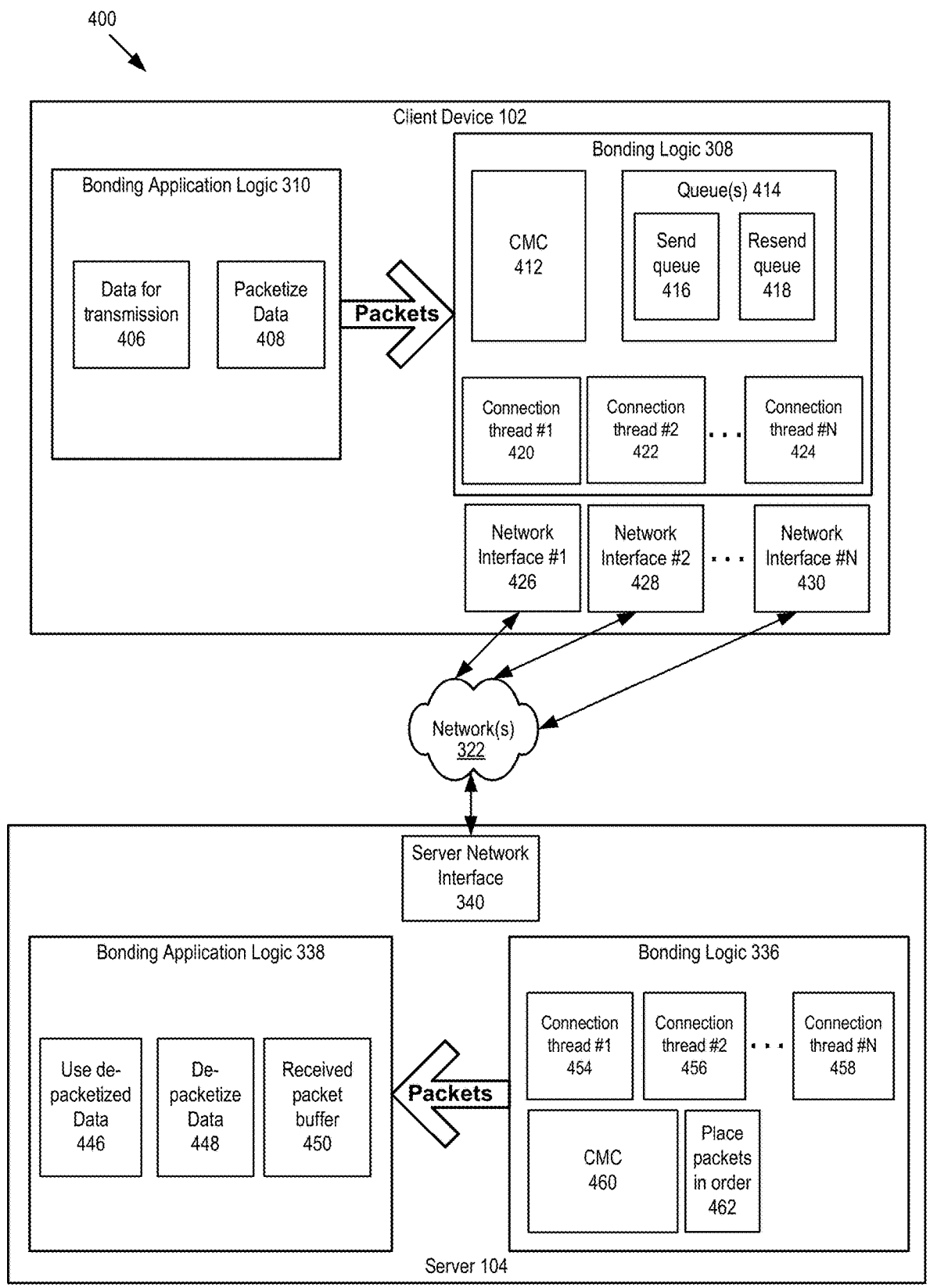
FIG. 4 illustrates a block diagram of the architecture of FIG. 3 in which the client device transmits packets to the server using channel bonding.
Figure 5:
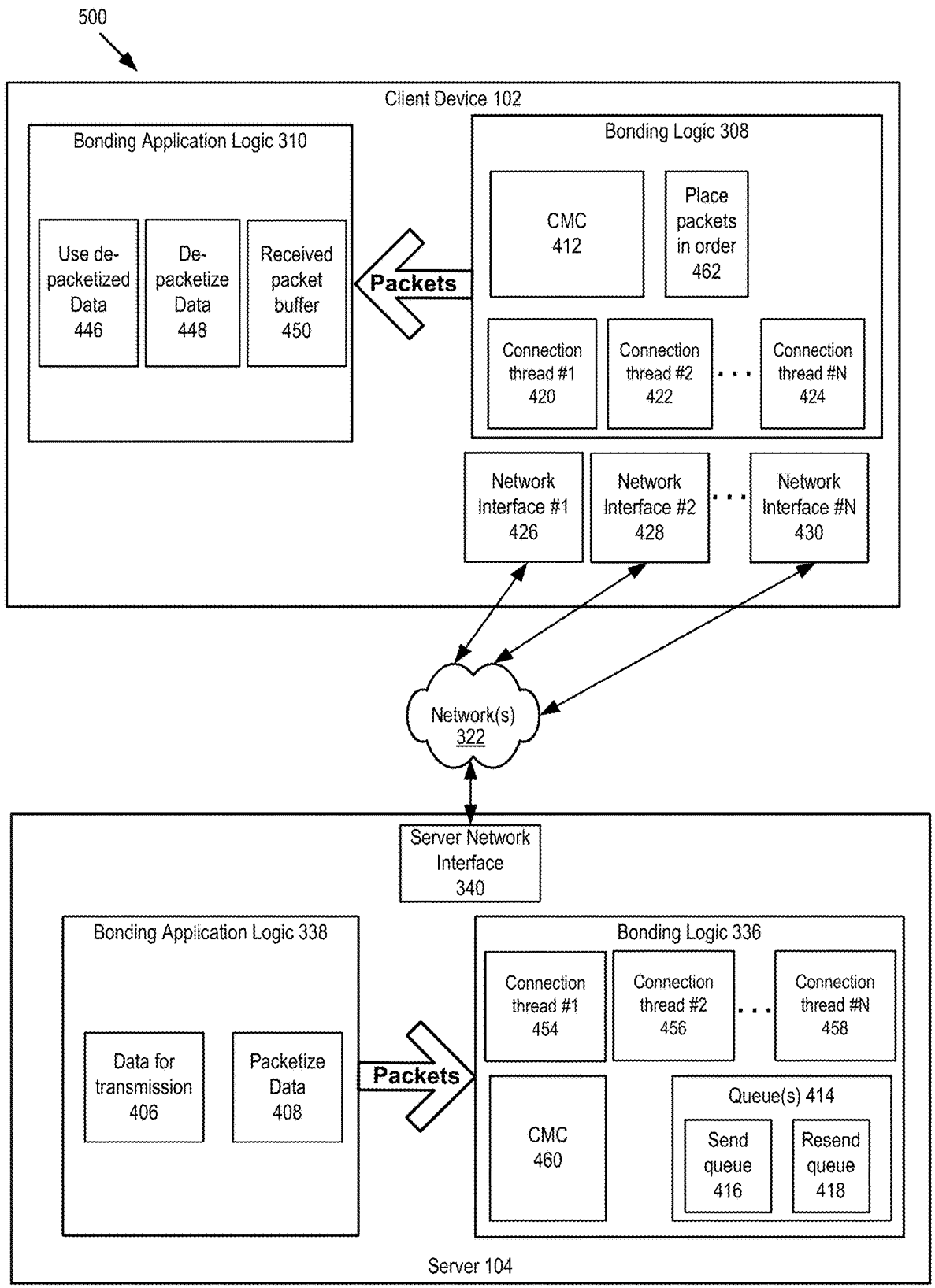
FIG. 5 illustrates a block diagram of the architecture of FIG. 3 in which the server transmits packets to the client device using channel bonding.
Figure 6:
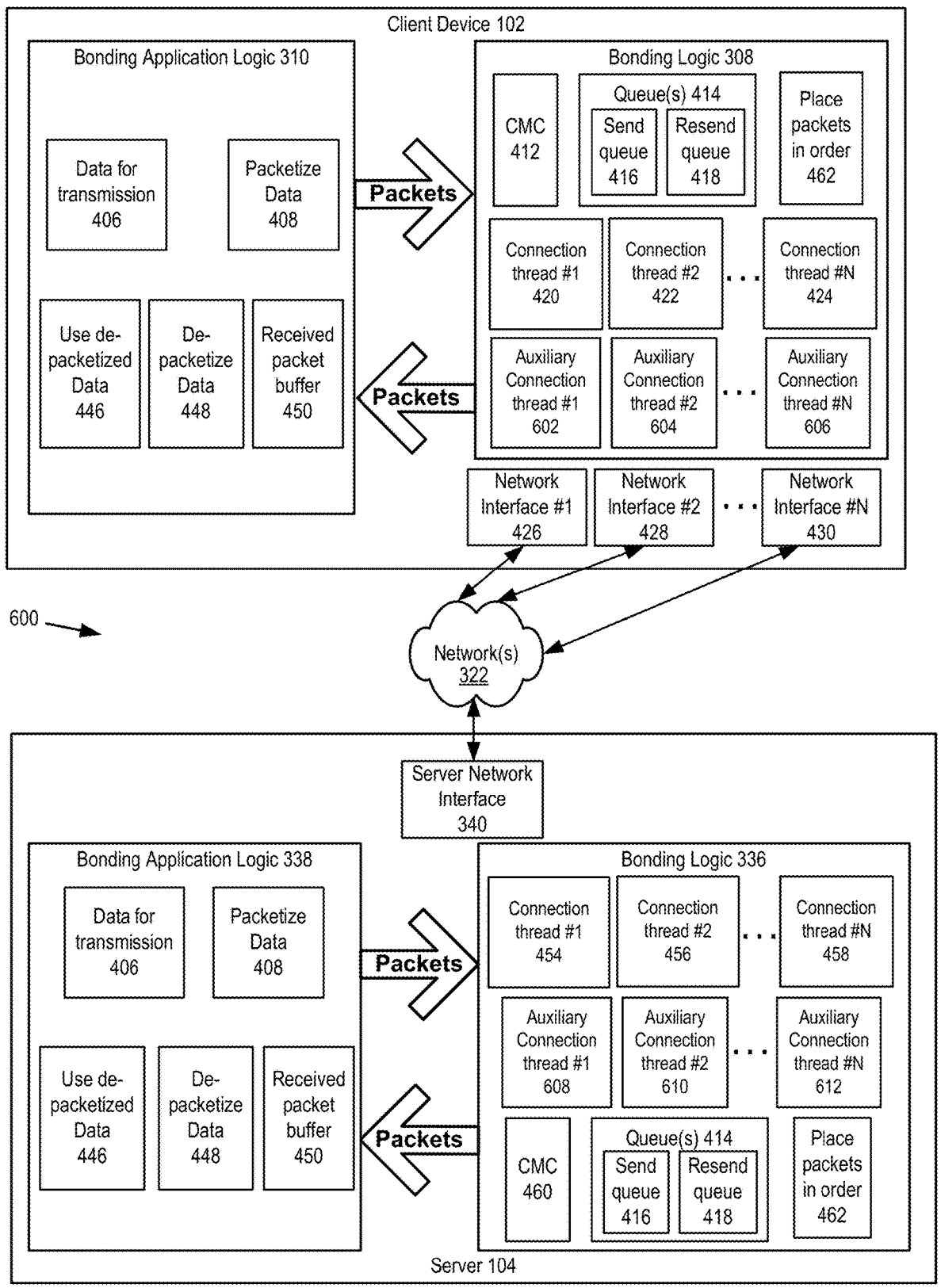
FIG. 6 illustrates a block diagram of the architecture of FIG. 3 in which the client device and the server both transmit and receive packets from each other using channel bonding.

As discussed above, in the context of the producer/consumer model, on either the client device or the server or both, the bonding application may provide a producer, a consumer, or both a producer and a consumer. In this regard, one or more data streams may be transmitted from the client device to the server, from the server to the client device, or bi-directionally between the client device and the server. FIGS. 4-6, respectively, illustrate the different flows of packets from the client device to the server, from the server to the client device, and bi-directionally between the client device and the server.

FIGS. 4 through 6 break down the bonding logic and bonding application logic further. FIG. 4 illustrates a block diagram 400 of the architecture of FIG. 3 in which the client device transmits packets to the server using channel bonding. FIG. 5 illustrates a block diagram 500 of the architecture of FIG. 3 in which the server transmits packets to the client device using channel bonding. Finally, FIG. 6 illustrates a block diagram 600 of the architecture of FIG. 3 in which the client device and the server both transmit and receive packets from each other using channel bonding. In each of these figures, a new concept is introduced in the form of the Connection Manager Component (CMC) 412. This component is part of the client device's bonding logic 308, introduced in FIG. 3, and it is responsible for establishing network connections with the server 104 for one, some, or all of the client device's network interfaces. These network interfaces are labeled in FIGS. 4-6 as Network Interface #1 426, Network Interface #2 428, and Network Interface # N 440, with the implication that the client device may have 1 to N network interfaces. Prior to establishing a network connection with the server for a particular network interface, the CMC may check to see if this network interface has any network connectivity present, but it is generally sufficient to try to connect to the server via a network interface. If network connectivity is not present, the attempt to connect to the server will fail.

In one embodiment, each network connection is logically independent of any other network connection established by the CMC, and in order to manage a particular network connection, the CMC may establish a dedicated software thread for it, termed a connection thread. In FIGS. 4-6, a different connection thread for each network interface on the client device 102 is specified, as connection thread #1 420, connection thread #2 422, and connection thread # N 424. In addition, once the server receives a connection from a particular client device-side network interface, the CMC 460 on the server may also set up its own dedicated connection thread for managing this particular connection. In FIGS. 4-6, server-side connection threads are labeled connection thread #1 454, connection thread #2 456, and connection thread # N 458. As such, there may be a one-to-one mapping of connection threads on the client device to connection threads on the server.

One manner in which to setup a network connection is by using network sockets. A network socket is an endpoint of an inter-process communication flow across a network, and in the context of the client device and the server, one socket would be associated with a network interface on the client device and a companion socket would be associated with the server network interface 340 on the server. When the connection is initially formed, the socket may be created, with a connection thread associated with the created socket. For example, when the client device initially forms a connection, the socket may be created for the client device along with an associated connection thread. In response to the arrival of a new connection, the server may assign a new socket on its side and also setup a connection thread associated with its socket.

Communications may be routed via one of several protocols. For example, there are two main communication protocols used for the transmission of data on the Internet, the Transmission Control Protocol (TCP) and the User Datagram Protocol (UDP). TCP is an option for many networking applications, since it provides a number of important features, such as connections, reliability, and error checking. These features come with overhead, potentially resulting in a performance cost, however, and as a result, TCP may not be a preferred option for real-time or near real-time networking applications, such as streaming applications. UDP, in contrast, is rather minimal and generally a preferred choice for streaming applications. UDP, however, makes no guarantee of data delivery. For example, if a client device sends a packet using UDP to a server, it may or may not be received by the server. Furthermore, the client device has no way to determine if the server did or did not receive the packet using UDP. That is, UDP, by itself, provides no means for determining this. Some network applications can handle some amount of data loss, and in the case of bonding applications, this depends on the bonding application. However, since there exists bonding applications that require all data sent to be delivered to the receiving side, if UDP is used, some level of reliability may be needed on top of UDP in order for bonding to function properly. Rather than create such a layer on top of UDP, one option is to use UDT (UDP-based Data Transfer Protocol), which sits on top of UDP. UDT adds many features on top of UDP, such as reliable and guaranteed delivery of data, and it also provides a number of additional features, such as performance monitoring of an active network connection.

In this regard, each connection may be associated with a network interface on the client device. Further, the multiple connections on the client device may be associated with a connection group. A connection group can be considered to be a bundling of one or more network connections, with each of the network connections in the group being used to operate upon the same goal. This is in contrast to independent network connections, which may be used for completely independent goals. Both the client device and the server may be notified of the connection group for a particular bonding session so that the connection group, as a whole, may be used in order to transfer data via different connections for the particular bonding session. For example, a connection group may comprise a first connection (associated with a first network interface on the client device), a second connection (associated with a second network interface on the client device), and a third connection (associated with a third network interface on the client device). On the client device side, data may be sent via any of the different connections within the connection group for the particular bonding session. On the server side, the server may identify that the data is sent via one of the connections (whether the first, second or third connection), determine that the connection is part of the connection group of the particular bonding session, and thus associate the data received via the connection with the particular bonding session.

After a connection group is established, data transfer via the connection group may be initiated. In one embodiment, the device that established the connection group may be the same device that initiates the data transfer. For example, the client device may establish a connection group and then may initiate the data transfer via the connection group. In still another embodiment, the device that established the connection group may be different from the device that initiates the data transfer.

In one embodiment, the direction of data flow, if there even is a single direction, is completely independent of the manner in which data transfer is initiated. For example, for a broadcasting bonding application that only transmits data from the client device to the server, data transfer may be initiated by the client device. But, it may instead be initiated by the server. This type of data transfer flow is demonstrated in FIG. 4. As another example, for a file transfer bonding application that sends a file from the server to the client device, data transfer may be initiated by the server or the client. This sort of data transfer flow is demonstrated in FIG. 5. As another example, for a video conferencing application that sends and receives media from both the client and the server, data transfer could be initiated by the client device or the server. This sort of data transfer flow is demonstrated in FIG. 6.

To elaborate further on data transfer initiation, for example, a user interface on the client device may be used to input the command to initiate the data transfer. When a bonding application is ready to begin the transfer, which may be initiated by an action on the user interface of the client device, the bonding application may describe the data type to be transferred, and using this description, the CMC 412 on the client device may interact with the CMC 460 on the server, requesting a handler for this data type. More specifically, different data types may comprise a broadcasting data type, a get file data type, etc. These different data types have associated handlers, such as a handler for file transfer, a handler for broadcasting, etc.

The component of the bonding application that initiates data transfer is termed the initiator, while the component of the bonding application that handles the initiation request is termed the receptor. In one embodiment (such as the embodiment in which all initiation requests are handled by the client device), the initiator always runs on the client device, and the receptor always runs on the server.

If a suitable receptor exists, further negotiation is performed in order to setup an appropriate producer/consumer combination (or combinations) on both ends of the connection based on the requirements of the bonding application. In this regard, if data only flows in a single direction for a particular bonding application, it may be sufficient to have a single consumer on one side of the connection and a single producer on the other side of the connection. Alternatively, if data flow is bi-directional, two producer/consumer combinations may be sufficient. For example, as described in both FIGS. 4 and 5, the bonding application only needs to transfer data in one direction. In this case, the bonding application provides a producer on the sending side, and the bonding application also provides a consumer on the receiving side. The main difference between FIGS. 4 and 5 is that, in FIG. 4, the sending side is the client device and the receiving side is the server, while in FIG. 5, the sending side is the server while the receiving side is the client. In another example, as described in FIG. 6, the bonding application needs to transfer data in both directions simultaneously (such as, from a timing perspective, the data transferred in one direction is at least partly concurrent with the transfer of data in the opposite direction). In this case, the bonding application provides both a producer and a consumer on the client device, and it also provides both a producer and a consumer on the server.

More specifically, in bi-directional data transfer, as described in FIG. 6, there may be an additional step of creating a second, auxiliary connection thread for each network connection on both the client device and the server. In the case that data transfer flows in only a single direction, the connection threads are likely to be sufficient for both the maintenance of the connection and for the transfer of data, as demonstrated in FIGS. 4 and 5. However, in the case of bi-directional data transfer, it may be both inconvenient and suboptimal to use a single software thread for both sending and receiving data. Instead, on both sides of a connection, the CMC may create an additional thread for each network connection in order to more easily handle both sending and receiving data. These auxiliary connection threads are illustrated in FIG. 6 as auxiliary connection thread #1 602, auxiliary connection thread #2 604, and auxiliary connection thread #2 606 for the client device and auxiliary connection thread #1 608, auxiliary connection thread #2 610, and auxiliary connection thread # N 612 for the server. It is important to note that the use of one or two software threads per network connection is completely transparent to the bonding application. The bonding application need only supply an initiator, receptor, and one or more producers and consumers, and as long as the bonding application fulfills its requirements, the internal details of how channel bonding works are not relevant to it. Once the appropriate producer/consumer combination(s) have been setup, data transfer may commence. Producers are responsible for the generation of data for transmission 406. As data becomes available to the producer, it may provide the data to bonding. As discussed in more detail below and above, the producer may break up the data into ordered packets (that is, it may packetize data 408) and make these packets available to the CMC, which may then place them in send queue 416. In one embodiment, the send queue is one of at least two possible queue(s) 414, with the other queue being the resend queue 418, which is discussed below. In an alternate embodiment, a single send queue may be used in which packets for resend may be placed at the top of the send queue. The CMC may ensure thread-safe balanced delivery of these data packets to the individual connection threads, which claim different packets in order to send them to the consumer. Initially, each connection thread associated with an active connection may assume ownership of a predetermined number of packets that were previously placed in the send queue and begin transmission of the respective owned packets. In one embodiment, the predetermined number of packets may be the same for each connection thread (e.g., 20 packets), as discussed in more detail below. When a connection thread claims ownership of a packet from the send queue, this packet may be removed from the send queue to ensure that no other connection thread tries to take ownership of it.

Various connection threads may attempt to access data residing in the send queue simultaneously. Unlike in a standard networking application, which uses a single network interface to transmit its data, one objective with bonding may be for multiple connections to send pieces of a data stream with almost no overlap of data being sent across multiple connections, thereby maximizing throughput. Using multiple threads to process and deliver data packets requires cooperation amongst the threads and the need for synchronization. One can consider the send queue, as described earlier, to be an array of packets ready to be sent to the receiving side. If two connection threads want to retrieve the next available packet at roughly the same time, and both get the same packet, packet N, then the increased throughput advantage of bonding has been lost to a certain extent. Instead, the desire is for connection thread #1 to get packet N, while connection thread #2 gets packet N+1, for example.

There are various thread synchronization techniques that can be used to accomplish this, many of which involve the use of a lock. Some types of locking mechanisms prevent other threads from making progress while one thread has the lock. That is, while connection thread #1 has the lock and is retrieving the next available packet from the send queue, if connection thread #2 wants to also get a packet at the same time, it has to wait for connection thread #1 to finish. Depending on how long connection thread #2 must wait, a transition from user code to the OS kernel may occur on the associated connection thread, which incurs its own time cost. Such a locking mechanism may work for bonding, but at a cost of reduced performance.

Alternatively, fast atomic primitives may be used by the bonding logic to ensure both thread-safe and performant access to the send queue by each connection thread. Atomic operations result in a very low-level lock at the processor instruction level, and in the rare case that two threads attempt to access the same piece of memory at the same time, the hardware will ensure that only one thread can do so, and the second thread will have to wait a miniscule amount of time before it can execute the instruction.

As discussed in more detail below, the CMC may also monitor data delivery in order to assess the network connections (e.g., detect bad/poor network connections) and adjust packet delivery accordingly (e.g., re-sending data packets on an alternate connection).

On the receiving side, the associated connection thread may make the data available to the CMC. The CMC, in turn, may make this data available to a bonding application's consumer by placing packets in order 462 in one or more received packet buffers 450 provided by the consumer. A received packet buffer may be a circular buffer of a predetermined size, or it may be dynamically sized. The consumer is then responsible for de-packetizing the data 448 stored in a received packet buffer and then making use of the de-packetized data 446. Once it has made use of a particular packet resource, it may be responsible for returning the packet resource back to the CMC for further use.

Packets can be delivered out of sequence as compared to how they were originally ordered when the data was packetized by the producer. In this regard, the consumer may account for this. For instance, for a file transfer bonding application, the consumer may wait for contiguously sequenced packets to be delivered before attempting to write to a file, since every part of a file can be considered to be equally important. Other bonding applications may have less stringent requirements. For example, a broadcasting bonding application may not necessarily wait for missing packets, for example, choosing instead to skip over some missed packets without noticeably impacting playback of the media.

When data transfer is in process, a connection thread responsible for sending data may detect the loss of its associated network connection first, and if additional connections have been established, the loss of the connection may be reported to the receiving side by one of the other network connections, enabling more timely responses to failure conditions by the receiving side. If all connections are lost, the transfer may be aborted.

As discussed below, if a connection becomes too slow relative to other connections, or it has been determined to perform poorly in general, the connection may be taken out of the connection group and later brought back up in a test mode, discussed below, until the situation may be rectified.

In one embodiment, while a connection is in test mode, it does not send any of the data generated by the producer. In an alternate embodiment, if a connection becomes too slow relative to other connections, or it has been determined to perform poorly in general, another connection may be established for a network interface that is currently idle. For example, in response to determining that a connection using the mobile broadband network interface is not performing properly, a new connection using a currently idle satellite network interface may be established and added to the connection group. In a more specific embodiment, the connection using the satellite network interface may be used until the situation with the poorly performing connection is rectified.

Previously mentioned, in one embodiment, there are two queue(s) 414, the send queue 416 and the resend queue 418. In one embodiment, the queue(s) 414 may comprise circular buffers. As previously discussed, packetized data provided by a producer is initially placed in the send queue, which are later claimed by different connection threads. As discussed in more detail below, if a particular network connection becomes unreliable or slow, it is still important to send the packets that it has claimed to the receiving side. The connection thread may add its packets into the resend queue in this case, allowing one or more other connection threads to send these packets while the original connection thread that claimed them continues to attempt to successfully send the packets as well. Packets in the resend queue have a higher priority than packets in the send queue. That is, if there are packets to be sent in both queues, connection threads will claim packets in the resend queue prior to claiming any packets in the send queue. The resend queue and the use of other network connections to resend packets that had previously been claimed improves reliability. Previously, it has been mentioned that channel bonding improves throughput, and improved throughput may be the key benefit, but the existence of multiple network connections also allows for improved reliability, something that is not possible in networking technologies that use only a single network connection. While resending packets on other connections technically results in a decrease in throughput, the end result may be that the data stored in these packets is delivered to the receiving side faster, so it could also be argued that it may improve throughput as well.

When data transfer is in process, the state of the software may be described as being in a transfer session. In one embodiment, when the data transfer is finished, the transfer session is considered to be finished, but another transfer session may be started again at some point in the future in order to handle a new data transfer request.

Figure 7:
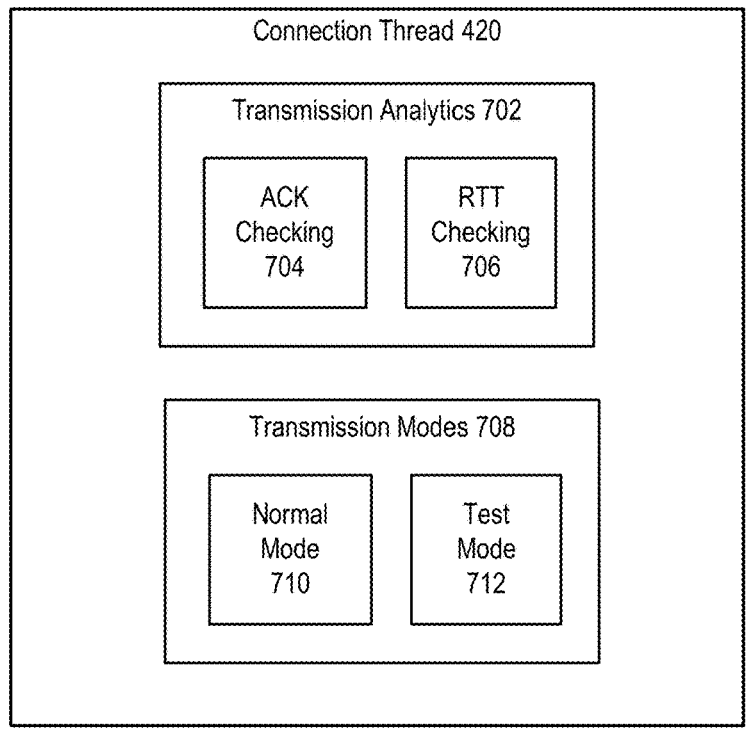
FIG. 7 illustrates a block diagram of some of the advanced facilities used by a connection thread for the transmission of data, as previously demonstrated in FIGS. 4-6.

FIG. 7 illustrates a block diagram 700 of some of the advanced facilities used by a connection thread for the transmission of data, as previously demonstrated in FIGS. 4-6. As shown in FIG. 7, connection thread 420 may include transmission analytics 702. Transmission analytics 702 may analyze at least one aspect of the transmission of the data transmitted by connection thread 420. Examples of transmission analytics include, but are not limited to, ACK checking 704 and RTT checking 706, discussed in further detail below. Further, connection thread 420 includes transmission modes 708, such as normal mode 710 and test mode 712, discussed in further detail below.

Figure 8:
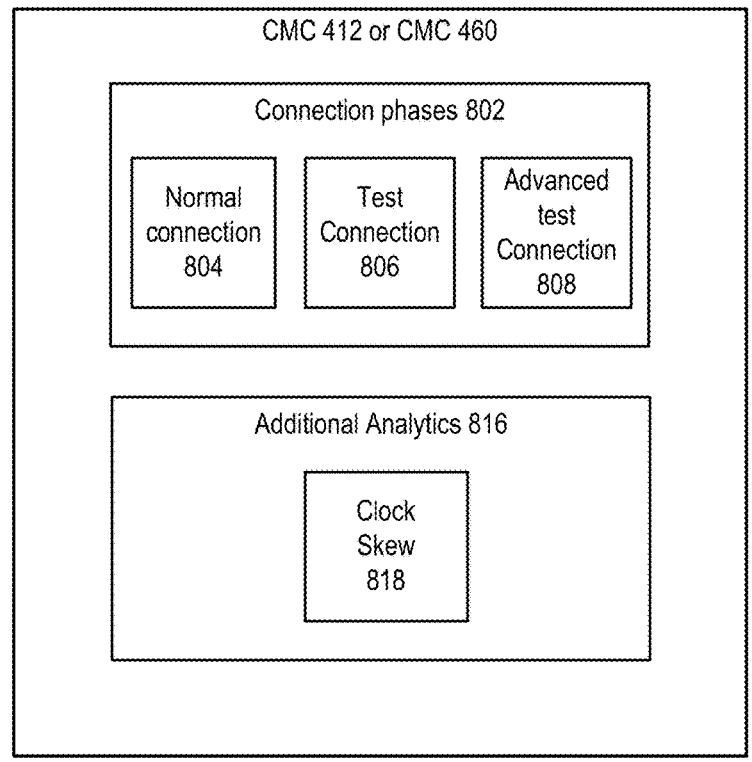
FIG. 8 illustrates a block diagram of some of the facilities of the Connection Management Component (CMC), as previously indicated in FIGS. 4-6.

FIG. 8 illustrates a block diagram 800 of some of the facilities of the Connection Management Component (CMC), as previously indicated in FIGS. 4-6. As indicated in FIG. 8, either the client device's CMC 412 or the server's CMC 460 may have certain common features, even if there are sufficient differences between them as well to warrant two different types of CMCs, one intended for a client device and one intended for a server. A CMC includes various connection phases 802, such as a normal connection phase 804, test connection phase 806 and advanced test connection phase 808, each of which is discussed in further detail below. Finally, a CMC may include additional analytics 816, such as clock skew 818, discussed in further detail below.

In standard networking applications, which involve only a single network connection, if the connection to the Internet is slow, the network application has little choice but to accept the slow connection. In addition, if the connection fails for some reason, the network application as a whole is effectively stopped as well.

In contrast, bonding may analyze at least one aspect of the transmission (such as one or more aspects of the connection), and based on the analysis, may modify operation of at least a part of the system. The modification may comprise modifying the connection (e.g., put the connection into test mode, take the connection offline, put the connection into normal mode for transmission of the data, etc.). Alternatively, or in addition, the modification may comprise changing operation of the network interface. For example, the client device may command the network interface to disconnect connection. More specifically, for a mobile broadband interface, the client device may command the mobile broadband interface to end communication with the cellular tower. As another example, the client device may command the mobile broadband interface to change its mode (e.g., from 3G to 4G). As still another example, the client device may command another network interface, currently sitting idle, to establish a connection with the server (e.g., using a satellite network interface as a backup).

In one embodiment, the analysis comprises a dynamic analysis of one or more aspects of a plurality of network connections. In an alternate embodiment, the dynamic analysis comprises dynamically analyzing a first network connection (which uses a first network interface) relative to (or dependent on) a second network connection (which uses a second network interface). In a more specific alternative embodiment, the dynamic analysis comprises dynamically analyzing a first network connection relative to (or dependent on) the same aspect in a second network connection. The dynamic analysis may comprise dynamic analysis of transmission of at least a part of the data generated by the producer(s) and consumed by the consumer(s). In a more specific embodiment, the dynamic analysis comprises analyzing latency of at least a part of the connection. The latency analysis of a specific connection may be independent of, dependent on, or part dependent on and part independent of the latency analysis of a different connection.

In a still more specific embodiment, the dynamic analysis comprises round-trip time (RTT) checking for packets transmitted on a connection, which may be compared with the RTT associated with packets transmitted on one, some, or all of the other connections. The RTT is typically defined as the amount of time it takes to send a packet to the receiving end and get a receipt of delivery of this packet back. So, the amount of time it takes to send a packet to the receiving end can be estimated as RTT/2, even though it may take longer to send data in one direction than in the other. RTT is one example of how to go about examining the transmission time of packets transmitted between the client device and the server, and other metrics are contemplated.

In yet another embodiment, the dynamic analysis comprises dynamically analyzing a connection partially or completely independently of any other connection in a connection group. In a more specific embodiment, the dynamic analysis comprises acknowledgment (ACK) checking for packets transmitted via a connection, which may be analyzed independent of one, some, or all of the other connections.

In still another embodiment, dynamic analysis comprises dynamically analyzing a connection both partially or completely independently of any other connection in bonding, and dependent on one, some or all of the other connections in bonding. In a more specific embodiment, the dynamic analysis comprises RTT checking (which may make use of the RTT values associated with other network connections in a connection group) and ACK checking (which may, in one aspect, comprise analysis of acknowledgment of packets partially or completely independently of one, some, or all of the other connections). In another specific embodiment, the dynamic analysis comprises analyzing the same aspect both independent of (and dependent on) transmission via another connection. For example, analysis of ACK checking may, in one aspect, be independent of ACK checking for other connections, and may, in another aspect, be dependent on ACK checking for other connections. In this regard, the same aspect, ACK checking, may be a basis for both independent and dependent analysis.

The dynamic analysis may handle slow and/or unreliable connections. For example, in the case of mobile broadband, a particular network interface may undergo temporarily poor signal strength. In some areas, the carrier may only support data transmission at a very low rate. To address this situation, bonding may use various techniques, such as the dynamic analysis, to reduce the impact of poorly performing network connections.

As discussed above, one aspect of the analysis of a network connection is ACK checking. When a connection thread is in the process of sending packets during a transfer session, after an implementation-defined number of packets is outstanding to the receiving side, the connection thread may check to determine if any of these packets has been received by the other end of the connection. Acknowledgments may be sent as part of the transmission process. For example, if UDT is used as the communication layer, one of the features that UDT provides is acknowledgments, such that, after a certain number of packets has been processed by the receiving side of a connection, the receiving side sends a special acknowledgment packet to the sender that indicates the number of ordered packets that has been successfully received by the receiver.

If one or more of the packets have been acknowledged by the time the connection thread has reached the implementation-defined limit of outstanding packets awaiting acknowledged, it may be appropriate to apply further analytics (e.g. RTT checking), but if it makes it through these analytics, the connection thread may take ownership of more packets from the send queue till it again reaches the implementation-defined number of outstanding packets awaiting acknowledgment.

If none of the outstanding packets has been received by the point at which the connection thread checks to see if any have been acknowledged by the receiver, the connection thread may wait an amount of time, and during this time, it may not send any new packets. That is, it will not take ownership of any additional packets from the send queue. The amount of time may be a variable amount of time, as discussed below.

If, by the end of this time period, one or more of the packets that were sent have been acknowledged by the receiving end, it may be appropriate to apply further analytics (e.g., RTT checking), but if it makes it through these analytics, the connection thread may take ownership of more packets from the send queue till it again reaches the implementation-defined number of outstanding packets awaiting acknowledgment.

If, instead, by the end of this time period, none of the packets that were sent have been acknowledged by the receiving end, the connection is considered to have entered a slow and/or unreliable stage. While UDT guarantees data delivery, assuming that a connection is still viable, if a connection has become slow and/or unreliable, it may be some time before the outstanding packets are delivered to the receiving end. The lack of acknowledgments may also indicate that the connection is no longer viable, which indicates that the packets may never be delivered, depending on when the connection lost its viability. For example, the receiving end might have successfully received the packets, but before the associated acknowledgment is received by the sending side, the connection may go bad, and as a result, the acknowledgment packet may never be received. Whatever the case may be, it is important for the packets to be delivered to the receiving end in a timely fashion.

If a network connection is considered to have entered a slow and/or unreliable stage, the connection thread may release its "ownership" of the unacknowledged packets. After releasing ownership, the CMC may add the unacknowledged packets to the resend queue. Other connection threads, when they are ready to send data, will recognize that data packets are available in the resend queue and will prioritize sending packets from the resend queue over packets in the send queue. Packets in the resend queue generally have a lower numerical sequence number compared to the packets that are currently at the front of the send queue and, as such, it is important to send them as soon as possible. Similar to the thread synchronization techniques utilized for claiming ownership of packets in the send queue, the other connection threads may take ownership of the packets in the resend queue for transmission. At the same time, the original connection thread that has entered a slow and/or unreliable stage may continue to attempt to send the packets. As such, it is possible for the CMC on the receiving end to be informed of multiple packets with the same sequence number arriving across multiple connections. As such, the CMC may need to discard the redundant packets.

After failing its acknowledgment check, a connection thread may not attempt to take ownership of any new packets from either the send or resend queues until all the packets that it had previously sent have been acknowledged. While the connection thread technically released its ownership of the packets and caused them to be added to the resend queue, the original packets would still have been sent, and it may not be possible to cancel the transmission of these packets depending on the communication layer that is being utilized. As such, the connection thread will continue to utilize acknowledgment checking until it has determined that all of the packets have been acknowledged. If, eventually, the original packets are acknowledged, the connection thread may resume taking ownership of packets from the send queue (or resend queue). If, instead, the connection thread continues to fail further acknowledgment checks, it will be considered to no longer be viable, and the associated connection may be terminated. A connection using the associated network interface may be brought up again at a later point. The establishment of a new network connection may be sufficient to correct whatever problem caused the lack of acknowledgments. Once the new connection is established, it may be added to the connection group and then join the transfer session.

As described earlier, if none of the outstanding packets has been received by the point at which the connection thread checks to see if any have been acknowledged by the receiver, the connection thread may wait an amount of time, and during this time, it may not send any new packets. In one embodiment, this time period may be dynamically calculated; such as dynamically calculated each time a wait needs to be done. The dynamic calculation may use an algorithm that takes into account, and be based on, the average RTT across all the other connections in the transfer session (e.g., the connections that are actively transferring data generated by the producer). In addition, if an acknowledgment is received prior to the time period expiring, the wait will be interrupted, and the connection thread may continue as described previously.

For example, packet "XXX" may be delivered to the CMC by the producer and placed on the send queue. Connection thread #2 may then claim ownership of packet "XXX" and send it to the receiving side. In the event that the acknowledgment for packet "XXX" is not received in a timely manner, connection thread #2 may release ownership of packet "XXX", which is then placed in the resend queue. Another connection thread, such as connection thread #4, may then claim ownership of packet "XXX" from the resend queue and send it to the receiving side. The packet "XXX" originally sent by connection thread #2 may have been lost, or it may have been unduly slow in transmission. In the latter case, packet "XXX" will be sent twice. In this regard, the CMC on the receiving side may discard the redundant packet "XXX". Extending this out further, connection thread #4, which claimed ownership of packet "XXX" from the resend queue, may also fail its acknowledgment check. In this case, it will re-add the packet back into the resend queue, and another connection thread could then claim ownership of it. However, both connection threads #2 and #4 may not claim ownership of any packets from either the send or resend queues until their copies of packet "XXX" have been acknowledged by the receiving side.

The ACK checking technique allows each connection thread to self-regulate itself. That is, it ensures that a particular connection thread only takes ownership of the number of packets its associated network connection can successfully transmit within a given period of time. Because a connection thread will only claim ownership of at most an implementation-defined number of packets at any given time, if one network connection is slower than another network connection, the connection thread associated with the slow network connection won't take ownership of new packets as frequently as the connection thread associated with the faster network connection. The faster network connection will simply receive acknowledgments from the receiving side more quickly than the slower network connection, allowing it to take ownership of new packets and send them more frequently. As such, the throughput for each network connection can be maximized implicitly, without having to undergo a training session ahead of time to see what sort of throughput a particular network connection is capable of. This in turn also enables a transfer session to begin immediately when initiated by a bonding application, since there is no need for a training session prior to transferring data generated by the producer.

In one implementation, each of the connection threads initially may be assigned the same predetermined number of packets, such as 20 packets. In this regard, each of the connection threads may be limited to taking ownership of 20 packets at a time, including immediately upon starting the transfer session. Thus, upon startup of the transfer session, a training session is not required. Rather, each of the connection threads may take ownership of no more than 20 packets. Thereafter, the number of additional packets that a particular connection thread may take ownership of is dependent on whether any of the currently owned 20 packets have been acknowledged. For example, if none of the 20 packets have been acknowledged, the particular connection thread may not take ownership of any additional packets. If one or more of the 20 packets owned by the particular connection thread is acknowledged, the particular connection thread may take ownership of additional packets up to the 20 packet limit. This procedure of monitoring the number of unacknowledged packets associated with a particular connection thread may continue through the transfer session.

Figure 9:
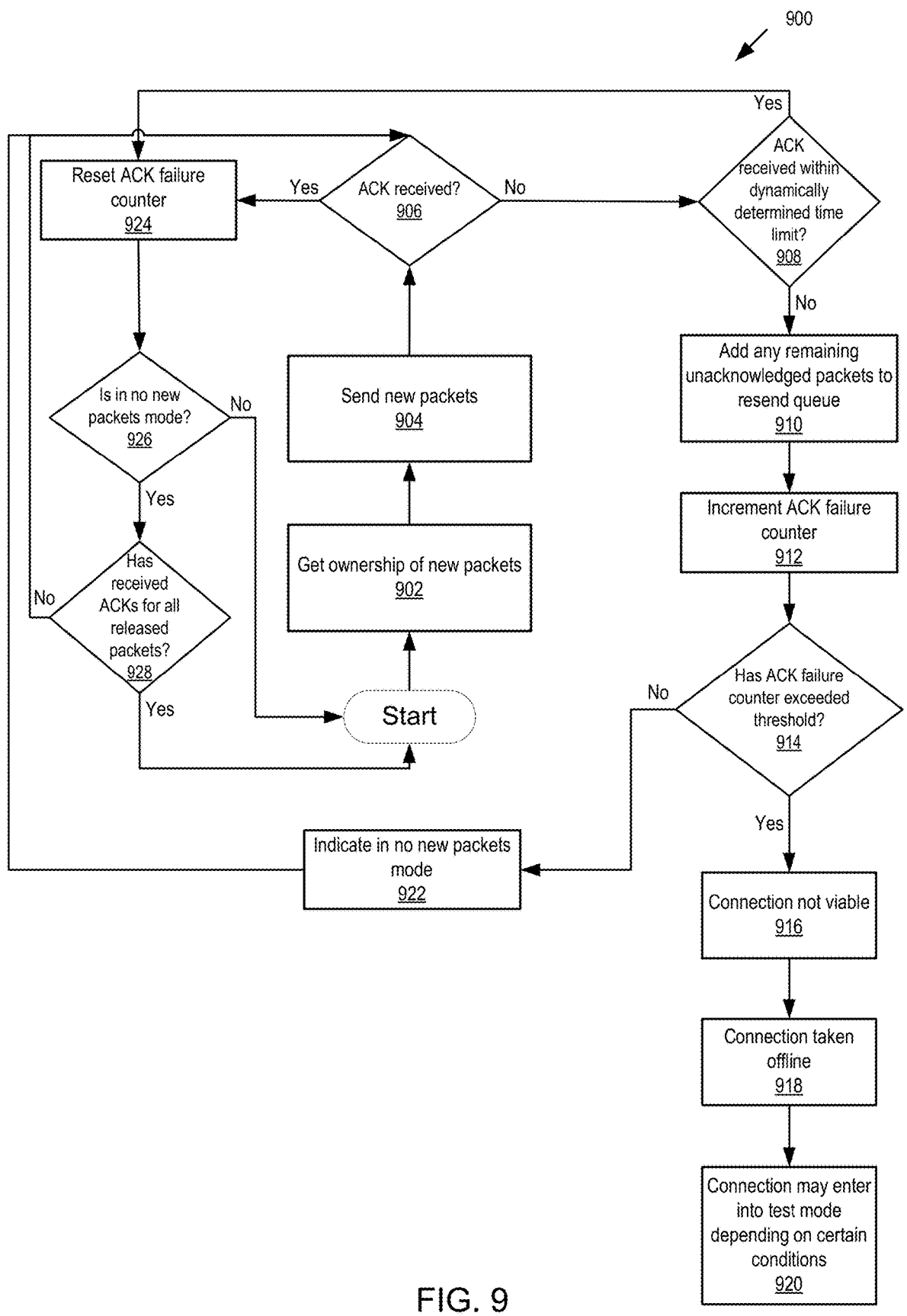
FIG. 9 illustrates a flow diagram for acknowledgment checking, as performed by a connection thread, when transferring data during a transfer session.

FIG. 9 illustrates a flow diagram 900 for acknowledgment checking when a connection thread is transferring data during a transfer session. At 902, the connection thread gets ownership of new packets from the send and/or resend queues. At 904, it sends the new packets. At 906, it is determined whether the ACK has been received for one or more of the sent packets. If not, at 908, it waits to see if an ACK is received within a dynamically determined time limit (which, as stated previously, may be calculated based on the RTT values for the other connections in a transfer session). If not received within the time limit, at 910, it adds any remaining unacknowledged packets to the resend queue. At 912, the ACK failure counter is incremented by one, with the ACK failure counter being used to keep track of the number of times in a row the connection thread has failed an ACK check. At 914, it is determined whether the ACK failure counter has exceeded a threshold. If yes, at 916, the connection is determined not to be viable, and at 918, the connection is taken offline. Later a network connection for the same network interface may be reestablished, and once it joins the connection group and the transfer session, at 920, the connection may enter test mode depending on certain conditions. If instead, at 914, the ACK failure counter has not exceeded the threshold, it moves to 922, at which point a mode is set to indicate that the connection thread should not claim ownership of any new packets (from either the send or resend queues). From there, it loops back to the ACK received check at 906 as already discussed. If, at 906, an acknowledgment has been received or, at 908, an acknowledgment is received within the time limit, it moves to 924, at which point the ACK failure counter is reset to zero. At 926, it is determined whether the connection thread is in the no new packets mode. If not, the flow diagram, loops back to 902. If yes, at 928, it is determined whether the acknowledgments have been received for all released packets (e.g., those added to the resend queue at 910). If not, the flow diagram loops back to 906. If yes, the flow diagram returns to 902.

In addition to (or instead of) ACK checking, RTT checking may be performed.

When in a transfer session, even if a connection that is sending data is receiving regular acknowledgments from the receiving end, it may be taking a relatively long time to deliver the packets to the receiving end on this particular connection, particularly in relationship to the amount of time it takes to deliver packets on the other connections in the transfer session. For example, if there are four connections in a transfer session, and connections #1-#3 each have average RTT values of 100 mSec or less, that means that, on average it takes 50 mSec or less to deliver a packet to the receiving end on connections #1-#3. However, connection #4 takes a bit longer to deliver data and has an average RTT value of 500 mSec. This means that it takes connection #4 roughly 250 mSec to send a packet to the receiving end. As described earlier, once a connection thread takes ownership of a packet from the send queue (or resend queue), no other connection thread will attempt to send this packet. While connection #4 will make progress, albeit at a slower pace compared to connections #1-#3, the amount of time it takes connection #4 to deliver data can have a noticeable and detrimental impact on some bonding applications, particularly bonding applications that involve near real-time streaming of media.

In order to filter out slow connections, the RTT for a connection may be examined after an acknowledgment check has succeeded. The RTT is examined after receiving the acknowledgment check since typically, if the acknowledgment check fails, there is no reason to do the RTT check, as it is clear that none of the packets sent appear to have been received. In one embodiment, the RTT value may be compared based on a variable threshold. The variable threshold may be based on the RTT values of one, some, or all of the other connections in a transfer session, such as a value that is sufficiently greater than a calculation that is based on the average RTT across all the other connections in the transfer session. In this regard, in one embodiment, the evaluation of one connection may be based, at least in part, on the evaluation of one, some, or all of the remaining connections. In an alternate embodiment, the RTT value may be evaluated based on a predetermined threshold, independent of the RTT values of different connections. In still an alternate embodiment, the RTT value may be evaluated based on both a variable threshold and a non-variable threshold. For example, if the RTT value is above an implementation-defined threshold (e.g., 250 mSec) and the RTT value is sufficiently greater than a calculation that is based on the average RTT across some or all of the other connections in the transfer session, then a slow RTT counter may be incremented for this particular connection.

If the slow RTT situation continues to occur, then after the slow RTT counter hits an implementation-defined threshold, all unacknowledged packets that the connection thread has sent may be added to the resend queue. For example, the implementation-defined threshold may comprise "5", meaning that the slow RTT counter needs to be repeatedly incremented five times before any unacknowledged packets are added to the resend queue. This avoids the possibility of the connection thread adding unacknowledged packets to the resend queue prematurely because of a temporarily slow connection. If this threshold is hit, similar to the lack of acknowledgments case in ACK checking, the connection thread will not take ownership of any new packets from the send queue (or resend queue) until all packets it had previously sent have been acknowledged. If the slow RTT situation continues to repeatedly occur, after the count hits a different implementation-defined threshold (the different implementation-defined threshold must be greater than the earlier implementation-defined threshold), the connection may be marked as being slow, and the associated connection may be terminated. After waiting a predetermined amount of time, the connection may be brought back up. When brought back up, the connection may be added to the connection group and then join the transfer session, but it may be placed in a different state than normal mode, such as in test mode, as will be discussed below.

Figure 10:
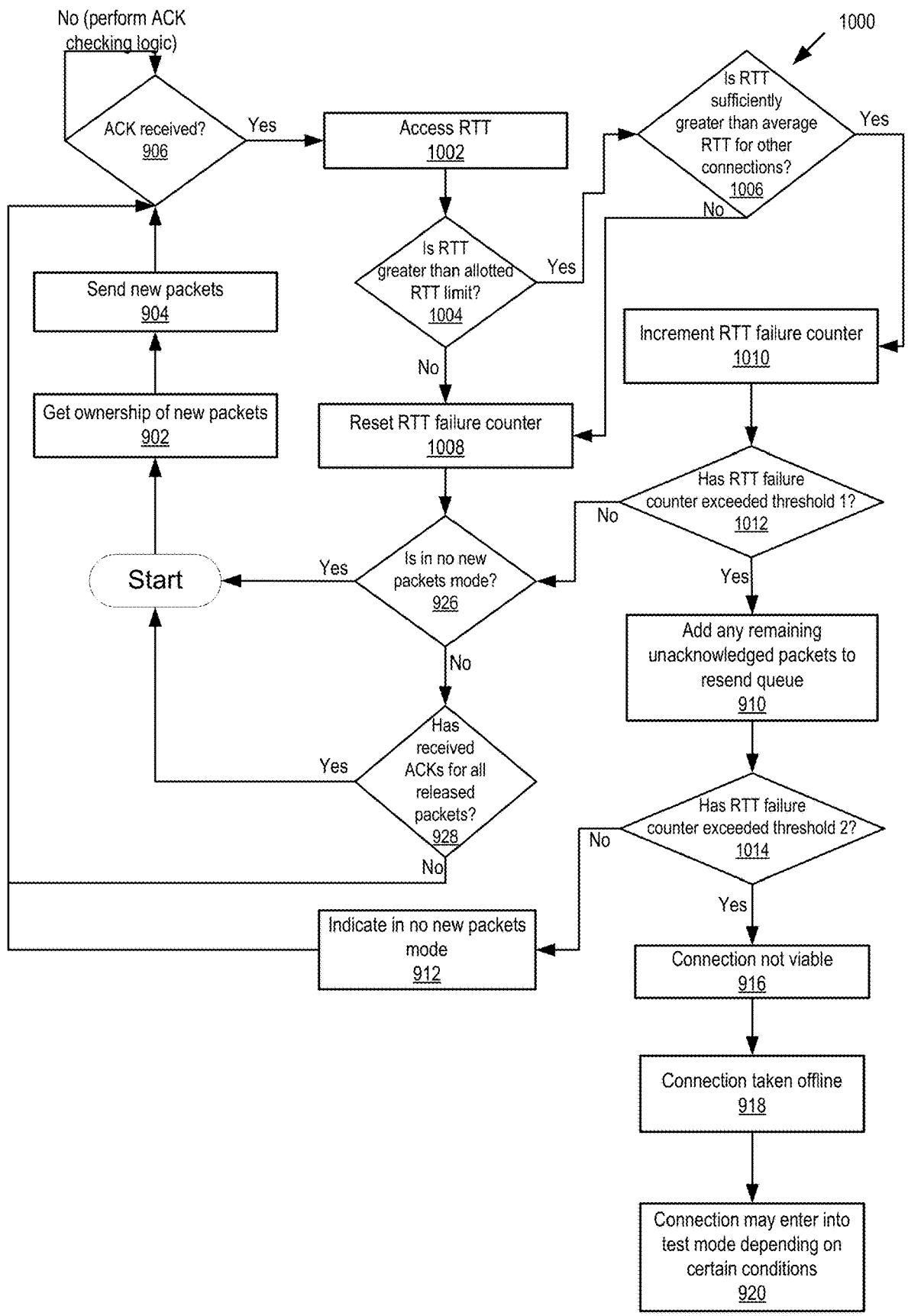
FIG. 10 illustrates a flow diagram for round-trip time (RTT) checking, as performed by a connection thread, when transferring data during a transfer session.

FIG. 10 illustrates a flow diagram 1000 for round-trip time (RTT) checking, as performed by a connection thread, when transferring data during a transfer session. Parts of flow diagram 1000 are similar to flow diagram 900. At 902, the connection thread gets ownership of new packets from the send and/or resend queues. At 904, it sends the new packets. At 906, it is determined whether the ACK has been received for one or more of the sent packets. If not, it performs ACK checking as described in FIG. 9. If an ACK was received at 906 (or an ACK was received within the time period as described in 908 in FIG. 9), it moves to 1002, at which point the RTT value for the network connection is accessed. At 1004, it is determined whether the RTT is greater than an allotted RTT limit. If yes, at 1006, it is determined whether the RTT is sufficiently greater than the average RTT for the other connections in the transfer session. If yes, at 1010, the RTT failure counter for this connection thread is incremented by 1. Then, at 1010, it is determined if the RTT failure counter is greater than a threshold #1. If yes, at 910, as done with ACK checking, any remaining unacknowledged packets are added to the resend queue—however, in contrast to ACK checking, if it gets to this point, at least one outstanding packet had been previously acknowledged as a result of it getting past ACK checking. At 1014, it is determined if the RTT failure counter is greater than a threshold #2 (with threshold #2 being greater than threshold #1). If yes, at 916, the connection is determined not to be viable, and at 918, the connection is taken offline. Later a network connection for the same network interface may be reestablished, and once it joins the connection group and the transfer session, at 920, the connection may enter test mode depending on certain conditions. If instead, at 1014, the RTT failure counter has not exceeded the threshold #2, at 912, as with ACK checking, at which point a mode is set to indicate that the connection thread should not claim ownership of any new packets (from either the send or resend queues). Following 912, it loops back to 906.

If instead, at 1012, threshold #1 is not exceeded, it moves to 926, as previously described in FIG. 9, and continues from there in the same fashion as already described for FIG. 9.

If instead, either 1004 or 1006 evaluate to no, then at 1008, the RTT failure counter is reset to 0. Then, it moves onto 926 as already described.

Network connections that are being used in a transfer session may be in one of several modes, such as normal mode and test mode. Normal mode describes the state of a network connection when it is being used to transfer packetized data generated by a producer during a transfer session.

Test mode is a special state into which a network connection may be placed while in a transfer session based on a prior analysis of the connection, such as if the connection has been determined to be performing poorly. Test mode may be entered based on the results of the different types of analysis discussed above, for example based on RTT checking and/or ACK checking More specifically, test mode may be entered in one of two different ways: (1) the last connection for the associated network interface was terminated due to RTT checking; and (2) the last two connections for the associated network interface were terminated due to ACK checking. Other criteria may be used to determine if test mode should be used.

While a network connection is in test mode during a transfer session, its associated connection thread will not take ownership of any packets from the send or resend queues. Instead, the connection may repeatedly send a special test mode packet that does not contain any real data to the receiving side. Other than this change, both ACK checking and RTT checking may operate in the same way as discussed above.

If the connection in test mode continues to fail ACK checking or RTT checking, the connection will again be terminated and brought back up at a later point. The amount of time between a termination and the act of bringing back up the connection may be predetermined or may vary depending on whether or not the previous connection for the associated network interface were in test mode. For example, as the number of times that a network connection for a particular network interface is repeatedly placed in test mode (and subsequently fails out of test mode due to ACK checking and/or RTT checking) increases, the amount of time between the point at which the previous connection was terminated and the point at which a new connection is established may be increased up to an implementation-defined time limit.

While in test mode, if the network connection successfully gets past both ACK checking and RTT checking after sending an implementation-defined number of test mode packets, the connection will exit test mode, enter normal mode, and immediately start taking ownership of packets from the send and/or resend queues.

In this regard, the intention of test mode may be two-fold. First, test mode may prevent a poorly performing connection from transmitting any of the data generated by the producer, since this could have a detrimental impact on the bonding application. As discussed above, what is meant by a poorly performing network connection may be the performance of the connection relative to the performance of another connection (or other connections) in the transfer session and/or may be the relative to a predetermined standard. With regard to comparing a connection to other connection(s), if most of the connections are slow (and therefore have high RTT values), then a slow connection may not be considered to be performing poorly, since it is performing similarly in comparison to the other network connections. Failed acknowledgment checks may always result in the same outcome, however, regardless of how the other connections in a transfer session are doing.

Second, if whatever condition that caused the connection to perform poorly is corrected in the future, test mode may detect this and allow the connection to rejoin the transfer session in normal mode as a productive member of the connection group.

Figure 11:
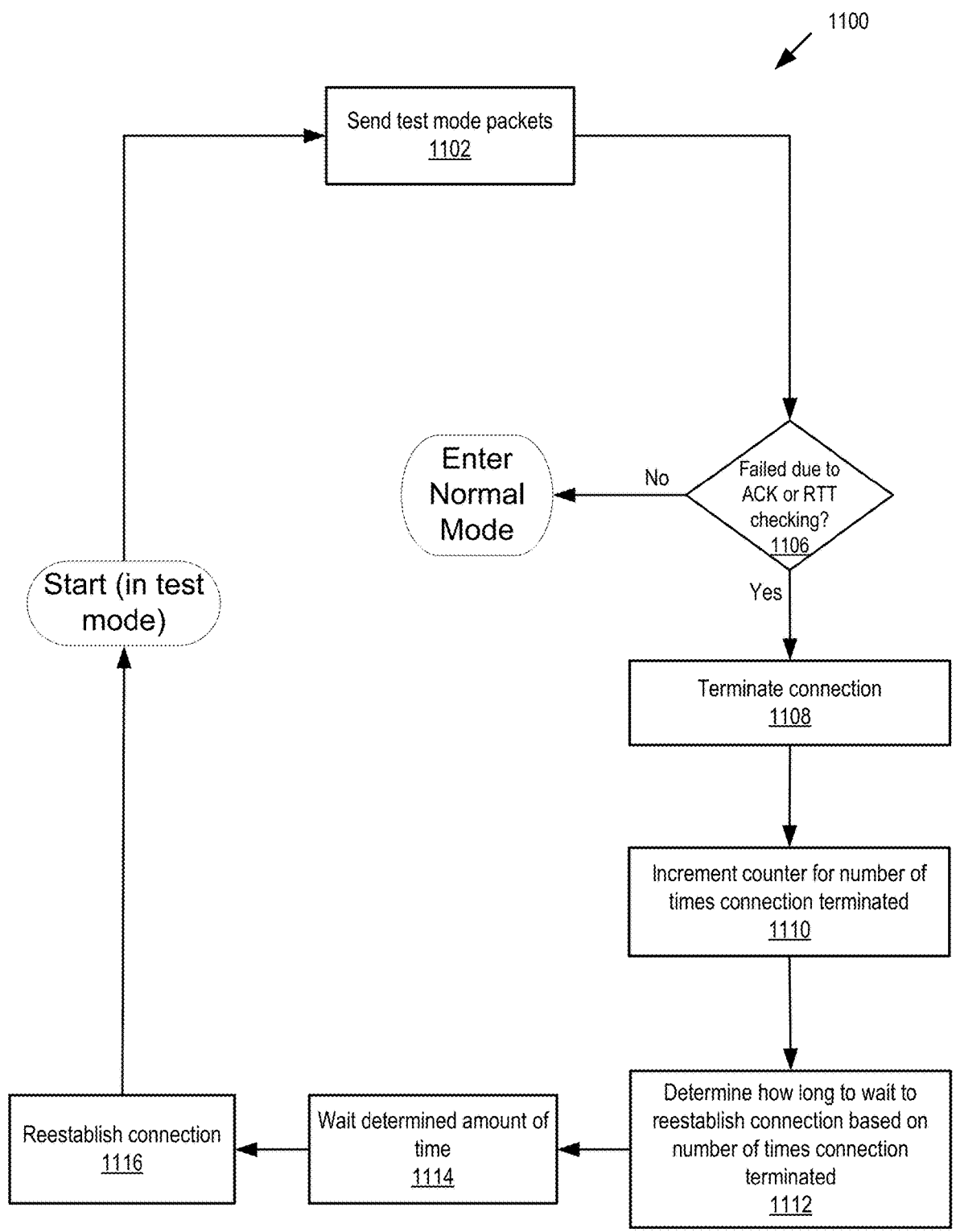
FIG. 11 illustrates a flow diagram for analyzing the performance of a connection thread while it is in test mode.

FIG. 11 illustrates a flow diagram 1100 for analyzing the performance of a connection thread while it is in test mode. FIG. 11 builds on ACK checking and RTT checking as described in FIGS. 9 and 10, respectively, and as such, certain details are omitted for brevity. During a transfer session, a network connection is placed in test mode, and, at 1102, test mode packets are sent. While sending packets, ACK checking and RTT checking proceed as previously described. While sending test mode packets, if, at any point, it fails due to ACK or RTT checking at 1106, the connection will be terminated at 1108. Then, at 1110, it increments a counter by one that keeps track of the number of times a network connection for the associated network interface was terminated during this transfer session while in test mode. Then, at 1112, it determines how long to wait to reestablish a network connection for this network interface based on the value of the counter described for 1110. It waits this amount of time at 1114 and then, at 1116, a network connection for this network interface is reestablished, and it loops back to 1102. If instead, at 1106, it is able to successfully send an implementation defined number of test mode packets (successfully implies that all packets are acknowledged by the receiving side) without failing ACK or RTT checking, the network connection is placed in normal mode. In addition, prior to entering normal mode, the counter described for 1110 above is reset to zero.

As discussed above, the CMC may provide one or more services to the bonding application logic. In one embodiment, these services may be used in conjunction with bonding to improve results and provide useful feedback information to the bonding application. In an alternate embodiment, the services may be used separately from and independent of any bonding application. Examples of such services were previously described in FIG. 8.

One service comprises determining the clock skew between the client device and the server. In one embodiment, the clock skew determination may be used for a bonding application, since in certain instances understanding the clock skew between the client and the server may be helpful for the bonding application. The clock skew is the difference in time between the local clock times set on each respective system. For example, if the time on the client is 12:00:00 PM, and the time on the server is 12:00:01 PM, then the clock skew is approximately 1 second.

The clock skew may be calculated in a variety of ways. One way is using a variation on Cristian's algorithm. Cristian's algorithm is method that can be used to determine the clock skew between two different systems solely using time data provided by each system along with information pertaining to a network connection between the two systems. Over a network connection established between the two systems, the first system sends its current time T1 to the second system in a packet, which also gets its current time T2 at the very point that the packet is received. The second system also determines the RTT for the network connection at this point in time. Since, as previously described, it may be estimated that it takes roughly RTT/2 to send a packet in either direction, the clock skew may be calculated as: clock skew=T2−T1−RTT/2. In addition, generally it may be best to go through this process multiple times and calculate an average based on multiple T1/T2/RTT combinations (or alternatively select the combination with the lowest RTT value).

In one embodiment, instead of simply utilizing Cristian's algorithm for a single network connection, in the context of channel bonding, the algorithm may be used across multiple different connections (such as for at least two, for more than two, or for all of the different connections that are in the transfer session). In this regard, each client system sends multiple time packets to the server, and after an implementation-defined number of time packets have been accumulated by the server across the different connections, the server may apply Cristian's algorithm to all of them.

For example, the client device may be communicating with the server via two connections: connection 1 and connection 2. The client device may, via each connection, occasionally send a packet with the current time T1 when the packet is sent; when the server receives this packet, the server may note its current time T2 and the current RTT value for associated network connection, which may be constantly changing. After the server accumulates a certain number of these packets across the different connections, the server may calculate an average using Cristian's algorithm. Through this determination over multiple connections, as opposed to a single network connection, the expectation is that the accuracy of the technique will be improved.

Once the clock skew has been calculated by the server, the server may optionally inform the client device of the calculated clock skew value. As discussed above, a bonding application may wish to know the clock skew. Alternatively, clock skew may be determined separate and independent from any bonding application.

Figure 12:
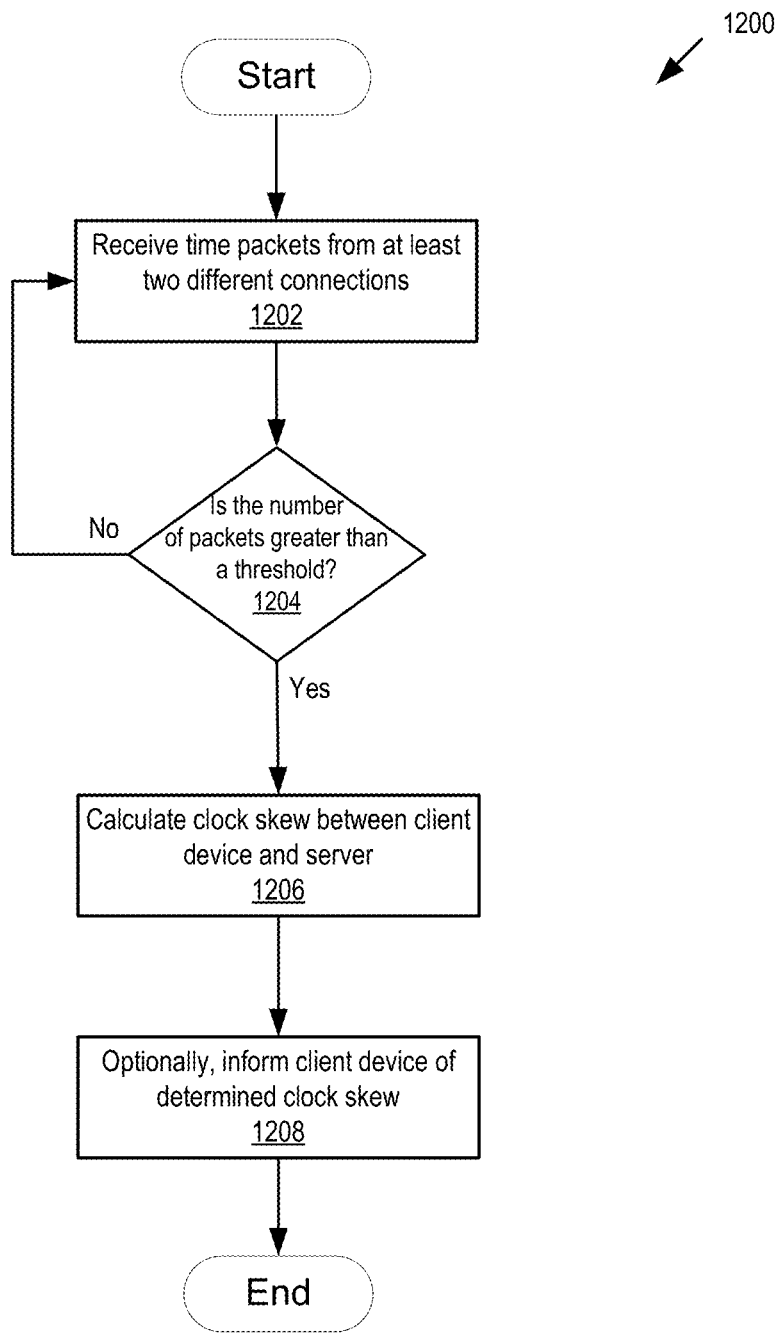
FIG. 12 illustrates a flow diagram for determining the clock skew between the client device and the server by analyzing time data provided across multiple connections.

FIG. 12 illustrates a flow diagram 1200 for determining the clock skew between the client device and the server by analyzing time data provided across multiple connections. This flow diagram is taken from the perspective of the server. At 1202, time packets sent by the client device over at least two different connections are received. At the point each packet is received, T1 is extracted from the packet and T2 and RTT are noted, as described earlier. At 1204, it is determined whether the number of packets received is greater than a threshold. If not, it loops back to 1202 and the server continues to receive time packets from the client via the network connections. If greater than the threshold, at 1206, the clock skew between the client device and the server is determined based on the received packets from the different connections along with the associated T2 and RTT values. At 1208, the client device is optionally informed about the determined clock skew.

As described earlier in FIG. 8, the CMC also provides bonding applications (or for independent use) with the ability to utilize one or more connection phases: normal connection phase; test connection phase; and advanced test connection phase. Normal connection phase corresponds to the phase that a network connection is in during a transfer session when it is either operating in normal mode or test mode. In contrast, test connection phase and advanced test connection phase may be used by bonding applications for a training phase prior to the generation of actual data from a producer. When in either of these two phases, a network connection may send fake data in either direction for a period of time depending on the requirements of the bonding application. During this period of time, various aspects of the network connection are tracked. When the time period is complete, the data may be analyzed, and the bonding application may make use of this analysis for its own purposes. As a general rule, it may be most advantageous if all the network connections are operating in test connection phase or advanced test connection phase in order to get an idea how well the transfer session as a whole will perform ahead of time. Examples of the type of data that may be provided post analysis may include, but are not limited to, any one, any combination, or all of the following: minimum, maximum, average, and median RTT; minimum, maximum, average, and median throughput; and the frequency of test mode use. Advanced test connection phase builds upon test connection phase by providing additional analytics, such as a precise determination of the time it takes each packet to be transmitted from the sender to the receiver. It is important to note that bonding applications do not need to make use of either test connection phase or advanced test connection phase in order to operate successfully. In this regard, the bonding application may optionally use either of test connection phase or advanced test connection phase.

As previously stated, a training phase is not a requirement due to the way that channel bonding works. However, bonding applications may still choose to make use of test connection phase or advanced test connection phase in certain circumstances depending on their requirements. For example, a broadcasting bonding application may benefit from a training session by being able to ascertain, prior to the actual broadcast, what can be used as a reasonable maximum bit rate for encoded media that it generates. Without a training session, the broadcasting bonding application may need to be conservative and always start with a relatively low bit rate, and a lower bit rate implies that the quality, at least initially, may be worse than that associated with a higher bit rate.

Up till this point, channel bonding has been described as an approach that treats all network connections equally. Through the use of ACK checking and/or RTT checking, the connection threads associated with the different network connections fairly manage the distribution of packets to the different network connections. Network connections that are faster and more reliable than other connections will by default take ownership of more packets, and connections that are slower and less reliable will by default take ownership of fewer packets. However, in one embodiment, it may be advantageous to prioritize certain network connections over other network connections. In such an embodiment, channel bonding would not necessarily treat all network connections equally.

Figure 13:
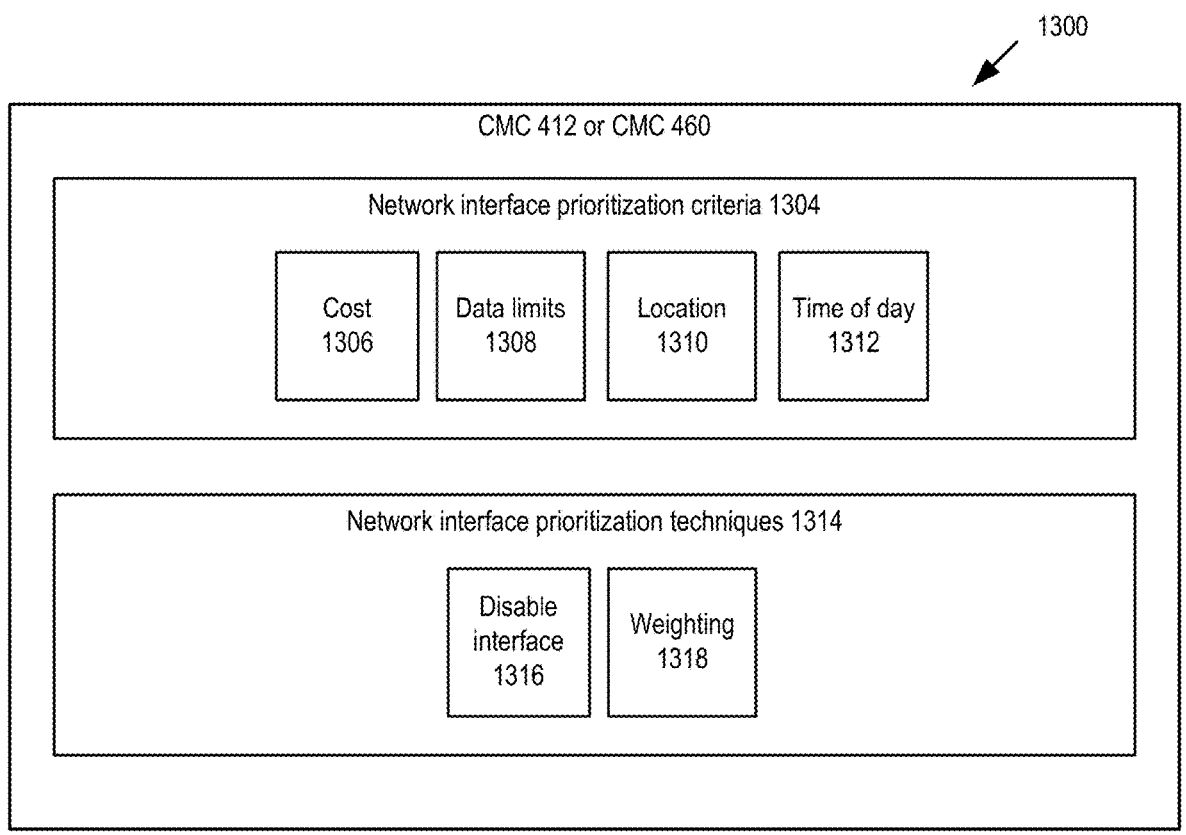
FIG. 13 illustrates a block diagram of some of the criteria and techniques for network interface prioritization.

As described in block diagram 1300 of FIG. 13, there are various criteria 1304 that may be utilized by the CMC in order to prioritize the network connections associated with certain network interfaces over the network connections associated with other network interfaces. These criteria may include, but are not limited to, the following: cost 1306; data limits 1308; location 1310; and time of day 1312. In addition, based on the prioritization criteria, the CMC may use various techniques 1314 to implement such the prioritization in practice. Such techniques may include, but are not limited to, the following: disable interface 1316 and weighting 1318. For the criteria and techniques will be discussed in more detail below.

The cost prioritization criteria generally pertains to how much it may cost to send and/or receive data using a particular network interface on the client device. For example, it may be more expensive to transfer a MB worth of data using network interface #1 than using network interface #2. The various ways in which the monetary costs associated with different network interfaces may be determined. In one embodiment, the client device may maintain preconfigured values for the different network interfaces. In another embodiment, the server may provide values associated with a network interface at the point the client device establishes a network connection with the server for this network interface.

The data limits criteria pertains to potential data limits that may be associated with specific network interfaces. For example, a mobile broadband network interface #1 in a client device may be associated with carrier #1. Generally, mobile broadband carriers don't provide data plans with unlimited data—most data plans have a precise limit, such as 100 GB per month, and any data use beyond this limit in the allotted time period may be charged by the additional GB, disallowed entirely, or dropped down to slower speeds (for example 4G to 3G or even 2G). If the data allowance associated with a particular network interface is close to being met or has been exceeded, it may be prudent to prioritize other network interfaces over this network interface in order to save money. In this regard, the data limits criteria is similar to the cost criteria. It is important to note that a data plan may not be specific to an individual network interface on a single client device. A single data plan, and therefore a single data allowance, may be associated with multiple network interfaces on the same client device and even multiple network interfaces that span multiple client devices. For example, client device #1 may have mobile broadband network interface #1 and mobile broadband network interface #2, both associated with carrier #1. In addition, client device #2 may have mobile broadband network interface #3 and mobile broadband network interface #4, both also associated with carrier #1. Further, the same data plan, and therefore, data allowance, covers all four devices. Based on this situation, in one embodiment, a client device may determine data limits information on a per network interface basis by querying the carrier associated with each network interface, where appropriate. In another embodiment, the server may provide values associated with a network interface at the point the client device establishes a network connection with the server for this network interface.

The location criteria pertains to the physical location of the client device prior to starting a transfer session. Through some means, the client device, perhaps in combination with the server, keeps track of its current location during a transfer session along with performance data associated with the transfer session. Over time, a database of performance data corresponded to location may be compiled. If sufficient information is available for a particular location when a transfer is next done at this location, certain network interfaces could be prioritized over others, since it may be noted from the performance data accumulated for this location that certain network interfaces work poorly in this location compared to others. For example, a client device may have mobile broadband network interface #1 associated with carrier #1 and mobile broadband network interface #2 associated with carrier #2. In a particular location, mobile broadband devices associated with carrier #1 may get a great signal, while mobile broadband devices associated with carrier #2 get a very poor signal. Such information could be ascertained from accumulated location data.

The time of day criteria is similar to the location criteria. Through some means, the client device, such as in combination with the server keeps track of performance data for transfer sessions based on the time of day, day of the week, date, etc. Such a scheme could also take location into account. If sufficient performance data has been accumulated, certain patterns may be ascertained. For example, it may be noted that, between 5 PM and 6 PM on weekdays, mobile broadband network interfaces associated with carrier #1 work poorly, regardless of location. Further, it may be noted that mobile broadband network interfaces associated with carrier #2 work well during the same time period, regardless of location. Such data may be utilized for prioritization purposes.

The CMC may use the plethora of prioritization criteria in order to decide how to prioritize certain network interfaces over other network interfaces. For example, based on the data, it may decide to disable certain network interfaces entirely. In one embodiment, the CMC on the client device might not establish a network connection with the server for such a network interface. As one example, for a satellite network interface, the CMC may determine, based on cost, that a network connection with the satellite network interface will not be established. In another embodiment, the CMC on the client device may establish a network connection with the server for such a network interface, but it may opt not to use it for transferring any data during a transfer session.

In an alternate embodiment, the CMC may make use of weighting. By factoring in all the data determined through the different prioritization criteria, the CMC may assign a weight to each network interface. In one more specific embodiment, the weight may take the form of a percentage, with the percentage pertaining to the rate at which a connection thread associated with a network connection for a particular network interface would take ownership of packets from either the send or resend queues. At 100%, a connection thread might not be impacted at all and might operate in the same fashion as described previously in the document regarding the rate at which it claims ownership of new packets. At 50%, however, the rate at which it claims packets from the send or resend queues would be half that of the normal rate. In a more specific embodiment, such weights could be applied from the very beginning of a transfer session. In another more specific embodiment, such weights could be applied over time during a transfer session.

The CMC may also factor into the equation the requirements of the bonding application. Certain bonding applications may be more negatively impacted by prioritization than other bonding applications. For example, in the case of the data limits criteria, the data allowance for carrier #1 may be reached sooner than the data allowance for carrier #2 because, in general, data transfer works better with carrier #1. If a network interface associated with carrier #1 is weighted less than that associated with carrier #2 or disabled entirely, then the overall throughput and reliability of the resulting transfer session may not be adequate based on the requirements of the bonding application. In the case of a file transfer bonding application, unless the speed of file transfer is abysmal, prioritization may not be a concern. However, in the case of a broadcasting bonding application, the quality of the media transmission may be paramount. In such a situation, making use of prioritization techniques from the start of a transfer session may have a detrimental impact on the quality of the media transmission. In such an environment, it may be preferable to start the transfer session without making use of any prioritization techniques, and once the transfer session has been established, it may be appropriate to gradually apply such techniques in order to gauge their impact to the transfer session. As discussed above, the client device may use multiple network interfaces. The performance of the network interfaces may be monitored in real time (or near real time) in the context of a transfer session. In an alternate embodiment, the performance of the network interfaces may be monitored across different transfer sessions. For example, the server may monitor a particular mobile broadband network interface associated with a particular client device across multiple bonding sessions to determine whether the particular mobile broadband network interface is functioning properly. In a specific embodiment, the server may maintain a record of the different mobile broadband devices that have been used in the past to connect to the server from each particular client device. If, when a client device connects to the server, a particular mobile broadband device that had been used in the past no longer connects or behaves erratically (compared to past behavior as recorded in a previous bonding session), the server may analyze the data and, based on certain thresholds, send a notification. The notification may comprise an internal notification within the server or may comprise a notification to an external device.

As discussed above, various bonding applications may be used with bonding. One such bonding application is a broadcasting bonding application. The broadcasting bonding application is configured to provide a high-performance solution for broadcasting high-quality audio and video in near-real time from remote locations via one or more Internet connections, such as by using bonding. In one embodiment, the bonding logic may be in the form of a modular bonding library, which enables the creation of bonding applications, such as a broadcasting application.

A bonding application, such as the broadcasting bonding application, may make use of an already existing bonding library, and therefore does not have to concern itself with the details of bonding. In this regard, the bonding application can instead focus on creating the technology specific to the bonding application.

The broadcasting bonding application has a number of different architectural guidelines: provide high-quality audio and video; support a near real-time delay between the client and server depending on the bandwidth available via bonding; support one or more video modes (e.g., video modes such as 720p59.94 and 1080i59.94).

Given the above architectural guidelines, the following architectural details may be used: use advanced video and audio encoding/decoding capabilities in order to compress the raw video and audio down to a reasonable size for transmission over bonding (in order to satisfy the near real-time delay guideline); support variable bit rate for video encoding (in order to satisfy the high-quality audio and video requirement and the near real-time delay guideline); audio and video remain synchronized (in order to satisfy the high-quality audio and video guideline); reduce or minimize the impact of networking issues in order to reduce the chance that media will stutter or temporarily freeze (in order to satisfy the high-quality audio and video requirement and the near real-time delay guideline).

Additionally, there are a number of different hardware guidelines for a broadcasting solution, some of which follow from the architectural guidelines: be able to receive audio and video data via a serial digital interface (SDI) input on the client; be able to output audio and video data via an SDI output on the server; support hardware encoding of raw video frames on the client and hardware decoding of encoded video frames on the server; be easy to transport and take into the field. SDI is a family of digital video interfaces, and is one example of a digital video interface. High-definition serial digital interface (HD-SDI) is another example of a digital video interface. Other video interfaces, such as HDMI, are contemplated.

A broadcasting system may involve both user interactions, hardware, and software. An example of a general sequence of events for a broadcast is as follows:

(1) the user connects an audio/video input source to the client device via an SDI cable. In one embodiment, the input source is a video camera. Alternatively, other input sources are contemplated.

(2) the user starts the client device software, which connects to the server using bonding.

(3) the user interacts with the client device software to initiate a broadcast.

(4) while a broadcast is active: on the client device, the software may periodically or continually retrieve audio samples and video frames from the SDI input and encode the media data. The encoded data is made available to bonding, which sends the data to the server; on the server, the software may continually or periodically check for encoded audio and video data that has been received by bonding, and as it becomes available, the data is decoded. This decoded data is in turn sent over SDI for use by the TV station, perhaps for a live broadcast over network television.

(5) the user interacts with the client software to stop the broadcast.

(6) the user disconnects the input source from the client system.

This sequence may omit certain details in a broadcasting session; however, the above-sequence nevertheless reflects the overall picture of a broadcasting session.

Figure 14:
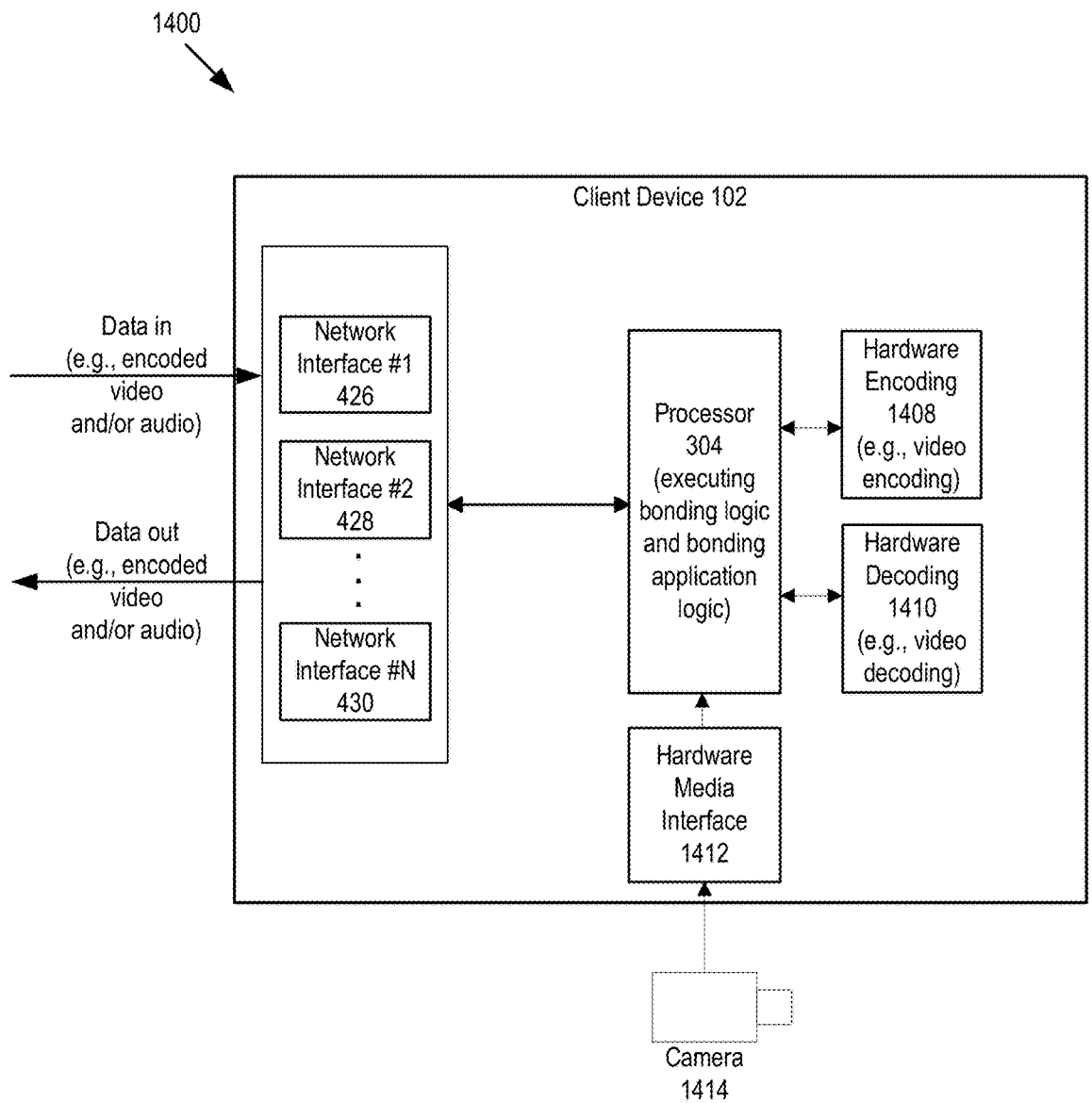
FIG. 14 illustrates a block diagram of the client device, which performs encoding and/or decoding of media and utilizes multiple network interfaces for the transmission of encoded media.

FIG. 14 illustrates a block diagram 1400 of the client device, which performs encoding and/or decoding of media and utilizes multiple network interfaces for the transmission of encoded media. The client device has one or more network interfaces, as described previously. In addition, it has a processor 304 which executes both the bonding logic and bonding application logic. In this case, it is executing the specific bonding application logic associated with the broadcasting bonding application. As described earlier, the client device must have a means of receiving raw video and audio from an external input, such as a camera via an SDI connection. This is represented by the hardware media interface 1412, which, in this example, is connected to a camera 1414 (such as by using an SDI cable). The camera delivers raw video and audio to the hardware media interface, which in turn delivers it to the processor for further use. The processor may also make use of a hardware component 1408 for the purposes of hardware encoding (e.g., for video encoding). The processor may also make use of a hardware component 1410 for the purposes of hardware decoding (e.g., for video decoding). Hardware decoding may typically only be used in the case that the bonding application running on the server has a producer that generates encoded media for the client device's consumption (or, more specifically, for the consumer's consumption that is running as part of the bonding application on the client). This scenario could arise for such use cases as an IFB or return video feed, which will be discussed later. In one embodiment, client device 102 includes only hardware encoding 1408. In an alternate embodiment, client device 102 includes only hardware decoding 1410. In another alternate embodiment, client device 102 includes both hardware encoding 1408 and hardware decoding 1410. Either hardware encoding or hardware decoding may be provided by a physical hardware subsystem in the computer. For example, they might be provided by a hardware subsystem that is part of processor 304. Processor 304 may comprise a processor, such as an Intel® processor with a graphics component that includes Intel® Quick Sync Video, which may be used for H.264 hardware encoding and/or decoding. In this regard, Intel® Quick Sync Video includes encoding and decoding functionality without relying on an external hardware card to encode or decode via H.264. Intel® Quick Sync Video thus potentially accelerates encoding and decoding while enabling the processor 606 to complete other tasks. Various other hardware options exist for both encoding and decoding H.264 video.

In the case that the hardware media interface, as described previously, is used for SDI input, one hardware option for SDI input is an internal add-in card (such as a PCI Express® card). This hardware option may be used for desktop, server systems, or custom systems that would use a custom chassis and potentially other custom components. Another hardware option comprises external devices that can be connected to a computer, such as via USB, Thunderbolt, or ExpressCard.

FIG. 14 further illustrates data in (e.g., encoded video and/or audio) and data out (e.g., encoded video and/or audio). In one embodiment, client device 102 only outputs data via bonding. This describes the typical broadcasting bonding application arrangement, since the broadcasting bonding application would typically provide a producer on the client device for the purposes of packetized encoded media that is generated from the raw audio and video data input via the hardware media interface. In an alternate embodiment, client device 102 only inputs data via bonding. Such an arrangement would not correspond to the typical broadcasting application, since no data is being broadcast by the client device to the server. In still another embodiment, client device 102 both inputs and outputs data via bonding.

This arrangement describes an enhancement to the typical broadcasting bonding application arrangement, with the server providing some data to the client for certain purposes (e.g., IFB or a return video feed, as mentioned earlier and discussed below), in addition to the client broadcasting data to the server.

Client device 102 may further include a user interface for the user to interact with client device 102. The user interface may comprise a touch screen, a mouse and/or keyboard input. Thus, one option is a hybrid laptop/tablet that provides both a touch screen and satisfies the hardware outlines as discussed above for FIG. 14. The laptop may include one or more USB ports. USB modems may comprise mobile broadband functionality and may connect via the USB ports. Another option is to create a custom computing solution with its own chassis and possibly other custom hardware.

As mentioned above, there are a number of steps a broadcasting bonding application may perform in order to go from raw audio/video data on the client device to raw audio/video data on the server. The client device may encode the raw, uncompressed media data. Then, the encoded data is sent over bonding to the server. On the server, the encoded data is decoded, resulting in raw, uncompressed media data. There may be additional implementation-specific steps to convert the raw data to other pixel formats.

All of these steps result in a time cost, known as the broadcasting overhead. As such, there will be some real-time delay (otherwise known as the initial delay or simply delay) between when the client device receives the raw audio/video data from an input source and when the server outputs the equivalent raw audio/video data. For example, if the client device starts a broadcast at 12:00:00 PM, the server might not play the first frame until 12:00:03 PM, indicating a 3 second initial delay. The various steps mentioned above are responsible for the initial delay. Effort may be taken to make the different steps as fast as possible while maintaining the highest quality audio and video as possible.

As discussed above, encoding techniques may be used as part of the broadcasting process. The encoding techniques thereby enable the transmission of high quality video. If one considers a video format like 720p, a progressive format with a resolution of 1280×720, there are typically 1843200 bytes in a single video frame. Using the broadcast-standard frame rate of 59.94 frames per second (fps), that means that just for the raw video data alone, a network pipe with a throughput of at least 883 Mbps (megabits-per-second) would be required. Such a large amount of bandwidth is unrealistic in the mobile realm, and even the aggregate throughput of 10 mobile broadband connections would not provide a sufficient aggregate network pipe.

As such, compressing the raw data may reduce the amount of data for transmission. For audio and video, this may be performed using advanced encoders. One example of an encoding scheme is the H.264/AVC codec, which may be used to encode video data. Another example compression scheme is the AAC codec, which may be used to encode audio data. Both codecs can produce high quality video and audio results, respectively, at relatively low bit rates. This means that less data may need to be transferred, in comparison to when other codecs are used, to get the same level of quality.

There are numerous implementations of the H.264 and AAC codecs. In one embodiment, both codecs may be implemented in hardware. In an alternative embodiment, both codecs may be implemented in software. In still an alternate embodiment, the H.264 codec may be implemented in hardware and the AAC codec may be implemented in software. The speed of the encoder (and decoder) is relevant for the broadcasting bonding application, since, as described above, the longer it takes to encode video and audio, the higher the delay will be between client device and server.

For example, since audio encoding is less computationally intensive than video encoding, a software AAC encoder may be used. Further, in order to deliver low latency video to the server, it may be necessary to use a hardware H.264 encoder. Various options for hardware-based H.264 encoders exist. One option is to use a separate add-in card or external device. These options are fine for decoding on the server end, but they can be problematic from the perspective of the client, which is intended to be in a mobile form factor for ease of transport. Another option is to use built-in capabilities of the processor or motherboard—this approach obviates the need to provide a separate piece of hardware just for encoding and/or decoding. For example, Intel® Quick Sync Video may be used for encoding H.264 video on the client device and is technology that is built into the graphics component on many Intel processors. In this regard, instead of requiring a separate hardware product to handle H.264 encoding on the client device, Quick Sync Video may be used in combination with the Intel processor to enable H.264 encoding without any additional hardware. Thus, a single piece of equipment may be used for both processing and encoding/decoding functionality.

As discussed above, a consumer (in the producer/consumer model discussed above) may have one or more buffers into which the CMC places received packets depending on the type of data stored in a packet. Further, in the context of a broadcasting bonding application, the consumer may have multiple buffers, such as a video buffer and an audio buffer.

In one embodiment, the size of the buffer (such as the video buffer and/or the audio buffer) may be predetermined. In an alternate embodiment, the size of the buffer may be dynamic. For example, as mentioned above, in the broadcasting bonding application's consumer, the software may continually or periodically check for encoded audio and video data that has been received by bonding (and placed in either the audio or video buffers by the CMC), and as it becomes available, the data is decoded. This decoded data is in turn played out over SDI. Drilling down on the encoded video data, after providing this data to the H.264 hardware decoder, the decoder produces decoded video frames. These video frames are raw, uncompressed video frames, consuming the same number of bytes as raw, uncompressed video frames on the client side. Such frames in theory are suitable for playback directly over SDI, but more than likely, they may need to be converted to another pixel format due to the requirements of the SDI playback hardware. For example, Intel® Quick Sync Video decodes to the NV12 pixel format, while some SDI solutions requires that video be in the UYVY pixel format. A color conversion step may be needed to convert between the two pixel formats.

Once the consumer has a single video frame in a pixel format that can be sent out over the SDI playback hardware, in theory, it may send it out for playback immediately. However, this is generally not advisable. Once playback starts, the intention is that both video and audio should playback continuously after this point. Going back to the broadcast standard video frame rate of 59.94 fps, after playing the first video frame, if another video frame is not ready to be played roughly 0.01668 seconds later, then this will not result in smooth video.

Instead, one or more buffers may be used to accumulate the frames associated with the video. In one embodiment, a separate buffer may be used to accumulate video frames (and another for audio samples) that are ready to be played back over SDI. These buffers are separate from the audio and video buffers into which the CMC places packetized data. Once a sufficiently sized buffer has been populated with video frames that are ready to be played back (or audio samples), then playback can start. This buffer may be a circular buffer. More particularly, as new frames become available for playback after playback has started, they are inserted into the buffer using a FIFO scheme.

Also, the time necessary to accumulate a predetermined amount of data in the buffer is known as the initial buffering period. This time impacts the initial delay. That is, if the buffer is sized such that playback only starts after X seconds of media have been accumulated, then the initial delay can be calculated as X plus the broadcasting overhead. The amount of time associated with the broadcasting overhead is variable. The most variable quantity is the time needed to send data from client device to server, since network conditions may be constantly fluctuating across multiple network connections. The encoding/decoding overhead is also variable to a lesser extent, depending on the complexity of the video.

In one embodiment, the size of the buffer may be dependent on at least one aspect of the transmission of the stream of data. In a more specific embodiment, the size of the buffer may be based on the broadcasting overhead (e.g., based on an estimate of the broadcasting overhead). For example, the size of the buffer may be based on the broadcasting overhead and/or based on variations in the broadcasting overhead. More specifically, if the network conditions in general are highly variable, then it may be reasonable to choose a larger buffer size in order to have sufficient "buffer".

There are different methods that may be used to assess network conditions as a means to determine the broadcasting overhead, since, as stated previously, the most variable aspect of the broadcasting overhead is bonding. One way is to use the advanced test connection phase, discussed previously, in order to establish how well individual network connections perform. After collecting this data, the broadcasting application on the client device may have sufficient information for determining what the ideal buffer size should be. One aspect of advanced test connection phase is to determine how long it takes for each individual packet sent in advanced test connection phase to be received by the server in real-time. The buffer size may be selected based on the worst result. For instance, if it took longer to send packet X to the server than any other packets, the client device may take this duration, add it to an estimate of the amount of overhead for encoding and decoding, and calculate an ideal buffer size that takes this into account.

Alternatively, in the event that the network conditions may be changing considerably during a broadcasting session, such as when the client device is mobile (e.g., the client device is in inside a moving vehicle), attempting to dynamically determine an ideal buffer size may produce inconsistent results. For example, if the client is in a moving vehicle during the broadcast, the network conditions may be constantly changing as different mobile broadband networks come in and out of range. The automatic determination of buffer size might be done entirely when the network conditions are excellent, and this could result in a buffer size that is too small for the entirety of the broadcast. In this kind of environment, it may be preferable to pre-select a fixed amount for the buffer size that is relatively high so as to have sufficient "buffer" to account for highly variable network quality.

For example, if the buffer size is two seconds, that means that after two seconds of raw media has been accumulated by the consumer (the initial buffering period), playback will start. If raw media that is ready for playback continues to be made available at the same rate that it was made available during the initial buffering period, then there should be no problems during the broadcast, and the buffer should continue to contain roughly two seconds worth of media during the lifetime of the broadcast. However, if the rate were to decrease, then the number of frames available for playback in the buffer will begin to decrease. While the buffer is sized such that it can accumulate two seconds worth of media, it may only be filled with 1.5 seconds of media. Thereafter, due to deteriorating network conditions, the amount of data in the buffer may decrease to 1 second, 0.5 seconds, and eventually 0 as the frames are all used up without being repopulated fast enough. If the number of frames in the buffer drops down to 0, then problems will occur as mentioned earlier. In this example, if the buffer size were instead four seconds, that may be sufficient padding to accommodate the highly variable network conditions. The buffer may start with 4 seconds worth of media, perhaps drops to 2 while the network takes a dive, and then climb back up to 4 seconds when the network stabilizes.

Choosing an ideal size for the buffer may be challenging from a user perspective. It is unlikely that users will have sufficient information and technical expertise to estimate the broadcasting overhead prior to starting a broadcast. One approach is to use a sufficiently large buffer size so as to account for most potential broadcasting overhead situations. Perhaps a buffer size of 5 seconds may be sufficient. In this case, if, for example, the broadcasting overhead is 1.5 seconds, this translates into the initial delay being 6.5 seconds (1.5 seconds of broadcasting overhead and 5 seconds to fill the buffer). However, the further and further the broadcast is removed from real-time, the harder it is for a studio to cue and manage a remote reporter using the broadcasting technology. If a reporter is supposed to appear on the air at a specific time (known as the hit), then in order for this to occur, the reporter must be cued in by someone at the station 6.5 seconds prior to the hit in order for it to appear as if the reporter is reporting "live". This requires resources at the television station that could be otherwise used for something else. In theory, someone must always cue the reporter in, regardless of the initial delay. However, if the initial delay is 2.5 seconds or less, the reporter may listen to the live broadcast over a phone (or other solution, such as an interruptible feedback (IFB), discussed below), and when the reporter hears his/her cue, that is, the point in the broadcast that immediately precedes the hit, the reporter starts. The hit does not technically arrive at the station for another 2.5 seconds or less. Therefore, this results in a short gap in the broadcast; however, this gap may be considered acceptable for TV broadcast purposes. Anything higher may be noticeable by viewers and would benefit from someone at the station precisely timing things.

In an alternate embodiment, the size of the buffer may be configurable by the user—such an approach was implied earlier in the context of a moving vehicle. In a specific embodiment, the user may directly configure the size of the buffer. For example, the user may be presented with a text box in the user interface of the client device allowing the input of a specific buffer size. If, for example, a buffer size of 2.5 seconds is specified, this means that, when the broadcasting session starts, the consumer (in this scenario, running on the server) will create a video buffer sized to store at least 2.5 seconds of video frames and an audio buffer sized to store at least 2.5 seconds of audio data. In an alternate specific embodiment, the user may indirectly configure the size of the buffer. As discussed above, the size of the buffer, along with the broadcasting overhead, dictate the initial delay in the replay of the media. Rather than specifying the buffer size in the user interface, the user may specify the delay instead. In response, it may be necessary to initiate a training session (using advanced test connection phase as described earlier) in order to estimate the broadcasting overhead. Once the broadcasting overhead is determined, this provides sufficient information to determine an appropriate buffer size to match the requested delay. For example, if the user chooses a delay of 4 seconds, and the broadcasting overhead is determined to be 1.5 seconds, then the buffers should be sized to store 2.5 seconds of media.

Any approach to sizing the raw media buffers that involves the use of a training session (e.g., using advanced test connection phase as described earlier) means that broadcasting cannot be started immediately when initiated by the user. Some amount of time is required to perform the training session, analyze the results, and make decisions based on these results. In contrast, if a fixed buffer size is chosen, as soon as the user initiates the broadcast, the broadcast has technically started. The consumer will not initiate media playback until the buffers have accumulated sufficient media, as specified by the fixed buffer size, but once this occurs, which is equal to the buffer size plus the broadcasting overhead, as discussed previously, playback begins. As such, it may be preferable to use a fixed buffer size in certain situations.

Networking conditions may be highly variable. When a broadcast begins, networking conditions across the different network connections in a transfer session may be excellent, easily allowing, for example, a 4 Mbps encoded video stream to be sent to the server. However, five minutes later, the situation could change for a myriad of reasons, and now, the combined throughput of the bonded network connections can only satisfy a 1.5 Mbps encoded video stream (in addition to the data needed to transfer encoded audio and any additional overhead). For example, in the case of mobile broadband, the carrier may be experiencing a lot more usage on the network (from other cellular customers) than was the case five minutes prior. The cellular signal may somehow have fluctuated. Alternatively, there may be Internet routing issues. Regardless, the networking conditions may vary.

Due to the variability of networking conditions, the bit rate used to encode media may be dynamically adjusted. For example, in one embodiment, the bit rate at which video is encoded (such as by using an H.264 encoder) may be dynamically adjusted. Typically, audio is encoded at a lower bit rate than video. Thus, dynamic bit rate adjustment may only focus on adjusting the video encoding bit rate. In an alternative embodiment, the bit rate at which audio is encoded may be adjusted. In still an alternative embodiment, the bit rate at which both video and audio are encoded may be adjusted.

Varying the bit rate varies the amount of encoded output data per time segment. As a general rule, as the bit rate of an encoded video stream goes down, the quality of the encoded video stream goes down as well. In addition, as the bit rate of an encoded video stream goes up, the quality of the encoded video stream also goes up, although, if the bit rate is increased beyond a certain point, the perceivable quality will only go up slightly or not at all.

One embodiment comprises determining whether (and/or by how much) to vary the bit rate. In a more specific embodiment, this determination may be performed by the consumer alone. For example, when broadcasting video from the client device to the server, the consumer may request adjustments to the bit rate based on at least one aspect of the processing of the video by the consumer (e.g., a comparison of the number of video frames currently stored in the buffer versus the number of video frames that can be stored in the buffer). The consumer can only make bit rate adjustment requests, since it is the producer, running on the client, that is responsible for encoding video. In an alternate more specific embodiment, this determination may be performed by the producer alone. For example, when broadcasting video from the client device to the server, the producer device may decide to modify the bit rate in response to being informed by the CMC of a problem with one of the network connections in the transfer session, as discussed in more detail below. In yet an alternate more specific embodiment, this determination may be performed by the producer and the consumer (e.g., in one instance, the producer may determine whether to vary the bit rate and in another instance, the consumer may determine whether to vary the bit rate). In this regard, this determination (whether by the producer, the consumer, or both the producer and the consumer) may dictate when the bit rate should be incremented or decremented and by how much.

As discussed above, one manner to vary the bit rate is by consumer-controlled bit rate adjustment requests. In the broadcasting context from client device to server, the consumer may control the bit rate adjustments. As previously discussed, the consumer maintains a circular buffer of video frames that are ready to be played out over SDI. In determining whether and how much to vary the bit rate, the consumer may analyze at least one aspect of the buffer (such as the "health" of the buffer). Since the producer, running on the client device, is performing the encoding in the broadcasting context, the consumer, running on the server, may inform the producer of a bit rate change request in order to effect the bit rate change.

The consumer may analyze the buffer to generate an indication of how much the buffer is filled. For example, the buffer may be sized such that it can contain X video frames and the buffer may currently have Y video frames stored therein. Y may be examined in reference to X in order to generate the indication of how much the buffer is filled. This examination may generate different categories of healthiness for the buffer. Examples of healthiness include but are not limited to:

Very healthy: $(7/8)*X<Y$
Moderately healthy:
if $X \leq 120$: $(1/2)*X<Y \leq (7/8)*X$
if $X > 120$: $(11/120)*X<Y \leq (7/8)*X$ If the value Y does not fit into either the very healthy or moderately healthy categories defined above, then the video buffer may be considered unhealthy. The above formulae are merely for illustration. Other rules for assessing the state of the buffer are contemplated.

The video buffer may also experience various levels of unhealthiness, discussed in more detail below. The various levels of healthiness or unhealthiness of the buffer are merely for illustrative purposes. Other indications are contemplated.

The consumer may request a bit rate increment depending on the level of healthiness of the buffer and/or depending on the current bit rate. For example, the consumer may request a bit rate increment only if the state of the buffer remains in either healthy category for a sufficient amount of time. The sufficient amount of time that the consumer waits may depend on the current bit rate. For example, the higher the current bit rate, the longer the amount of time that the consumer may wait between bit rate increments. In this regard, it is more difficult to get to the higher bit rates, since the buffer must remain in the healthy state for longer periods of time as the bit rate is increased. This is by design, since there is more risk associated with higher bit rates. In one embodiment, the consumer may not request a bit rate increment past a certain implementation-defined max bit rate.

In one embodiment, the max bit rate is static. In an alternate embodiment, the max bit rate varies. For example, the max bit rate may change depending on the number of active connections in the transfer session (e.g., the connections sending actual data, not test mode packets). More specifically, if there is only a single active connection transferring data, the max bit rate may be set at a fairly low value to ensure that a single connection is capable of sending both video and audio data. With two connections, the max bit rate may be raised a bit higher, then a bit higher for three connections, and may finally max out at four or more connections. If the current bit rate is currently set to the max bit rate, no further bit rate increments may be requested.

If, at the end of the variable time period between bit rate increments, the buffer is in the very healthy state (and also remained in either healthy category during the duration of the time period), the consumer may request that the producer increase the bit rate.

In one embodiment, the bit rate increment may be predetermined and static. In an alternate embodiment, the bit rate increment that is requested may be variable. More specifically, the bit rate increment may be dependent on the current bit rate. For example, if the current bit rate is relatively low, the bit rate increment requested may be proportionally larger than if the current bit rate is relatively high. In one implementation, the lowest bit rate used is 1 Mbps, and this is the bit rate at which the broadcast is generally started. In another implementation, the starting bit rate may be greater than 1 Mbps. As discussed above, a training session (e.g., by using advanced test connection phase) may be used to automatically calculate the buffer size. This training session may also be used to set the starting bit rate at a rate greater than 1 Mbps as well, resulting in higher quality from the start of the broadcast than is possible with a 1 Mbps bit rate.

However, if, at the end of the variable time period, the buffer is in the moderately healthy category, a bit rate increment may not be requested. Instead, it will reset the timer and start over checking the health of the buffer during a predetermined time period. In one embodiment, the predetermined time period remains the same. In an alternate embodiment, the predetermined time period may be increased to a higher value than used previously for the time period.

If the state of the buffer ever drops into the unhealthy category, in one embodiment, a bit rate decrement may be immediately requested by the consumer, unless the bit rate is already at its lowest allowed value (1 Mbps is the lowest bit rate in one implementation). Alternatively, a bit rate decrement is requested in response to the buffer being in the unhealthy category for a predetermined amount of time.

In one embodiment, the decrement of the bit rate may be predetermined and fixed. In an alternate embodiment, the amount of the decrement in the bit rate may be variable. The varying amount of the decrement in the bit rate may depend on one or more factors, such as the size of the buffer and/or the number of active connections. For example, if the buffer size is relatively small (e.g., less than 2.5 seconds worth of media), the bit rate may be dropped to the lowest allowed value. With relatively small buffer sizes, after half of the buffer has been drained, little time remains in the buffer, and it is safer to drop the bit rate down to its lowest possible value in order to give the buffer the best chance of recovering. If the buffer size is not relatively small, the bit rate may be decremented down to fixed values in the range of the maximum bit rate to the minimum bit rate. For example, if the current bit rate is greater than or equal to 3 Mbps, the bit rate may be dropped to 2.5 Mbps. If greater than or equal to 2.75 Mbps (and less than 3 Mbps), the bit rate may be dropped to 2.25 Mbps. The step-wise decrement approach may be extended further down the line.

In addition, if the number of active connections drops below a certain number of connections (such as four connections), this may result in a new maximum bit rate (as described previously), which may necessitate an immediate bit rate drop depending on the current bit rate. In this regard, the bit rate may be determined based on one or more criteria, such as the healthiness of the buffer and/or the number of active connections.

If the consumer requests that the producer change the bit rate, after this point, the consumer will not request any further bit rate adjustments until the producer has changed the bit rate and notified the server of this bit rate change.

As discussed above, the determination whether to change the bit rate may be determined by the producer. For example, in the broadcasting example from the client device to the server, the producer may adjust the bit rate based on a change in at least one aspect of the connection and/or based on a change in at least one aspect of the multiple connections. More specifically, the producer may adjust the bit rate in response to certain predetermined events for a connection, such as: a connection has been terminated and/or connection has entered into test mode. In an alternate embodiment, the producer may analyze the data transfer session across multiple network connections (such as the data transfer as a whole) in order to determine whether to adjust the bit rate (such as decrease the bit rate).

In a more specific embodiment, in response to the producer determining that the overall throughput of the bonded network connections is decreasing, the producer may initiate a bit rate change. The analysis of the throughput may be performed by the producer at multiple times, with a first time analyzing to determine a first aggregate throughput and a second time analyzing to determine a second aggregate throughput. The producer may then compare the first throughput with the second throughput in order to determine whether the throughput is decreasing. And, in response to determining that the throughput is decreasing (such as decreasing by more than a predetermined amount), the producer may initiate a bit rate decrement. As discussed above, the decrease in the bit rate may be static or may be dynamic. As one example, the decrease in the bit rate may be predetermined regardless of the amount of decrease in the throughput. In another embodiment, the decrease in the bit rate may be dynamically determined based on the amount of decrease in the throughput. In this regard, rather than waiting for the consumer to instruct the producer to drop the bit rate, the consumer may do so proactively.

The CMC may notify the broadcasting bonding application of the change in the state of the connection (e.g., termination or entry into test mode), along with the number of active connections left in the transfer session. This may occur on either the client device or the server or both.

In one embodiment, the amount of change in the bit rate determined by the producer may be predetermined and fixed. In an alternate embodiment, the amount of change (e.g., the decrement) in the bit rate may be variable. In one aspect, the amount of change may be dependent on the number of active connections and/or the most recent non-zero throughput value of the problematic connection (in the example of a dropped connection triggering the bit rate change, the amount of change in the bit rate may be equal to the most recent non-zero throughput of the connection). For example, if, as a result of the dropped connection, there are less than four active connections left in the transfer session, the bit rate may be immediately dropped such that the amount decremented is equal to the most recent throughput value for the dropped connection, although the bit rate may not be dropped below the minimum bit rate.

Regardless of the origination of the bit rate change (e.g., producer or consumer), since the producer is encoding video, it is responsible for applying the bit rate change. To do so, the producer drains the encoder of already encoded video frames that have been encoded using the current bit rate. While the drain operation is ongoing, no new raw video frames may be added to the encoder. As soon as the drain operation is completed, the new bit rate is set in the encoder and raw frames continue to be passed to the encoder for encoding. Since no new frames can be passed to the encoder during the drain operation, this slightly reduces the efficiency of the encoder while the drain operation occurs, and new frames will simply accumulate in a buffer in the producer until it completes. As such, it is advisable to minimize the number of bit rate changes initiated during a relatively short period of time. If the encoder spends more time draining than encoding frames, then this will have a negative impact on the broadcasting session.

Figure 15:
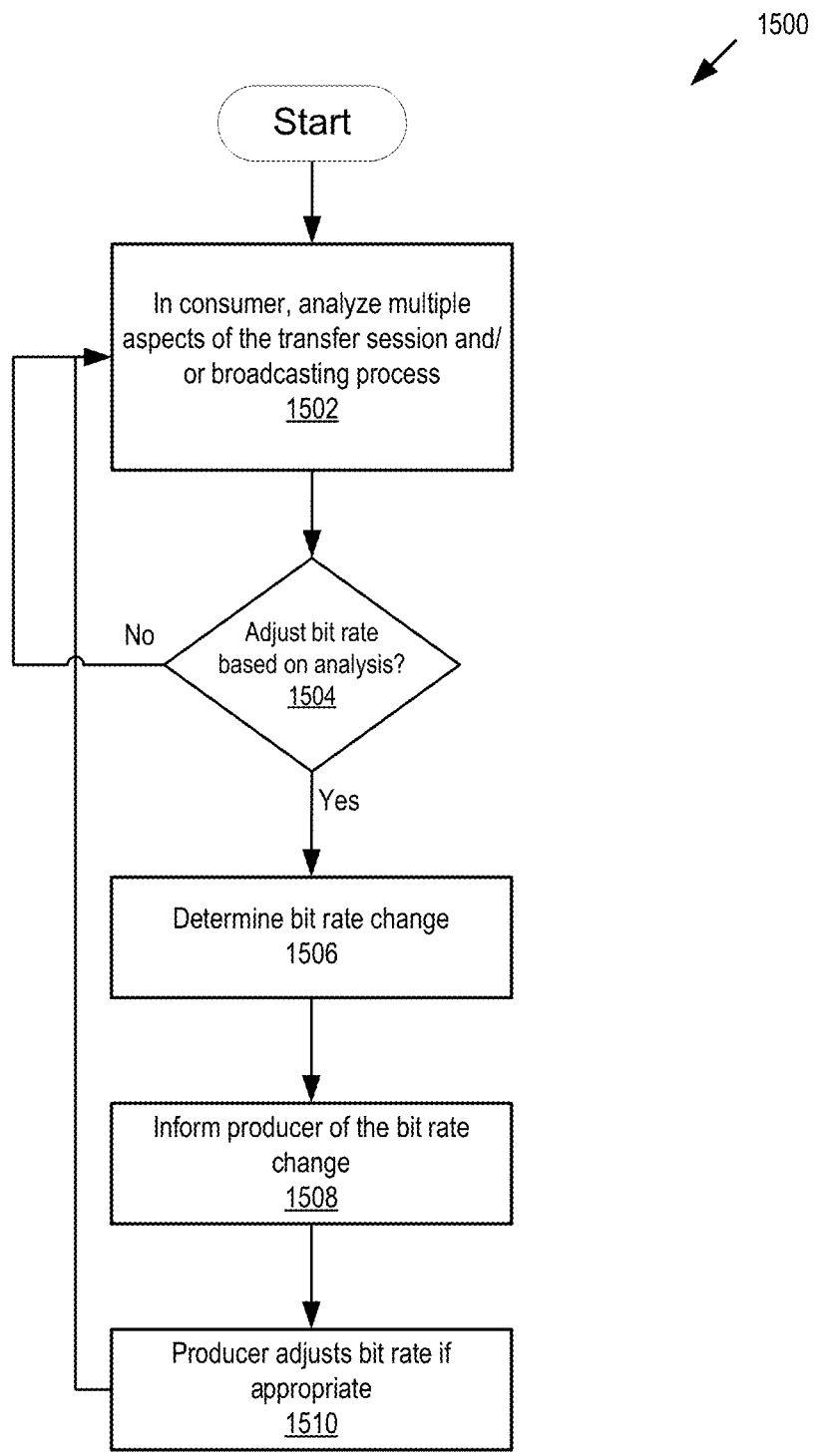
FIG. 15 illustrates a flow diagram for the broadcasting consumer. The broadcasting consumer may analyze multiple aspects of the transfer session and/or its own internal data to determine whether to adjust the bit rate of encoded media.
Figure 16:
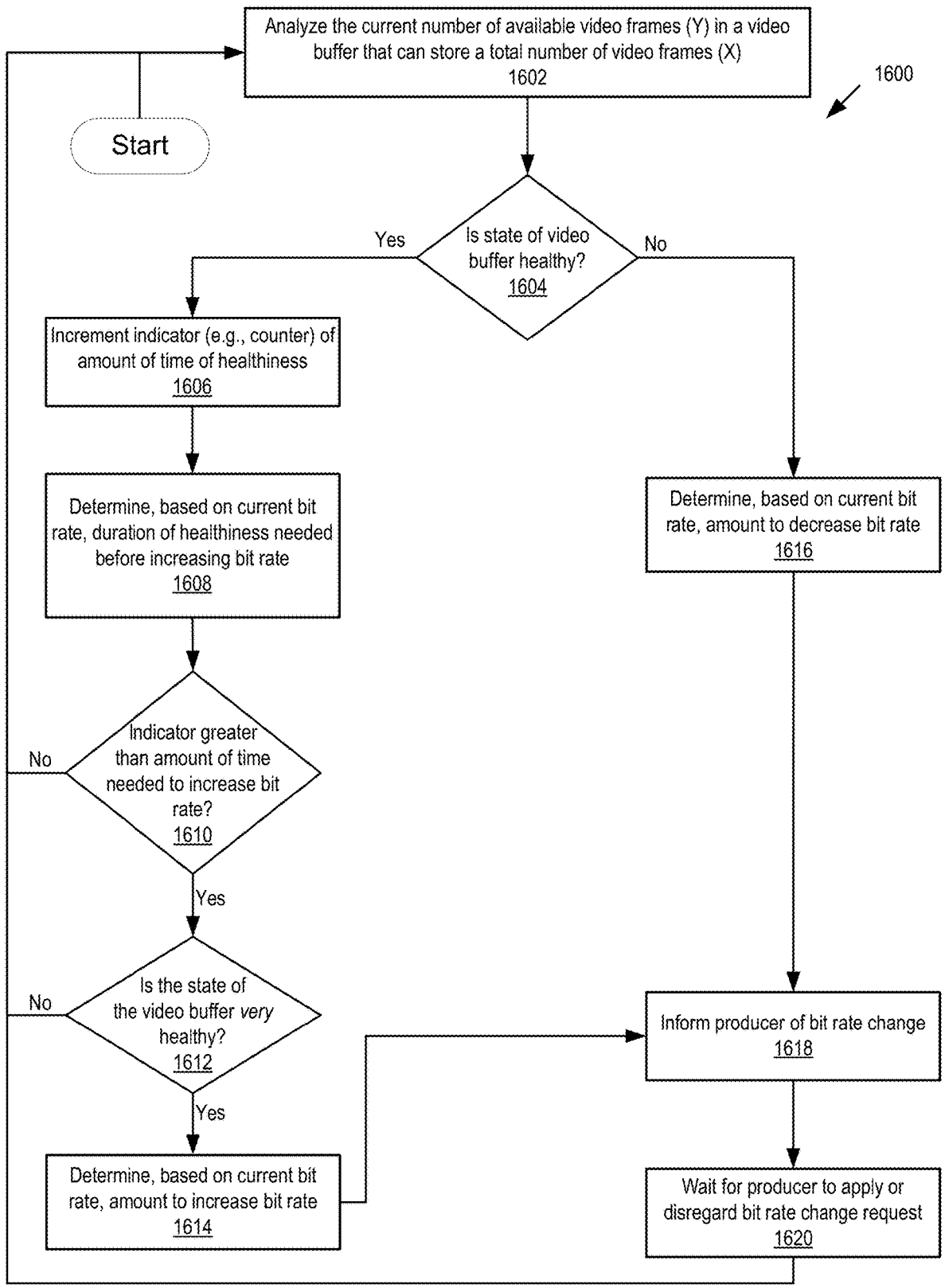
FIG. 16 illustrates one example of a flow diagram for the broadcasting consumer to analyze the health of its video buffer in order to determine whether or not to adjust the bit rate.
Figure 17:
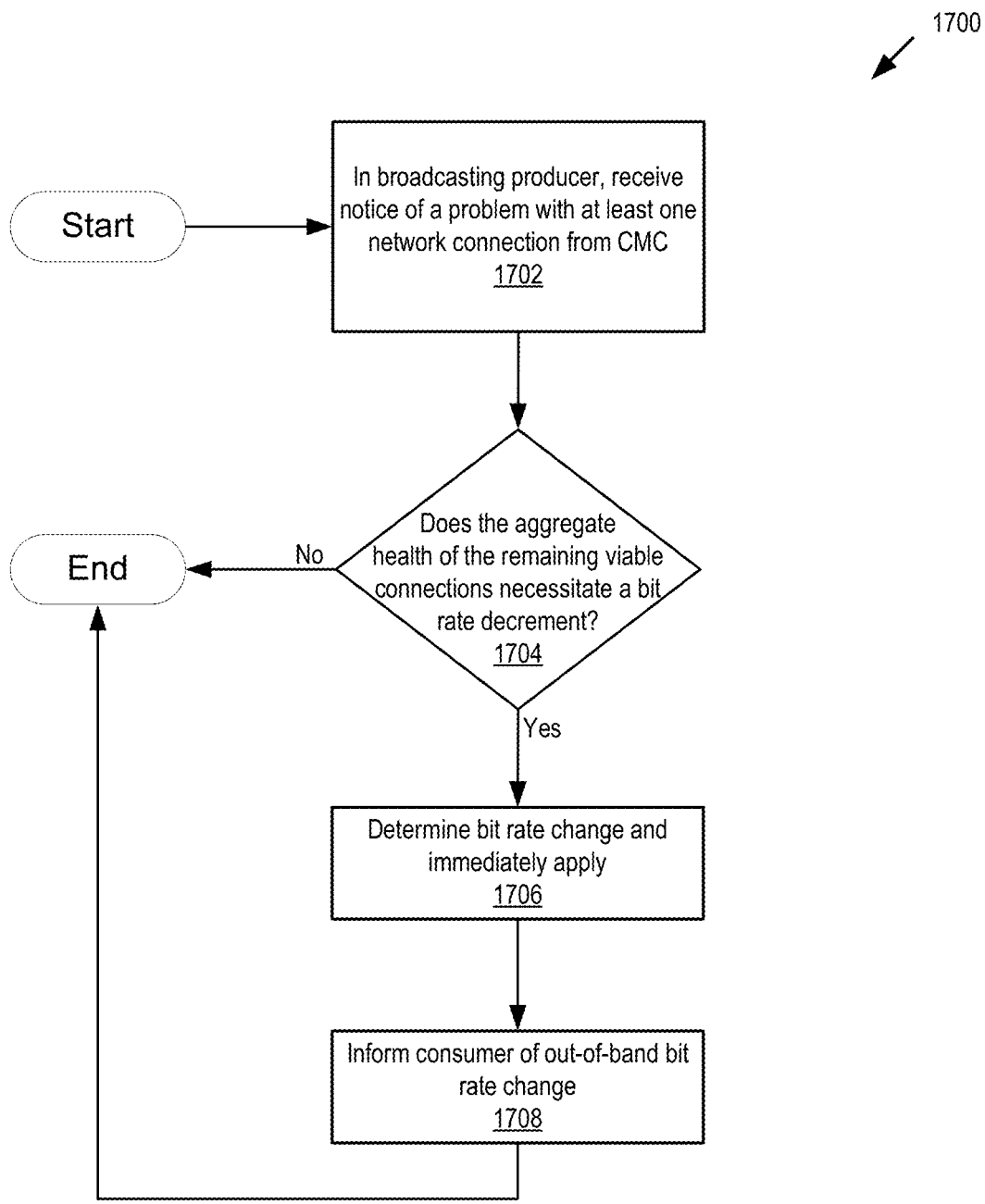
FIG. 17 illustrates a flow diagram for the producer to potentially make out-of-band bit rate decrements based on notifications from the CMC about the state of the network connections.

FIGS. 15-17 illustrate different ways in which to determine whether and/or how to change the bit rate. FIG. 15 illustrates a flow diagram 1500 for the broadcasting consumer. The broadcasting consumer may analyze multiple aspects of the transfer session and/or its own internal data to determine whether to adjust the bit rate of encoded media. At 1502, at least one aspect of the transfer session and/or the broadcasting process are analyzed by the consumer. At 1504, based on the analysis, it is determined whether to modify the bit rate. If no, the flow diagram 1500 loops back to 1502. If yes, at 1506, the bit rate change is determined. At 1508, the producer is informed of the determined bit rate change. At 1510, the producer adjusts the bit rate if appropriate. In the context of the broadcasting application, this step may occur on the client device, whereas the previous steps may occur on the server. Finally, the flow diagram loops back to 1502, and the process continues throughout the broadcasting session.

FIG. 16 illustrates one example of a flow diagram 1600 for the broadcasting consumer to analyze the health of its video buffer in order to determine whether or not to adjust the bit rate. All the steps in this flow diagram are performed from the perspective of the consumer. At 1602, the current number of video frames in the video buffer that are available (Y) is analyzed versus the total number of video frames that can be stored in the video buffer (X). Based on this analysis, at 1604, it is determined whether the state of the video buffer is healthy. If yes, at 1606, an indicator of the amount of time of healthiness is incremented by one. Further, at 1608, based on the current bit rate, the duration of healthiness needed before increasing the bit rate is determined. At 1610, it is determined whether the indicator from 1606 is greater than the amount of time of healthiness needed before increasing the bit rate. If no, the flow diagram loops back to 1602. If yes, at 1612, it determines if the state of the buffer is very healthy (distinguished from moderately healthy as described earlier). If not, the flow diagram loops back to 1602. If yes, at 1614, the amount to increase the bit rate is determined based on the current bit rate. At 1618, the producer is informed of the bit rate change. Then, at 1620, the consumer waits for the producer to apply or disregard the bit rate change request. The flow diagram then loops back to 1602. The consumer may disregard the bit rate change request in the event that the consumer has also initiated a competing bit rate change at around the same time. As previously discussed, the consumer may initiate bit rate changes as well. Consumer-initiated bit rate changes may generally take precedence over bit rate change requests from the producer.

If instead, at 1604, it is determined that the state of the buffer is not healthy, at 1616, the amount to decrease the bit rate is determined based on the current bit rate. It then proceeds to 1618 and proceeds from there as already described.

FIG. 17 illustrates a flow diagram 1700 for the producer to potentially make out-of-band bit rate decrements based on notifications from the CMC about the state of the network connections. All steps in this flow diagram are performed from the perspective of the producer. At 1702, a notice from the CMC is received by the producer that there is a problem with at least one network connection. At 1704, the producer determines if the aggregate health of the remaining viable network connections necessitates a bit rate decrement. If not, the flow is finished. If yes, at 1706, the bit rate is immediately decreased based on the analysis. At 1708, the consumer is informed of the out-of-band bit rate change—that is, a bit rate change that was not requested by the consumer. At this point, the flow ends.

Figure 18:
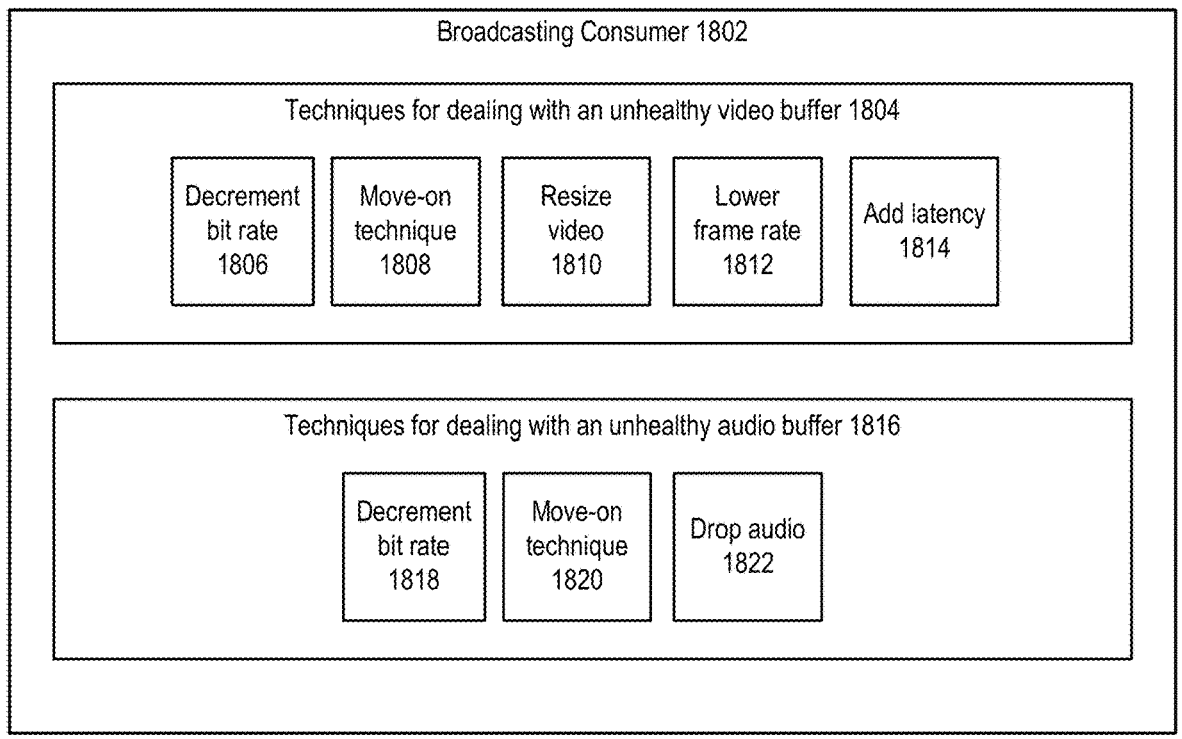
FIG. 18 illustrates a block diagram of some of the techniques that are used for dealing with unhealthy media buffers in order to bring the media buffers back to a healthy state.

As discussed above, the state of the video buffer in the consumer may trigger a change in the bit rate. For example, a healthy state of the buffer may result in an increase in the bit rate, whereas an unhealthy state of the buffer may result in a decrease in the bit rate. In addition, various other techniques may be utilized that are dependent on the state of the buffer, particularly when the buffer is in the unhealthy state. FIG. 18 illustrates a block diagram 1800 of some of the techniques that are used for dealing with unhealthy media buffers in order to bring the media buffers back to a healthy state. Such techniques are described as being performed by the broadcasting consumer 1802, although some of the techniques may necessitate involvement from the consumer (e.g., changing the bit rate). Examples of techniques for dealing with an unhealthy video buffer 1804 include, but are not limited to, the following: decrement bit rate 1806; move-on technique 1808; resize video 1810; lower frame rate 1812; and add latency 1814. In addition, even though it has not been elaborated earlier, it is possible for the audio buffer to enter an unhealthy state. In the case that the audio buffer is in an unhealthy state, there are also some techniques 1816 that may be used to improve its health. Examples of such techniques include, but are not limited to, the following: decrement bit rate 1818; move-on technique (for audio) 1820; and drop audio 1822. Each of these techniques will be discussed in more detail below.

The decrement bit rate technique as an approach for dealing with an unhealthy video buffer has already been described in detail. This may be the primary technique for dealing with an unhealthy video buffer. A similar technique may be used for audio and would work similarly. However, very little might be gained from doing so, since the audio bit rate may be very low to begin with (e.g., 128 kbps).

The resize video technique may be used in the case that bit rate decrements are not sufficient, even down to the minimum video bit rate (e.g. 1 Mbps). If the aggregate health of the different network connections in the transfer session is not sufficient to even handle the minimum bit video bit rate, the consumer may request that the producer resize video frames to use a smaller frame size prior to encoding them. Resizing a video frame in this fashion reduces image quality, since pixel data is lost through the resize operation. However, such resized video may be encoded at an even lower bit rate than the minimum bit rate that is typically used. The aggregate health of the different network connections may be sufficient to accommodate this lessened bit rate. On the consumer side, after decoding resized video, the resulting frames are resized back to the original resolution, since the broadcast is expected to output over SDI the same video format as used by the actual input media. The original pixel data that was lost due to the original resize operation will not be restored by this operation, although it may be possible to use interpolation to estimate missing pixel data as part of the resize operation. In addition, if the aggregate health of the network connections improves, the consumer may notice this and request that the producer restore the original frame size. It is important to note that a change to the frame size typically will result in the need to drain the H.264 encoder prior to applying the change.

The resize video technique is relatively straightforward for progressive video, but a direct resize of a video frame will not work properly for interlaced video. Generally, interlaced video must be de-interlaced first prior to resizing. Alternatively, either the top or bottom fields of an interlaced frame may be considered independently, and individual fields may be considered as targets for a resize operation without de-interlacing. On the consumer side, in addition to having to resize the video to get it back to the original frame size, it may be necessary to de-interlace as well.

It is important to note that a technique like resizing video increases the broadcasting overhead, since it represents an additional step that both the producer and consumer need to perform, and this takes time. If de-interlacing is required, this further increases the broadcasting overhead.

The lower frame rate technique may also be used in the case that bit rate decrements are not sufficient, even down to the minimum video bit rate (e.g. 1 Mbps). If the aggregate health of the different network connections in the transfer session is not sufficient to even handle the minimum bit video bit rate, then the lower frame rate technique may be a good choice, and it may be possible to use this technique without increasing the broadcasting overhead, unlike the case of the resize video technique.

The frame rate at which video is encoded is easily modified for progressive video. For example, halving the frame rate means that every other frame should be dropped. No special analysis need to be performed to do this. Any time the frame rate is divided by an integer (2, 3, 4, etc.), the frame rate conversion is easily applied (e.g., if divided by 3, one frame is kept and the next two are dropped and the cycle repeats). If, however, the H.264 encoder is configured to use this new frame rate, as opposed to the original frame rate associated with the input media, and with the same bit rate scheme as utilized with the original frame rate, then the H.264 encoder will simply pack more detail into each frame, satisfying the requested bit rate. For example, if the H.264 encoder would have been configured for 720p59.94 at 1 Mbps, and it is instead configures at 720p29.97 at 1 Mbps, it will still generate a 1 Mbps video stream but will instead pack more detail into each encoded frame. Instead, what is needed is to configure the H.264 encoder to use 720p29.97 at 0.5 Mbps or to configure the H.264 encoder to use 720p59.94 at 1 Mbps but feed it frames at half the normal rate. In the latter case, it will only pack detail into each encoded frame as if the frame rate is 59.94 fps, even though the encoder is only being fed every other frame. Being used this way, the encoder effectively generates half of the data it would normally generate. So, for example, at a starting bit rate of 1 Mbps, the actual amount of data for the video stream is closer to 0.5 Mbps.

When the effective frame rate is reduced, frames are not removed from the consumer video buffer as quickly. This makes it more likely that the buffer will recover in the case of poorly performing network connections. In terms of video quality, 29.97 fps is generally more than adequate for a news program; however, the quality may not be appropriate for some types of television broadcasts. In one embodiment, the hardware decoder may provide a feature that permits the intelligent reconstruction of the missing frames at decoding time, which would make it possible to get back to a 59.94 fps frame rate.

Further, in the case of interlaced video, reduction of the frame rate is different from the frame rate modification as described above. Instead, in the instance of halving the frame rate, the "half frame rate" technique for interlaced video may comprise encoding only the top field as progressive video, similar to one of the approaches discussed for resizing interlaced video earlier. For example, with 1080i59.94, an interlaced video frame is delivered every 1/29.97 seconds (so that there are 29.97 interlaced video frames per second). The top field in a 1080i frame was captured at a different time period than the bottom field, with the field rate being 59.94 fields per second. Hence, the "59.94" in 1080i59.94 corresponds to the field rate, not the frame rate, as is the case with progressive video. Thus, if just one of the two fields is considered and only this field is considered, the resulting frame may be treated as a progressive frame and encoded as progressive (such as encoded using H.264 encoders, which may be more adept at encoding progressive video than interlaced video). On the consumer side, the consumer decodes the video as progressive video and reassembles an interlaced frame by copying the contents of the top field into the bottom field of an interlaced frame. As such, the original video mode is maintained while only half the data is encoded. In this context, half of the video data is lost, resulting in a reduction in quality; however, the reduction may not be noticeable to viewers.

Up till this point, the resize video and lower frame rate techniques have been discussed in the context of dealing with an unhealthy buffer. However, either or both of these techniques may be applied from the start of a broadcasting session and configured to do so by the user. For example, the user could choose to turn on a "half frame rate" mode, which may be a good choice in the case that the client device is in a moving vehicle or in any situation in which the networking conditions are expected to be highly variable. The user may also configure the broadcasting session to resize all video to perhaps ½ the frame size or ¼ the frame size, which, respectively, result in a pixel count that is ¼ or 1/16 of the original pixel count. In this sort of configuration, these techniques are not applied dynamically and are instead always on.

Another technique to ameliorate an unhealthy video buffer comprises the "move-on" technique. On occasion, the circular buffer of video frames that are ready to be played out over SDI may drop into the unhealthy state, as discussed previously. This may result in an immediate bit rate decrement request sent to the producer; however, it is important to note that this is simply the request. It takes some time for the producer to make the bit rate change and then notify the consumer that the change has taken place. The number of frames in the buffer may continue to drop. It is important that the number of frames in the buffer not go down to 0 if at all possible, as previously mentioned. In response to certain predetermined conditions of the buffer, the "move-on" technique may be used to reduce the possibility that this occurs.

The following is an example of the "move-on" technique. With bonding, data packets may arrive out of order. For example, video packets 1 and 3-10 may have arrived in the buffer, but the buffer is missing packet 2. The consumer reads the data in packet 1, but then stops making progress, because packet 2 has not been received yet. If the "move-on" technique is applied, the broadcasting application may skip past packet 2 and continue with packet 3, allowing it to make progress. Packet 2 may contain important data, but the H.264 decoder that is being used may be somewhat resilient and can handle some data loss. Using this technique may result in some garbled video when played out over SDI, however. As such, it may only be used if the number of frames ready to be played drops below a certain threshold, as described below (using the quantities X and Y as mentioned earlier):

"Move-on" technique criteria:
if X<110: Y≤(X*2)/5
if X≥110: Y≤44

The above formulae are merely for illustration. Other rules for triggering the "move-on" technique are contemplated.

In one embodiment, the "move-on" technique may only be applied if there is a gap of a single packet with another packet that has already been received immediately after it. If two or more consecutive packets are missing, then the technique will not be applied. In an alternate embodiment, the "move-on" technique is applied if there is a gap of more than one packet, such as a gap of two packets.

Further, in one embodiment, the broadcasting application may skip past the missing packet, such as discussed above. In an alternative embodiment, the broadcasting application may insert a duplicate packet, such as the packet immediately preceding the missing packet or the packet immediately following the missing packet. In the example above where packet 2 is missing, the contents of packet 1 or packet 3 may be duplicated and inserted into the place in the buffer for packet 2.

The "move-on" technique discussed above is directed to video. A similar "move-on" technique may also be applied for audio. In one embodiment, if the number of available audio samples goes below an implementation-defined threshold, and there is a gap of only one audio packet that is missing, the "move-on" technique for audio will be applied, and this packet will be skipped. Because entire samples may be encapsulated in an audio packet, when this is done, some audio will simply be lost, but unless this technique is applied very frequently, it is unlikely to be noticeable by the viewer. In an alternate embodiment, if the number of available audio samples goes below an implementation-defined threshold, and there is a gap of more than one audio packet (such as two audio packets) that are missing, the "move-on" technique for audio will be applied, and these packets will be skipped.

Still another technique to combat an unhealthy video buffer comprises the add latency technique. In one embodiment, the trigger to determine whether to apply the add latency technique may be based on an analysis of the buffer. In one embodiment, the analysis of the buffer may be at a single point in time. For example, if the current state of the buffer is very unhealthy, the add latency technique may be applied. In an alternate embodiment, the analysis of the buffer may be at different points in time. For example, the analysis of the buffer may conclude that the health of the buffer is deteriorating. More specifically, if the number of frames available to be played continues to drop, it may be necessary to add some latency into the video playback over SDI. That is, instead of playing the next frame in the circular buffer immediately, the broadcasting application may push it out such that there is a gap of 2, 3 or 4 frames between the last frame played and this frame. During this gap, the screen is not refreshed, and the previous frame remains on the screen. This has the effect of pushing the server further out from real-time compared to the client so that the delay increases. This may or may not be noticeable to the viewer depending on how much latency needs to be added. In addition, the audio is pushed out the same amount to ensure that video and audio remain in sync. The add latency technique may be applied as follows:

Add latency technique criteria:
if X<110: Y≤(X/5)
if X≥110: Y≤20

The above formulae are merely for illustration. Other rules for triggering the add latency technique are contemplated.

Further, in one embodiment, in response to determining to use the add latency technique, the broadcasting application may push it out such that there is a gap of a predetermined number of frames between the last frame played and this frame. The predetermined number may be 2 or 4 frames, for example. In an alternative embodiment, in response to determining to use the add latency technique, the broadcasting application may first determine the number of frames to generate a gap between the last frame played and this frame. The number of frames determined may be based on the state of health of the buffer (such as the state of the buffer at a single point in time or the state of the buffer across multiple points in time). The more unhealthy the buffer, the greater the gap that may be generated.

In addition, in one embodiment, once the number of frames is determined (whether predetermined or variable), the broadcasting application may push video out by this number of frames all at once. For example, if the determined number of frames is 4, the video may be pushed out by all 4 frames at once. In an alternate embodiment, once the number of frames is determined, the broadcasting application may push the video out gradually. The gradual push out of the frames may be less noticeable to the viewer.

Even after requesting that the bit rate be dropped, applying the "move-on" technique, and adding latency, or using other techniques, it may still be impossible for the consumer to prevent the buffer from being completely exhausted. In the event that no frames remain in the buffer, and it is now time to play the next frame, the consumer can do little in this case. For this to happen, the quality of the network connections would likely be very poor and/or the combined throughput of the network connections would not be sufficient to send the video and audio streams.

When this situation occurs, the consumer may simply keep the last frame that was played up in the display (i.e., playback will freeze). As soon as the next frame becomes available, it may push it out a sufficient amount in order to accumulate a buffer worth of frames. There is little point in playing this frame immediately, as it is unlikely that another frame will be ready by the time the frame after this frame should be played, which would necessitate adding more latency. It also must recalculate the delay, which may be significant depending on how long it has been since the last frame was played.

In a broadcasting bonding application, both audio and video data are transmitted. In one embodiment, the audio and video data are not interleaved in the same packet. There are separate audio stream data packets and video stream data packets. When the CMC on the server receives an audio packet, it is added at the proper location in an audio-only circular buffer in the consumer. The same approach is used for video packets. In addition, there may be separate software threads in the consumer for handling audio and video which are used to decode the data into raw audio samples and raw video frames, respectively, which are each added to the respective circular buffers that are ready to play out over SDI (the circular buffer used for video was discussed above; the circular buffer used for audio works in a similar fashion). Additionally, the span of time associated with an audio sample may be different from that associated with a video frame. Each video frame should play for the same amount of time, since the frame rate is constant. In contrast, an audio sample is comprised of many different audio "frames", and the number of "frames" in an audio sample may vary. In addition, audio may not necessarily be sampled continuously on the client, unlike video. So, there may be very short gaps between audio samples during which no audio should be played. However, regardless of all of this, the first audio sample is guaranteed to start at the same time as the first video frame.

Given the above information, after accumulating a sufficient buffer of audio samples and video frames that are ready to be played out over SDI in the consumer, the consumer will issue a command to the SDI playback hardware to start both video and audio playback simultaneously. Subsequent video frames may be played back out at the same rate, and subsequent audio samples may be scheduled based on each sample's start time. In theory, this should be sufficient to ensure that audio and video remain synchronized.

As mentioned earlier, in the case that the add latency technique is used, audio is also pushed out the equivalent amount of time associated with the frame push out in order to ensure audio/video synchronization.

The consumer assumes that there are no gaps between video frames that are ready to be played back. That is, if the next two video frames to be played are frames 1 and 2, when originally captured on the client device, they would also have been consecutive frames. However, this may not always be the case. At a broadcast standard frame rate of 59.94 fps, that means that new frames should be received from the video input source every 0.01668 seconds. That is, there is a 0.01668 second gap between each video frame. But, there could be something that slows the frame grabbing process down on the client device temporarily, resulting in a gap of 5 frames, or 0.0834 seconds, between frame 1 and the next frame, which is technically frame 7, but may appear to be the next frame. If the consumer is not informed of this, it will play frame 7 as if it were actually frame 2, and if this kind of thing happens a sufficient number of times during a broadcast, video will become out of sync with audio (video will play before audio), since audio samples are always played using the start time of a sample, whereas video frames are played continuously. The producer detects this situation by comparing the time stamp of the current frame against the time stamp of the last frame that it received, and if the time stamp is greater than the time gap that is supposed to be used given the frame rate, the producer may inform the consumer that there is a video frame gap at the appropriate location. When the consumer notices this, at the point at which it gets to frame 7 (or rather, what it thinks is frame 2 in this example), it will schedule the frame to play not immediately but with a five frame gap. As such, frame 1 will appear for a total of six frame lengths. In this regard, video will temporarily freeze; however, it may not be noticeable if the number of missing frames is relatively low.

Figure 19:
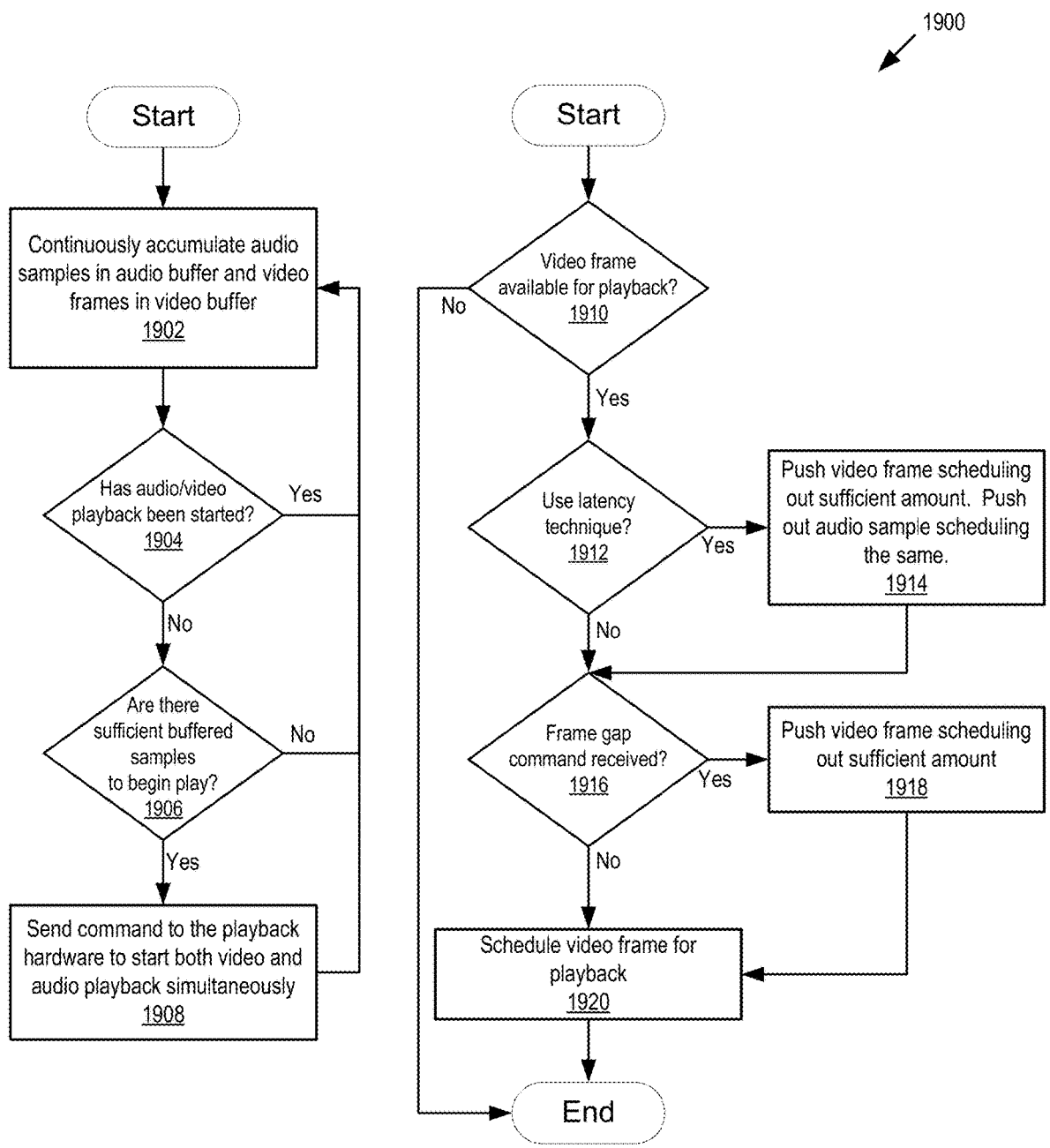
FIG. 19 illustrates two concurrent flow diagrams for synchronizing audio and video playback and for video playback.

FIG. 19 illustrates two concurrent flow diagrams 1900 for synchronizing audio and video playback and for video playback. Both flow diagrams would typically be operating at the same time, likely on different software threads. All the steps in each flow diagram are performed from the perspective of the consumer. In the first flow diagram, at 1902, the consumer continuously accumulates audio samples in the audio buffer and video frames in the video buffer. At 1904, it checks if audio/video playback has already been started. If yes, the flow diagram loops back to 1902. If not (as would be the case when initially starting a broadcast session), at 1906, it checks if there are sufficient buffer samples to begin playback. If not, the flow diagram loops back to 1902. If yes (which means that the requested buffer size worth of media has been accumulated, as discussed previously), at 1908, it sends a command to the playback hardware to start both video and audio playback simultaneously. Finally, it loops back to 1902.

At this point, the second flow diagram may start while the first flow chart continues to operate for the purpose of continuously accumulated raw media that is ready to be played back in the audio and video buffers. In the second flow diagram, at 1910, it checks if a video frame is available for playback. If not, the flow ends. If yes, at 1912, it checks if the add latency technique needs to be used. If yes, at 1914, it pushes video frame scheduling out a sufficient amount. It also pushes out audio sample scheduling the same amount. It then proceeds to 1916. It also proceeds to 1916 in the case that the latency technique was not used at 1912. At 1916, it determines if a frame gap command was received. If yes, at 1918, it pushes video frame scheduling out a sufficient amount. It then proceeds to 1920. It also proceeds to 1920 in the case that a frame gap command was not received at 1916. Finally, at 1920, it schedules the video frame for playback and terminates. This flow is expected to be repeated multiple times, but typically the scheduling of each frame is considered to be a separate process, so that is why it does not loop continuously the second flow diagram in FIG. 19.

As discussed above, a bonding application, such as broadcasting, provides the following components in order to interact with bonding: an initiator (e.g., used on the client system to initiate a broadcast session with the server); a receptor (e.g., used on the server system in combination with the initiator on the client system to setup the broadcast session). In addition, one or more producers and consumers may also be provided.

The following may comprise producer/consumer combinations:

Data flow direction: client device to server: a producer on the client device, used to generate audio and video packets and make them available to the bonding layer for sending to the server. Also, the producer may be used for a limited number of special packets (like the packet used to inform the consumer of a video bit rate change); a consumer on the server, used to consume the audio and video packets sent by the producer on the client device.

Data flow direction: server to client device: a producer on the server, used for occasional communications back to the client, such as the communication needed to request a bit rate change; and a consumer on the client device, used to consume back channel communications.

Two different types of data packets may exist for broadcasting: audio packets and video packets. An audio packet may be comprised of one or more encoded audio samples. Each audio sample includes its time stamp (e.g., start time), duration, size, and the encoded audio data. Because the audio bit rate may be fixed at 128 kbps, more than one audio sample can fit within a single audio packet, although there almost always will be some unused space in an audio packet. By default, each data packet may only hold 1370 bytes of data. If there are five audio samples ready to be "packetized", and each audio sample takes up 300 bytes, the first four samples can completely fit within a single packet. Since the last sample does not fit in the remaining space, part or all of it may be placed in the next audio packet.

Video packets, unlike audio packets, only include encoded video data. For example, the video packets may simply include the data from a H.264 stream. While it is possible that a single encoded frame may fit entirely within a single data packet, this is unlikely, particularly as the bit rate is increased. Because only the H.264 stream is sent, it is inefficient to leave any gaps in a video packet. If a video packet is not entirely filled up by extracting the bytes from the current encoded video frame, it will not be passed to bonding until it is filled up with sufficient data from the next encoded video frame.

For example, an encoded video frame's data is 5500 bytes, and the data for the next encoded video frame is 6500 bytes. The first 5480 bytes will be distributed across four data packets and passed to the CMC, and the remaining 20 bytes will be stored in the sixth data packet. When it moves on to the next encoded video frame, it will extract the first 1350 bytes from this frame, copy these bytes into the remaining 1350 bytes of the sixth data packet, and pass the packet to the bonding layer.

The broadcasting application may keep track of the total time associated with both the audio packets and the video packets it has sent and alternate between the two in order to keep the bonded data stream balanced in terms of time. Regardless, since the minimum video bit rate may be 1 Mbps and the fixed bit rate for audio may be 128 kbps (0.128 Mbps), there will be considerably more video data packets sent than audio data packets.

As discussed above, data may be transmitted from the client device to the server, from the server to the client device, and between the client device and the server, as described in FIGS. 4-6. In the broadcasting context, most data is typically sent from the client device to the server. There may be other instances in the broadcasting context in which a producer on the server may generate data for consumption by a consumer on the client device. For example, an IFB was discussed previously in the context of having a delay of 2.5 seconds or less. In the broadcasting context, reporters typically may listen to the live broadcast over a cell phone. This means, however, that the cell phone is in use, and if an important telephone call comes in during this time, the reporter may not be able to take it. It is preferable for the broadcasting software to provide support for an IFB implicitly. Instead of the reporter having to call in, the reporter may activate the IFB feature of the broadcasting application, and in response, the broadcasting application would stream the live broadcast's audio from server to client device, allowing the user to listen in using the client device (such as via a detachable in-ear receiver connected to the client system using Bluetooth). The data transmission may be done using the producer/consumer combo in which the producer is on the server and the consumer is on the client device. This would be in addition to the producer on the client and the consumer on the server that is used for the standard broadcasting data transmission.

In addition, an IFB can be used for two-way audio communication with someone at the station (such as a reporter in the field speaking with a producer at the television station). In this implementation, audio data may be sent via both producer/consumer combinations. This audio data would be separate from the audio data associated with the actual broadcast.

In an alternate embodiment, instead of or in addition to having a one-way audio communication or two-way audio communication, a return video feed from the server to the client device may be implemented. This is similar to an IFB except instead of simply sending the audio of the live broadcast, it may send the video (and potentially the audio as well). This may be considered to be similar to a reverse broadcasting channel; however, since the video is only being watched by the reporter, the video quality only need be adequate to get an idea what is happening in the live broadcast.

Further, as discussed above, various bonding applications may be used with bonding. One such application is file transfer. In one embodiment, the file may be transferred from the client device to the server. In an alternate embodiment, the file may be transferred from the server to the client. In still an alternate embodiment, files may be simultaneously transferred from the client device to the server and from the server to the client.

One example of a file transfer may be in the broadcasting context. A reporter in the field may generate a video, such as an interview of a person. The reporter may wish to transfer the video to the TV station, which will be played during a live broadcast. Thus, in preparation for the live broadcast, the reporter may use the client device to transfer the video (in the form of one or more files) to the server. The transfer of the files may be achieved using bonding logic, sending the files back over multiple network interfaces (e.g., multiple bonded cellular cards) resulting in faster file transfers. Moreover, the user at the TV station may log into the server (or may access the server directly) in order to determine the status of the transfer.

Another application comprises an audio application. In one embodiment, the audio application may transfer audio data (such as a stream of audio data or an audio file) from the client to a server. In an alternate embodiment, the audio application may transfer audio data from the server to the client device. More specifically, the client device may transmit audio for broadcast on a radio station. In still an alternate embodiment, audio data may be transferred from the client device to the server and from the server to the client device.

The client device may receive audio (or may generate audio if the client device includes a microphone or other transducer). The client device may transfer the stream of audio data to a server (which may use the audio data, and/or may relay the audio data to a radio station for use). The client device may perform the transfer using one or more network interfaces.

In one example, a radio field reporter may communicate with a radio station using a client device that includes multiple network interfaces, such as multiple mobile broadband interfaces, and establishing multiple connections using the multiple mobile broadband interfaces. The client device in this example may be similar to the client device in the video broadcasting example with the exception of removing the video processing capability (i.e., removing the video bonding capability and maintaining the audio bonding capability). In another example, the radio station may communicate with the radio field reporter using a server transmitting audio data to a client device over multiple connections using the multiple network interfaces. In still another example, bonding may enable bi-directional audio communication between the radio field reporter and the radio station, using the multiple network interfaces on the client device in order for the client device to transfer audio to the server, and in order for the server to transfer audio to the client device.

Still another application comprises video conferencing. Video may be sent from the client device to the server (for use by the server or a device in communication with the server). Similarly, video may be sent from the server to the client device. In this instance, there are two producer/consumer combinations, with video being sent from client/server and server/client. In this regard, the procedures outlined above for sending broadcast video from client to server may apply to the producer/consumer combination of video being sent from client to server. Likewise, the procedures outlined above for sending broadcast video from client to server may apply to the producer/consumer combination of video being sent from server to client. For example, the various bit rate adjustments attributed to the producer and consumer (in the instance of broadcast video being sent from the client to the server) discussed above may be applied to both the client and the server. More specifically, the functionality attributed to the producer may be imputed to the client and the functionality attributed to the consumer may be imputed to the server in the client/server combination (where the client is sending video to the server). The functionality attributed to the producer may be imputed to the server and the functionality attributed to the consumer may be imputed to the client in the client/server combination (where the client is sending video to the server).

Further, the client device may include a user interface that may provide the user (at a remote location from the broadcast studio) relevant information. One piece of information that may be output from the client device (such as displayed on a monitor of the client device) is at least one aspect of the delay (e.g., the initial delay, discussed above). Another piece of information that may be output from the client device may comprise the connection status of one, some, or all of the connections. For example, the connection status may comprise whether a particular network connection is transmitting data, in test mode, or disconnected. Still another piece of information that may be output from the client device may comprise the status of the transfer of the video, file transfer or the like. For example, the status of the transfer may comprise a percentage that has been transferred from the client device to the server.

In addition, the server (or a computer at the broadcast studio in communication with the server) may include a user interface to provide a technician at the broadcast studio relevant information regarding the data transfer. Similar to the client device, the server may output at least one aspect of the delay (e.g., the initial delay, discussed above), connection status of one, some, or all of the connections, and/or the status of the transfer.

The client device may further include video editing functionality, enabling a reporter to edit raw video. After which, the edited video file may be sent to the server using bonding. In one embodiment, the client device may be configured to switch between different modes, such as a video editor mode (in which raw video is edited and saved to a file) and bonding mode (in which the file may be transferred to the server using bonding). Alternatively, within the video editor mode, the video editor may access the bonding library in order to transfer the edited video to the server.

Figure 20:
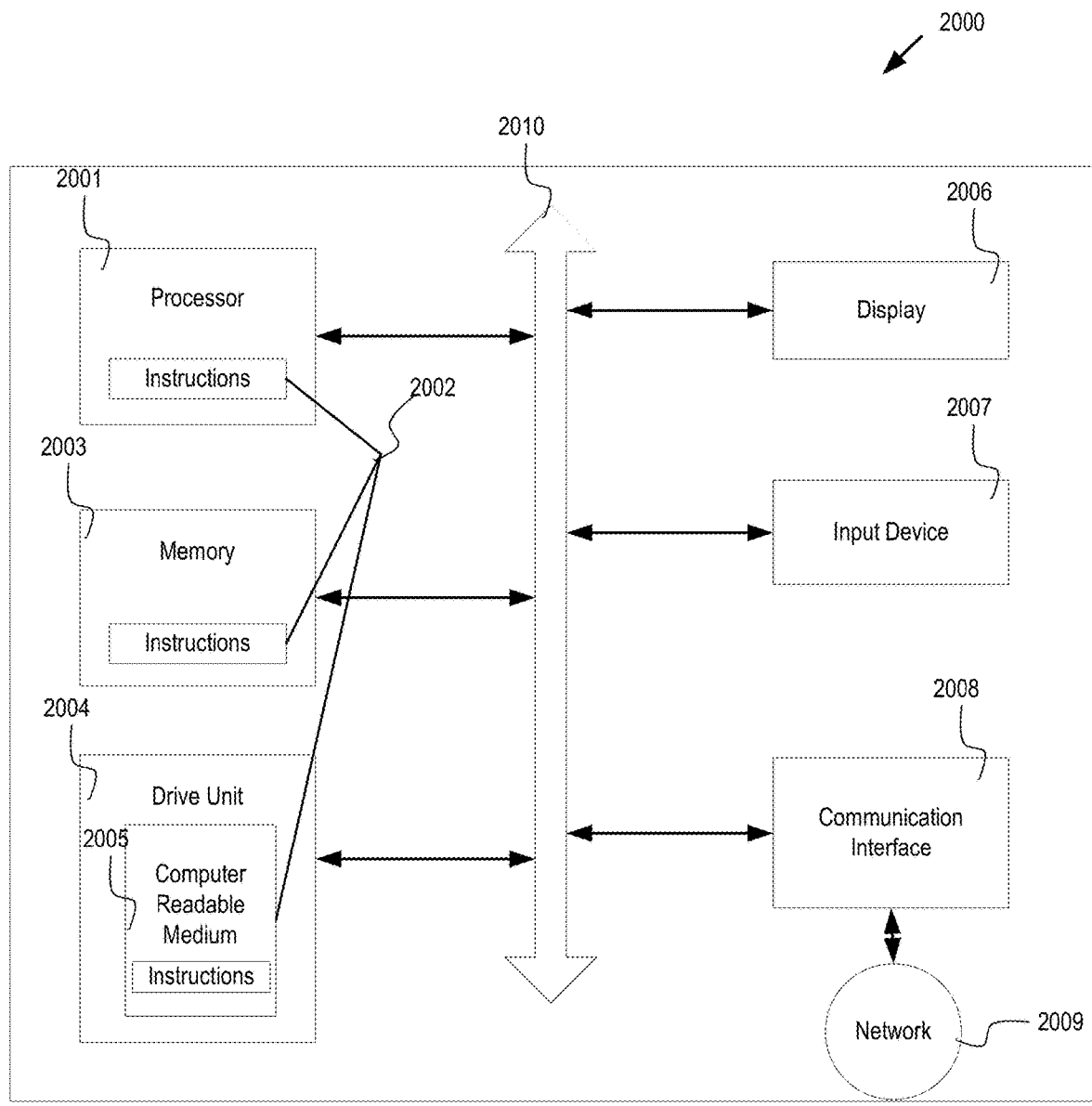
FIG. 20 illustrates a general block diagram for one or both of the client device or server.

FIG. 20 illustrates a general computer system 2000, programmable to be a specific computer system 2000, which may represent any server or client device discussed herein. The computer system 2000 may include an ordered listing of a set of instructions 2002 that may be executed to cause the computer system 2000 to perform any one or more of the methods or computer-based functions disclosed herein. The computer system 2000 may operate as a stand-alone device or may be connected, e.g., using the network 2009, to other computer systems or peripheral devices.

In a networked deployment, the computer system 2000 may operate in the capacity of a server or as a client-user computer in a server-client user network environment, or as a peer computer system in a peer-to-peer (or distributed) network environment. The computer system 2000 may also be implemented as or incorporated into various devices, such as a personal computer or a mobile computing device capable of executing a set of instructions 2002 that specify actions to be taken by that machine, including and not limited to, accessing the Internet or Web through any form of browser. Further, each of the systems described may include any collection of sub-systems that individually or jointly execute a set, or multiple sets, of instructions to perform one or more computer functions. As discussed above, the instructions may be manifested in logic.

The computer system 2000 may include a memory 2003 on a bus 2010 for communicating information. Code operable to cause the computer system to perform any of the acts or operations described herein may be stored in the memory 2003. The memory 2003 may be a random-access memory, read-only memory, programmable memory, hard disk drive or any other type of volatile or non-volatile memory or storage device.

The computer system 2000 may include a processor 2001, such as a central processing unit (CPU) and/or a graphics processing unit (GPU), such as discussed above. The processor 2001 may include one or more general processors, digital signal processors, application specific integrated circuits, field programmable gate arrays, digital circuits, optical circuits, analog circuits, combinations thereof, or other now known or later-developed devices for analyzing and processing data. The processor 2001 may implement the set of instructions 2002 or other software program, such as manually-programmed or computer-generated code for implementing logical functions. The logical function or any system element described may, among other functions, process and/or convert an analog data source such as an analog electrical, audio, or video signal, or a combination thereof, to a digital data source for audio-visual purposes or other digital processing purposes such as for compatibility for computer processing.

The computer system 2000 may also include a disk or optical drive unit 2004. The disk drive unit 2004 may include a computer-readable medium 2005 in which one or more sets of instructions 2002, e.g., software, can be embedded. Further, the instructions 2002 may perform one or more of the operations as described herein. The instructions 2002 may reside completely, or at least partially, within the memory 2003 and/or within the processor 2008 during execution by the computer system 2000. Accordingly, the databases may be stored in the memory 2003 and/or the disk unit 2004.

The memory 2003 and the processor 2008 also may include computer-readable media as discussed above. A "computer-readable medium," "computer-readable storage medium," "machine readable medium," "propagated-signal medium," and/or "signal-bearing medium" may include any device that includes, stores, communicates, propagates, or transports software for use by or in connection with an instruction executable system, apparatus, or device. The machine-readable medium may selectively be, but not limited to, an electronic, magnetic, optical, electromagnetic, infrared, or semiconductor system, apparatus, device, or propagation medium.

Additionally, the computer system 2000 may include an input device 2007, such as a keyboard or mouse, configured for a user to interact with any of the components of system 2000. It may further include a display, such as a liquid crystal display (LCD), a cathode ray tube (CRT), or any other display suitable for conveying information. The display may act as an interface for the user to see the functioning of the processor 2001, or specifically as an interface with the software stored in the memory 2003 or the drive unit 2004. As discussed above, the customer-controlled device may include a display and an input device, such as input device 2007.

The computer system 2000 may include a communication interface 2008 that enables communications via the communications network 2009. The network 2009 may include wired networks, wireless networks, or combinations thereof. The communication interface 2008 network may enable communications via any number of communication standards, such as 802.11, 802.17, 802.20, WiMAX, 802.15.4, cellular telephone standards, or other communication standards, as discussed above. Just because one of these standards is listed does not mean any one is preferred as any number of these standards may never actually be adopted in a commercial product.

Block diagrams of different aspects of the system may be implemented using the computer functionality disclosed in FIG. 20. Further, the flow diagrams may use computer readable instructions that are executed by one or more processors in order to implement the functionality disclosed. Finally, the displays may be output on an I/O device.

The present disclosure contemplates a computer-readable medium that includes instructions or receives and executes instructions responsive to a propagated signal, so that a device connected to a network may communicate voice, video, audio, images or any other data over the network. Further, the instructions may be transmitted or received over the network via a communication interface. The communication interface may be a part of the processor or may be a separate component. The communication interface may be created in software or may be a physical connection in hardware. The communication interface may be configured to connect with a network, external media, the display, or any other components in system, or combinations thereof. The connection with the network may be a physical connection, such as a wired Ethernet connection or may be established wirelessly as discussed below. In the case of a service provider server, the service provider server may communicate with users through the communication interface.

The computer-readable medium may be a single medium, or the computer-readable medium may be a single medium or multiple media, such as a centralized or distributed database, and/or associated caches and servers that store one or more sets of instructions. The term "computer-readable medium" may also include any medium that may be capable of storing, encoding or carrying a set of instructions for execution by a processor or that may cause a computer system to perform any one or more of the methods or operations disclosed herein.

The computer-readable medium may include a solid-state memory such as a memory card or other package that houses one or more non-volatile read-only memories. The computer-readable medium also may be a random access memory or other volatile re-writable memory. Additionally, the computer-readable medium may include a magneto-optical or optical medium, such as a disk or tapes or other storage device to capture carrier wave signals such as a signal communicated over a transmission medium. A digital file attachment to an email or other self-contained information archive or set of archives may be considered a distribution medium that may be a tangible storage medium. The computer-readable medium is preferably a tangible and non-transitory storage medium. Accordingly, the disclosure may be considered to include any one or more of a computer-readable medium or a distribution medium and other equivalents and successor media, in which data or instructions may be stored.

Alternatively or in addition, dedicated hardware implementations, such as application specific integrated circuits, programmable logic arrays and other hardware devices, may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system may encompass software, firmware, and hardware implementations.

The methods described herein may be implemented by software programs executable by a computer system. Further, implementations may include distributed processing, component/object distributed processing, and parallel processing. Alternatively or in addition, virtual computer system processing maybe constructed to implement one or more of the methods or functionality as described herein.

Although components and functions are described that may be implemented in particular embodiments with reference to particular standards and protocols, the components and functions are not limited to such standards and protocols. For example, standards for Internet and other packet switched network transmission (e.g., TCP/IP, UDP/IP, HTML, and HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations described herein are intended to provide a general understanding of the structure of various embodiments. The illustrations are not intended to serve as a complete description of all of the elements and features of apparatus, processors, and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

The above disclosed subject matter is to be considered illustrative, and not restrictive, and the appended claims are intended to cover all such modifications, enhancements, and other embodiments, which fall within the true spirit and scope of the description. Thus, to the maximum extent allowed by law, the scope is to be determined by the broadest permissible interpretation of the following claims and their equivalents, and shall not be restricted or limited by the foregoing detailed description.

What is claimed:

1. An apparatus configured to communicate via a plurality of network interfaces, the apparatus comprising:
   the plurality of network interfaces;
   a memory configured to store at least a part of one or more data streams in a particular bonding session; and
   at least one processor in communication with the plurality of network interfaces and the memory, the processor configured to:
   establish, for each of the plurality of network interfaces, a respective network connection with a remote device in order to establish a plurality of network connections;
   packetize the one or more data streams into a plurality of packets;
   transmit the plurality of packets using the plurality of network connections to the remote device for the particular bonding session;
   evaluate performance of one network connection in transmitting the packets for the particular bonding session in relation to one or more remainder network connections;
   determine, based on the evaluated performance of the one network connection in transmitting the packets for the particular bonding session in relation to the one or more remainder network connections, whether to cease using the one network connection to transmit, at least in part, the plurality of packets;
   in response to determining to cease using the one network connection to transmit, at least in part, the plurality of packets:
   cease using the one network connection to transmit, at least in part, the plurality of packets during the particular bonding session while still using the one or more remainder network connections; and
   establish another network connection during the particular bonding session using another network interface, from the plurality of network interfaces, the another network interface previously idle during the particular bonding session and not transmitting the plurality of packets; and
   in response to determining not to cease using the one network connection to transmit, at least in part, the plurality of packets, continue transmitting, at least in part, the plurality of packets using the one network connection.

2. The apparatus of claim 1, wherein the processor is configured to evaluate the performance of the one network connection in relation to all of the remainder network connections.

3. The apparatus of claim 1, wherein the processor is configured to evaluate a first criterion for the one network connection in relation to a second criterion for the one or more remainder network connections.

4. The apparatus of claim 3, wherein the first criterion comprises acknowledgment checking; and wherein the second criterion is an indication of time of transmittal of packets for at least a part of a route to the remote device or of acknowledgments of receipt of the packets for at least a part of the route from the remote device.

5. The apparatus of claim 4, wherein the second criterion comprises round trip time (RTT);
   wherein the processor is configured to determine an average RTT for the one or more of the remainder of the network connections;
   wherein the time of transmittal comprises an amount of time waiting for acknowledgments for packets; and
   wherein the processor is configured to base the amount of time waiting for acknowledgments for packets transmitted by the one network connection on the average RTT for the one or more remainder network connections.

6. The apparatus of claim 1, wherein the processor is configured to:
   determine whether the one network connection is slower relative to the one or more remainder network connections; and
   responsive to determining that the one network connection is slower relative to the one or more remainder network connections, operate the one network connection in test mode.

7. The apparatus of claim 6, wherein the processor is further configured to:
   analyze the operation of the one network connection in the test mode; and
   determine, based on the analysis of the operation of the one network connection in the test mode with at least one of the one or more remainder network connections, to reintroduce the one network connection into the plurality of network connections in order for the one network connection to transmit, at least in part, the plurality of packets.

8. The apparatus of claim 1, wherein the processor is configured to:
   determine whether the one network connection is slower relative to the one or more remainder network connections; and
   responsive to determining that the one network connection is slower relative to the one or more remainder network connections, establish the another network connection.

9. The apparatus of claim 8, wherein the another network connection comprises a satellite network connection.

10. The apparatus of claim 9, wherein the processor is further configured to:
    responsive to determining that the one network connection is slower relative to the one or more remainder network connections, operate the one network connection in test mode;
    analyze the operation of the one network connection in the test mode;
    determine, based on the analysis of the operation of the one network connection in the test mode, to reintroduce the one network connection into the plurality of network connections in order for the one network connection to transmit, at least in part, the plurality of packets; and
    responsive to determining to reintroduce the one network connection into the plurality of network connections, cease communicating with the satellite network connection.

11. An apparatus configured to communicate via a plurality of network interfaces, the apparatus comprising:
   the plurality of network interfaces;
   a memory configured to store at least a part of one or more data streams in a particular bonding session; and
   at least one processor in communication with the plurality of network interfaces and the memory, the processor configured to:
   establish, for a first cellular network interface and a second cellular network interface of the plurality of network interfaces, a first cellular network connection and a second cellular network connection, respectively, with a remote device;
   packetize the one or more data streams into a plurality of packets;
   transmit the plurality of packets using each of the first cellular network interface and second cellular network interface to the remote device for the particular bonding session;
   evaluate performance of the first cellular network connection in relation to performance of the second cellular network connection in transmitting the plurality of packets for the particular bonding session;
   in response to evaluating the performance of the first cellular network connection in relation to the performance of the second cellular network connection, establish for the particular bonding session a non-cellular connection using a non-cellular interface, from the plurality of network interfaces, that is currently idle, the non-cellular interface being a different type than the first cellular network interface and the second cellular network interface; and
   transmit packets for the particular bonding session using the non-cellular interface to the remote device.

12. An apparatus configured to communicate via a plurality of network interfaces, the apparatus comprising:
   the plurality of network interfaces;
   a memory configured to store at least a part of one or more data streams in a particular bonding session; and
   at least one processor in communication with the plurality of network interfaces and the memory, the processor configured to:
   receive an indication to transmit the one or more data streams to a remote device in the particular bonding session;
   in response to receiving the indication to transmit the one or more data streams;
   establish, for each of the plurality of network interfaces, a respective network connection with a remote device for the particular bonding session;
   packetize the one or more data streams into a plurality of packets;
   assign ownership for the particular bonding session of packets to respective ones of the plurality of network interfaces up to a respective predetermined number of packets;
   transmit, for the particular bonding session, the plurality of packets, using the respective ones of the plurality of network connections assigned ownership of the packets, to the remote device;
   determine a number of acknowledgements of owned packets for a respective one of the plurality of network interfaces during the particular bonding session;
   responsive to determining the number of the acknowledgments of the owned packets, assign to the respective one of the plurality of network interfaces additional owned packets, a number of the additional owned packets is the number of the acknowledgments of the owned packets up to the respective predetermined number of packets such that each respective one of the plurality of network interfaces is assigned a respective number of additional owned packets independently of each other based on the respective predetermined number of packets and based on the respective number of acknowledgements of the owned packets; and
   transmit, for the particular bonding session, the number of additional owned packets using the respective one of the plurality of network interfaces.

13. The apparatus of claim 12, wherein each of the plurality of network connections uses a same constant value for the respective predetermined number of packets that can be assigned thereto.

14. The apparatus of claim 12, wherein, in response to receiving the indication to transmit the one or more data streams, the processor is configured to assign up to the respective predetermined number of packets to the plurality of network connections without first undergoing a training phase to determine the respective predetermined number.

15. The apparatus of claim 12, wherein the processor is further configured to undergo a training phase in order to determine the respective predetermined number.

16. The apparatus of claim 12, wherein the processor is further configured to:
   evaluate performance of one network connection in transmitting the packets in relation to one or more of remainder of the network connections; and
   determine, based on the evaluated performance of the one network connection in transmitting the packets in relation to the one or more remainder of the network connections, whether to cease using the one network connection to transmit, at least in part, the plurality of packets.

17. A method of communicating via a plurality of network interfaces, the method comprising:
   establishing, for each of the plurality of network interfaces, a respective network connection with a remote device for a particular bonding session in order to establish a plurality of network connections;
   packetizing one or more data streams into a plurality of packets;
   transmitting the plurality of packets using the plurality of network connections to the remote device for the particular bonding session;
   evaluating performance of one network connection in transmitting the packets for the particular bonding session in relation to one or more remainder network connections;
   determining, based on the evaluated performance of the one network connection in transmitting the packets in relation to the one or more remainder of the network connections, whether to cease using the one network connection to transmit, at least in part, the plurality of packets;
   in response to determining to cease using the one network connection to transmit, at least in part, the plurality of packets:
   ceasing using the one network connection to transmit, at least in part, the plurality of packets during the particular bonding session while still using the one or more remainder network connections; and
   establishing another network connection during the particular bonding session using another network interface, from the plurality of network interfaces, the another network interface previously idle during the particular bonding session and not transmitting the plurality of packets; and in response to determining not to cease using the one network connection to transmit, at least in part, the plurality of packets, continuing to transmit, at least in part, the plurality of packets using the one network connection.

18. The method of claim 17, wherein evaluating the performance of the one network connection is in relation to all of the remainder network connections.

19. The method of claim 17, wherein evaluating performance of one network connection in transmitting the packets in relation to the one or more remainder network connections comprises evaluating a first criterion for the one network connection in relation to a second criterion for the one or more of the remainder of the network connections.

20. The method of claim 19, wherein the first criterion comprises acknowledgment checking; and wherein the second criterion is an indication of time of transmittal of packets for at least a part of a route to the remote device or of acknowledgments of receipt of the packets for at least a part of the route from the remote device.

21. The method of claim 20, wherein the second criterion comprises round trip time (RTT);

wherein evaluating performance comprises:

determining an average RTT for the one or more of the remainder of the network connections; and determining an amount of time to wait for acknowledgments for packets transmitted by the one network connection based on the average RTT for the one or more remainder network connections.

22. The method of claim 17, further comprising, in response to evaluating the performance of the one network connection, operate the one network connection in test mode.

23. An apparatus configured to communicate via a plurality of network interfaces, the apparatus comprising:

the plurality of network interfaces comprising a cellular network interface and a satellite network interface;

a memory configured to store at least a part of one or more data streams in a particular bonding session; and at least one processor in communication with the plurality of network interfaces and the memory, the processor configured to:

establish, for the cellular network interface, a cellular network connection with a remote device;

packetize the one or more data streams into a plurality of packets;

transmit, via the cellular network connection to the remote device, the plurality of packets using the cellular network interface for the particular bonding session;

evaluate performance of the cellular network connection in transmitting the plurality of packets for the particular bonding session;

in response to evaluating the performance of the cellular network connection, establish a satellite network connection during the particular bonding session using a satellite network interface, from the plurality of network interfaces, that is currently idle, the satellite network interface being a different type than the cellular network interface;

transmit packets using the satellite network interface to the remote device;

operate for the particular bonding session the cellular network connection in test mode;

analyze the cellular network connection in the test mode by determining whether the cellular network connection continues to fail; and after terminating the cellular network connection based on the analysis of the cellular network connection in test mode, re-establish connection with the cellular network connection for the particular bonding session by dynamically determining at least one criterion and using the dynamically determined criterion in order to determine whether to re-establish the connection with the cellular network connection.

24. The apparatus of claim 23, wherein the dynamically determined criterion comprises an amount of time to wait between terminating the network connection and re-establishing the connection with the network connection.

25. The apparatus of claim 24, wherein the amount of time to wait between terminating the network connection and re-establishing the connection with the network connection is dependent on a number of times the network connection fails in the test mode.

* * * * *